United States Patent
Shimura

(10) Patent No.: US 8,165,836 B2
(45) Date of Patent: Apr. 24, 2012

(54) MEASUREMENT APPARATUS AND COMPUTER READABLE MEDIUM STORING PROGRAM FOR MEASURING ERROR OF A QUADRATURE DEMODULATOR OR QUADRATURE MODULATOR

(75) Inventor: Takashi Shimura, Tochigi (JP)

(73) Assignee: Advantest Corporation, Tokyo (JP)

( * ) Notice: Subject to any disclaimer, the term of this patent is extended or adjusted under 35 U.S.C. 154(b) by 169 days.

(21) Appl. No.: 12/614,803

(22) Filed: Nov. 9, 2009

(65) Prior Publication Data

US 2010/0153042 A1 Jun. 17, 2010

Related U.S. Application Data

(63) Continuation of application No. PCT/JP2008/060077, filed on May 30, 2008.

(30) Foreign Application Priority Data

Jun. 11, 2007 (JP) ................................. 2007-154101

(51) Int. Cl.
*G01R 25/00* (2006.01)
*G06F 11/00* (2006.01)
(52) U.S. Cl. ............... 702/66; 702/72; 702/69; 375/226
(58) Field of Classification Search .................... 702/66, 702/69, 72, 106, 189
See application file for complete search history.

(56) References Cited

U.S. PATENT DOCUMENTS

| 6,294,952 B1 | 9/2001 | Kato | |
|---|---|---|---|
| 2003/0112914 A1* | 6/2003 | Linsky et al. | 375/376 |
| 2003/0118121 A1* | 6/2003 | Makinen | 375/261 |
| 2003/0128777 A1* | 7/2003 | Linsky et al. | 375/327 |
| 2007/0140378 A1 | 6/2007 | Kato | |
| 2008/0037688 A1* | 2/2008 | Witte | 375/326 |
| 2009/0180527 A1* | 7/2009 | Asami | 375/226 |

FOREIGN PATENT DOCUMENTS

| JP | 2000-316031 A | 11/2000 |
|---|---|---|
| JP | 2001-333120 A | 11/2001 |
| JP | 2004-248115 A | 9/2004 |
| JP | 2005-244358 A | 9/2005 |
| JP | 2008-22243 A | 1/2008 |

OTHER PUBLICATIONS

International Search Report (ISR) for PCT/JP2008/060077 for Examiner consideration, Jul. 1, 2008.
Written Opinion (PCT/ISA/237) of PCT/JP2008/060077, Jul. 1, 2008.

* cited by examiner

*Primary Examiner* — Hal Wachsman
(74) *Attorney, Agent, or Firm* — Chen Yoshimura LLP

(57) ABSTRACT

A measurement apparatus that measures, as an error under measurement, at least one of a gain error and a phase error of a quadrature demodulator or a quadrature modulator as a measurement target. The measurement apparatus includes an output control section that causes the measurement target to output a signal, a detecting section that detects a measured signal representing a real component and an imaginary component of the signal output from the measurement target, and a calculating section that calculates, as the gain error or the phase error, a solution for a variable that maximizes a correlation value between the measured signal detected by the detecting section and an ideal signal that includes the error under measurement as the variable and that represents the measured signal that should be output by the measurement target.

12 Claims, 4 Drawing Sheets

MEASUREMENT APPARATUS AND COMPUTER READABLE MEDIUM STORING PROGRAM FOR MEASURING ERROR OF A QUADRATURE DEMODULATOR OR QUADRATURE MODULATOR

CROSS REFERENCE TO RELATED APPLICATION

This is a continuation application of PCT/JP2008/060077 filed on May 30, 2008 which claims priority from a Japanese Patent Application No. 2007-154101 filed on Jun. 11, 2007, the contents of which are incorporated herein by reference.

BACKGROUND

1. Technical Field

The present invention relates to a measurement apparatus and a program. In particular, the present invention relates to a measurement apparatus and a program for measuring gain error or phase error of a quadrature demodulator or a quadrature modulator.

2. Related Art

The output signal of a quadrature demodulator and a quadrature modulator includes a gain error and a phase error of the quadrature demodulator or the quadrature modulator. Japanese Patent Application Publication No. 2000-316031 discloses a method for calculating the gain error and the phase error in a quadrature-demodulated signal. More specifically, this method involves obtaining parameters that cause a value obtained by summing the square of the error between a measured signal and an ideal signal over a designated section to be a minimum, and calculating the gain error and the phase error based on the obtained parameters.

With the method described above, however, a determinant matrix must be solved, which requires a large amount of computation. Furthermore, when there is a large amount of noise in the measured signal, the error in the calculation result becomes extremely large.

SUMMARY

Therefore, it is an object of an aspect of the innovations herein to provide a measurement apparatus and a program that overcome the above drawbacks accompanying the related art. The above and other objects can be achieved by combinations described in the independent claims. The dependent claims define further advantageous and exemplary combinations of the innovations herein. The dependent claims define further advantageous and exemplary combinations of the innovations herein.

According to a first aspect of the present invention, provided is a measurement apparatus that measures, as an error under measurement, at least one of a gain error and a phase error of a quadrature demodulator or a quadrature modulator, the measurement apparatus comprising an output control section that causes the quadrature demodulator or the quadrature modulator serving as a measurement target to output a signal; a detecting section that detects a measured signal representing a real component and an imaginary component of the signal output from the quadrature demodulator or the quadrature modulator serving as the measurement target; and a calculating section that calculates, as the gain error or the phase error, a solution for a variable that maximizes a correlation value between the measured signal detected by the detecting section and an ideal signal that includes the error under measurement as the variable and that represents the measured signal that should be output by the quadrature demodulator or the quadrature modulator serving as the measurement target.

According to a second aspect of the present invention, provided is a program that causes an information processing apparatus to function as a measurement apparatus that measures, as an error under measurement, at least one of a gain error and a phase error of a quadrature demodulator or a quadrature modulator, the program causing the information processing apparatus to function as an output control section that causes the quadrature demodulator or the quadrature modulator serving as a measurement target to output a signal; a detecting section that detects a measured signal representing a real component and an imaginary component of the signal output from the quadrature demodulator or the quadrature modulator serving as the measurement target; and a calculating section that calculates, as the gain error or the phase error, a solution for a variable that maximizes a correlation value between the measured signal detected by the detecting section and an ideal signal that includes the error under measurement as the variable and that represents the measured signal that should be output by the quadrature demodulator or the quadrature modulator serving as the measurement target.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
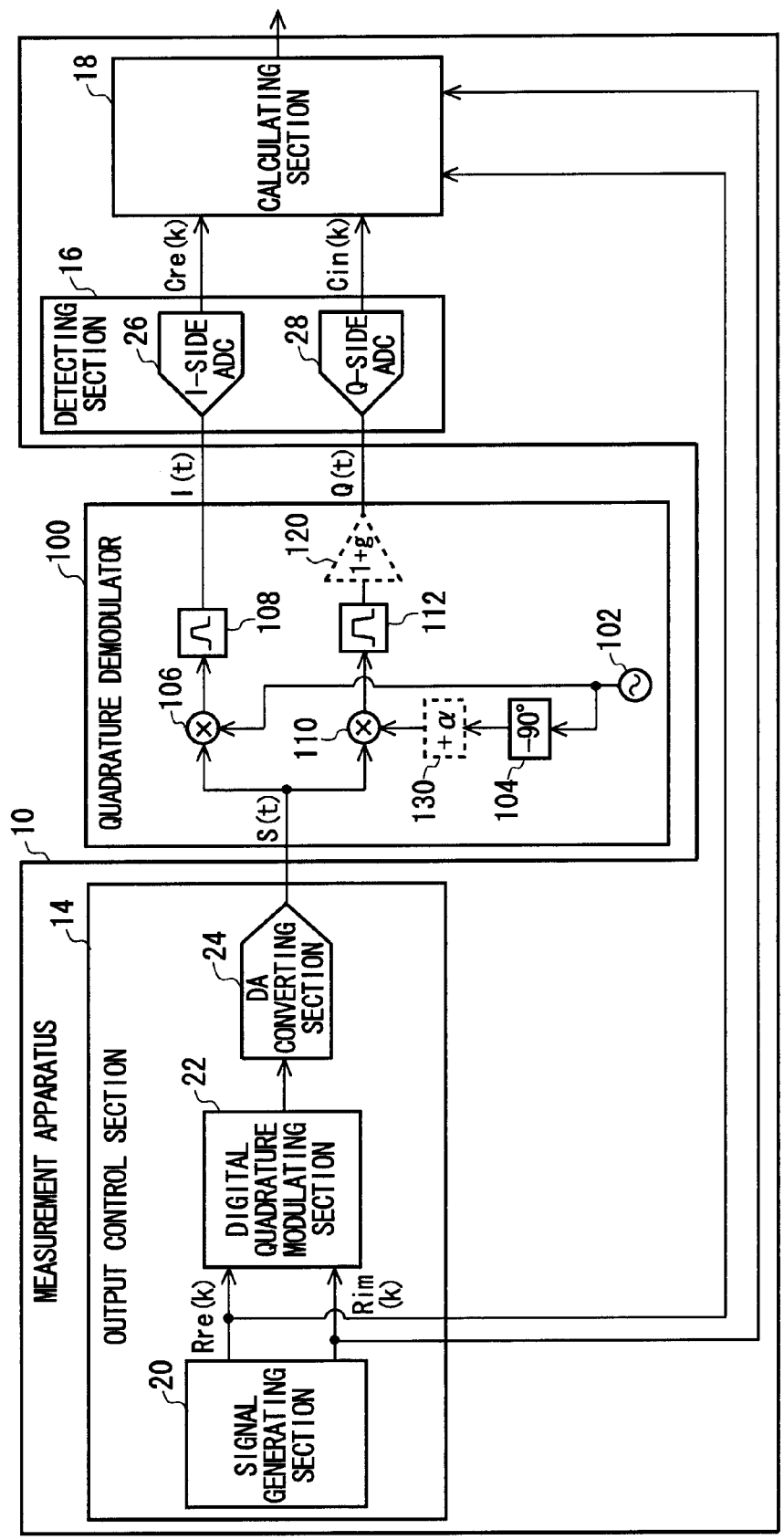
FIG. 1 shows an exemplary measurement apparatus 10 according to a first embodiment of the present invention, along with a quadrature demodulator 100.

FIG. 1 shows an exemplary measurement apparatus 10 according to a first embodiment of the present invention, along with a quadrature demodulator 100. The quadrature demodulator 100 receives a modulated signal S(t) obtained by quadrature modulating transmission data with a carrier signal, and quadrature demodulates the received modulated signal. The quadrature demodulator 100 outputs an I-signal I(t) representing a real component of the modulated signal and a Q-signal Q(t) representing an imaginary component of the modulated signal.

The quadrature demodulator 100 may include an oscillator 102, a phase shifter 104, an I-side multiplier 106, an I-side BPF 108, a Q-side multiplier 110, and a Q-side BPF 112. The oscillator 102 generates a reference signal having the same frequency as the carrier signal of the received modulated signal, for example. The phase shifter 104 shifts the phase of the reference signal generated by the oscillator 102 by −90 degrees. In other words, the phase shifter 104 delays the phase of the reference signal generated by the oscillator 102 by a quarter of a period.

The I-side multiplier 106 multiplies the received modulated signal by the reference signal generated by the oscillator 102. The I-side BPF 108 band-pass filters the signal obtained as a product of the reference signal and the modulated signal. The I-side BPF 108 outputs the I-signal I(t) representing the real component of the signal that is quadrature modulated in the modulated signal, that is, a signal obtained by removing the summed frequency component from the signal obtained as a product of the reference signal and the modulated signal.

The Q-side multiplier 110 multiplies (i) the received modulated signal by (ii) the reference signal having a phase that is delayed by a quarter of a period output from the phase shifter 104. The Q-side BPF 112 band-pass filters a signal obtained by multiplying the quarter-period phase-delayed reference signal and the modulated signal. The Q-side BPF 112 outputs the Q-signal Q(t) representing the imaginary component of a signal that is quadrature modulated in the modulated signal, that is, a signal obtained by removing the summed frequency component from the signal obtained as a product of the quarter-period phase-delayed reference signal and the modulated signal.

Here, the quadrature demodulator 100 includes a gain error element 120 that causes a gain error between the I-signal and the Q-signal, and a phase error element 130 that causes a phase error between the I-signal and the Q-signal. For example, if the amplification rate of the I-signal is 1, the gain error element 120 may be an element that amplifies the Q-signal with an amplification rate of (1+g). Here, g is a real number representing the gain error.

The phase error element 130 may be an element that causes the phase of the quarter-period phase-delayed reference signal supplied from the Q-side multiplier 110 to advance by $\alpha$ degrees. Here, $\alpha$ is an angle representing the phase error. The measurement apparatus 10 of the present embodiment measures at least one of the gain error g and the phase error $\alpha$ of the quadrature demodulator 100.

The measurement apparatus 10 of the present embodiment is provided with an output control section 14, a detecting section 16, and a calculating section 18. The output control section 14 causes the quadrature demodulator 100 under measurement to output a signal. In the present embodiment, the output control section 14 supplies the quadrature demodulator 100 under measurement with the modulated signal obtained by modulating the I-signal and the Q-signal having predetermined phases and amplitudes with the carrier signal. The output control section 14 causes the quadrature demodulator 100 to quadrature demodulate the modulated signal and thereby output the I-signal and the Q-signal.

The output control section 14 may include a signal generating section 20, a digital quadrature modulating section 22, and a DA converting section 24. The signal generating section 20 sequentially generates a data value $R_{re}(k)$ of the real component of the modulated signal and a data value $R_{im}(k)$ of the imaginary component of the modulated signal. The digital quadrature modulating section 22 calculates each sample value of the modulated signal based on the data values $R_{re}(k)$ and $R_{im}(k)$ generated by the signal generating section 20. The digital quadrature modulating section 22 sequentially outputs the sample values of the modulated signal. The DA converting section 24 DA converts each of the sample values output from the digital quadrature modulating section 22, and supplies the resulting analog modulated signal to the quadrature demodulator 100.

The detecting section 16 detects a measured signal representing the real component and the imaginary component of a signal demodulated by the quadrature demodulator 100. In other words, the detecting section 16 detects, as the measured signal, the I-signal I(t) and the Q-signal Q(t) output as a result of the quadrature demodulation of the modulated signal by the quadrature demodulator 100.

The detecting section 16 may include an I-side ADC 26 and a Q-side ADC 28. The I-side ADC 26 AD converts the I-signal output by the quadrature demodulator 100 and outputs the result as the sample value $C_{re}(k)$ of the real part of the measured signal. The Q-side ADC 28 AD converts the Q-signal output by the quadrature demodulator 100 and outputs the result as the sample value $C_{im}(k)$ of the imaginary part of the measured signal.

The calculating section 18 calculates at least one of the gain error g and the phases error $\alpha$ of the quadrature demodulator 100 as the error being measured, based on the measured signal $C_{re}(k)$ and $C_{im}(k)$ detected by the detecting section 16. An exemplary computation by the detecting section 16 is described in detail further below.

The measurement apparatus 10 according to the first embodiment can easily measure the gain error and the phase error of the quadrature demodulator 100. Furthermore, the measurement apparatus 10 described above can accurately calculate the gain error and the phase error of the quadrature demodulator 100 even when there is a large amount of noise.

Figure 2:
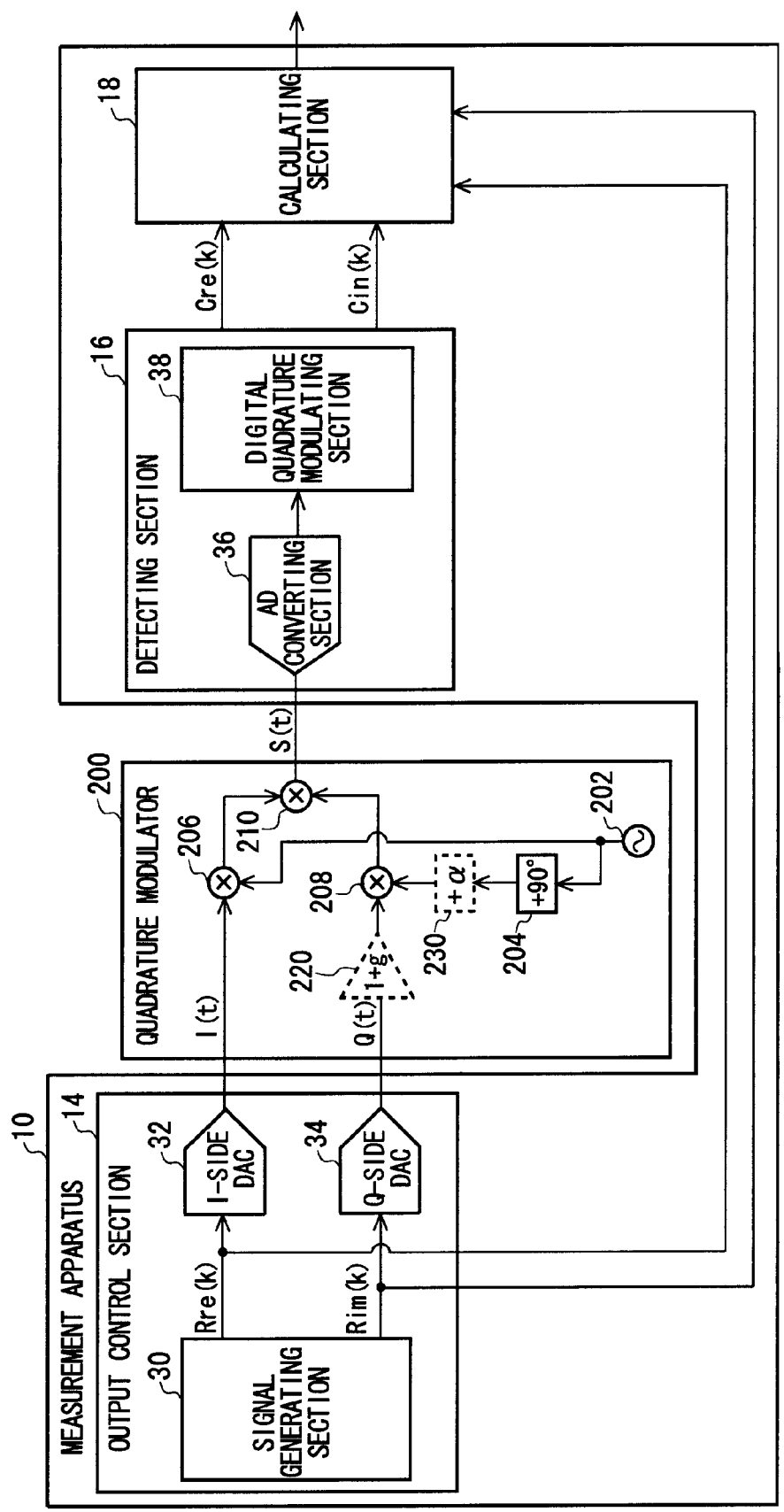
FIG. 2 shows a measurement apparatus 10 according to a second embodiment of the present invention, along with a quadrature modulator 200.

FIG. 2 shows a measurement apparatus 10 according to a second embodiment of the present invention, along with a quadrature modulator 200. The quadrature modulator 200 receives an I-signal I(t) and a Q-signal Q(t) representing data to be transmitted, modulates the received I-signal with the real component of the carrier signal, and modulates the received Q-signal with the imaginary component of the carrier signal. In other words, the quadrature modulator 200 outputs a modulated signal S(t) that includes the I-signal in the real component and the Q-signal in the imaginary component.

The quadrature modulator 200 may include an oscillator 202, a phase shifter 204, an I-side multiplier 206, a Q-side multiplier 208, and a adder 210. The oscillator 202 generates a carrier signal having a prescribed frequency. The phase shifter 204 shifts the phase of the carrier signal generated by the oscillator 202 by +90 degrees. In other words, the phase shifter 204 advances the phase of the carrier signal generated by the oscillator 202 by a quarter of a period.

The I-side multiplier 206 multiplies (i) the carrier signal generated by the oscillator 202 by (ii) the received I-signal. The Q-side multiplier 208 multiplies (i) the quarter-period phase-advanced carrier signal output by the phase shifter 204 by (ii) the received Q-signal. The adder 210 adds together (i) the signal obtained as the product of the carrier signal and the I-signal and (ii) the signal obtained as the product of the quarter-period phase-advanced carrier signal and the Q-signal. The adder 210 outputs the signal resulting from this addition as the modulated signal S(t).

Here, the quadrature modulator 200 includes a gain error element 220 that causes a gain error between the real component and the imaginary component of the modulated signal, and a phase error element 230 that causes an amplitude error between the real component and the imaginary component of the modulated signal. For example, if the amplification rate of the real component of the modulated signal is 1, the gain error element 220 may be an element that amplifies the imaginary component of the modulated signal with an amplification rate of $(1+g)$.

The phase error element 230 may be an element that causes the phase of the quarter-period phase-advanced carrier signal supplied to the Q-side multiplier 208 to advance by $\alpha$ degrees. Here, $\alpha$ is an angle representing the phase error. The measurement apparatus 10 of the present embodiment measures at least one of the gain error g and the phase error $\alpha$ of the quadrature modulator 200.

The measurement apparatus 10 of the present embodiment is provided with the output control section 14, the detecting section 16, and the calculating section 18. The output control section 14 causes the quadrature modulator 200 under measurement to output a signal. In the present embodiment, the output control section 14 supplies the quadrature modulator 200 under measurement with the I-signal and the Q-signal having predetermined phases and amplitudes. The output control section 14 causes the quadrature modulator 200 to quadrature modulate the I-signal and the Q-signal and thereby output the modulated signal.

The output control section 14 may include a signal generating section 30, an I-side DAC 32, and a Q-side DAC 34. The signal generating section 30 sequentially generates a data value $R_{re}(k)$ of the I-signal and a data value $R_{im}(k)$ of the Q-signal. The I-side DAC 32 DA converts data value $R_{re}(k)$ of the I-signal generated by the signal generating section 30, and supplies the resulting analog I-signal to the quadrature modulator 200. The Q-side DAC 34 DA converts the data value $R_{im}(k)$ of the Q-signal generated by the signal generating section 30, and supplies the resulting analog Q-signal to the quadrature modulator 200.

The detecting section 16 detects a measured signal representing the real component and the imaginary component of a modulated signal form the quadrature modulator 200. The detecting section 16 may include an AD converting section 36 and a digital quadrature demodulating section 38. The AD converting section 36 AD converts the modulated signal output by the quadrature modulator 200. The digital quadrature demodulating section 38 digitally quadrature modulates each sample value of the modulated signal that is AD converted by the AD converting section 36, and sequentially outputs sample values $C_{re}(k)$ of the real part of the modulated signal and sample values $C_{im}(k)$ of the imaginary part of the modulated signal.

The calculating section 18 calculates at least one of the gain error g and the phases error $\alpha$ of the quadrature modulator 200 as the error being measured, based on the measured signal $C_{re}(k)$ and $C_{im}(k)$ detected by the detecting section 16. An exemplary computation by the detecting section 16 is described in detail further below.

The measurement apparatus 10 according to the second embodiment can easily measure the gain error and the phase error of the quadrature modulator 200. Furthermore, the measurement apparatus 10 described above can accurately calculate the gain error and the phase error of the quadrature modulator 200 even when there is a large amount of noise.

The following is a detailed description of an exemplary calculation by the calculating section 18 according to the present embodiment. The calculating section 18 calculates a solution for a variable that maximizes a correlation value between (i) an ideal signal R representing the measured signal to be output from the quadrature demodulator 100 or the quadrature modulator 200, which includes an error being measured as a variable, and (ii) a measured signal Z detected by the detecting section 16. The calculating section 18 outputs the calculated solution as the error being measured, i.e. the gain error g or the phase error $\alpha$.

Here, the correlation value $\rho$ between the ideal signal R and the measured signal Z Can be expressed by Expression 1 below. In Expression 1, R represents the ideal signal, Z represents the measured signal, and R* represents the complex conjugate of R.

$$\rho = \frac{|\sum Z \cdot R^*|^2}{\sum |Z|^2 \cdot \sum |R|^2} \quad (1)$$

In other words, the calculating section 18 calculates $|\Sigma Z \cdot R|^2$, which is the square of the value obtained as the summation, over a designated period, of the value of the product of the measured signal Z and the complex conjugate R* of the ideal signal R. The calculating section 18 calculates the correlation value $\rho$ by dividing the value calculated for $|\Sigma Z \cdot R^*|^2$ by $\Sigma |Z|^2 \cdot \Sigma |R|^2$, which is a product of (i) the summation value of the square of the measured signal Z over the designated period and (ii) the summation value of the square of the ideal signal R over the designated period. In this way, the calculating section 18 can calculate the gain error and the phase error without solving for a determinant of a matrix or the like.

Furthermore, the calculating section 18 calculates the solution for the variable that maximizes the correlation value between the ideal signal R and the measured signal Z based on an equation for which the derivative of the function representing the correlation value $\rho$ between the ideal signal R and the measured signal Z is 0. Therefore, the calculating section 18 can calculate the variable value, i.e. the gain error or the phase error, that results in the maximum correlation value $\rho$ by calculating the maximum point of the function expressing the correlation value $\rho$.

Furthermore, the calculating section 18 may calculate solutions for the variable that maximize the correlation value between the ideal signal R and the measured signal Z based on an equation for which the derivative of the function $\rho'$ expressed as Expression 2 below is 0, for example.

$$\rho' = \frac{|\sum Z \cdot R^*|^2}{\sum |R|^2} \quad (2)$$

In other words, the calculating section 18 may calculate the correlation value $\rho'$ by replacing the denominator $\Sigma |Z|^2$ of Expression 1 with a value of 1. Regardless of the type of value of $\Sigma |Z|^2$ in the denominator in Expression 1, that is, regardless of the type of value of the measured signal, the value of the variable resulting in the maximum correlation value $\rho$ does not change. Accordingly, the calculating section 18 can calculate a solution for the variable that maximizes the correlation value between the ideal signal R and the measured signal Z by using Expression 2, which requires only a small amount of computation.

The derivative of the fraction is expressed below.

$$\frac{\partial}{\partial x}\left(\frac{f(x)}{g(x)}\right) = \frac{\partial f(x)}{\partial x} \cdot \frac{1}{g(x)} - f(x) \cdot \frac{1}{g^2(x)} \frac{\partial g(x)}{\partial x} \quad (3)$$

An equation for which the derivative of the function for ρ' of Expression 2 has a value of 0 is shown below.

$$\frac{\partial \rho'}{\partial \Delta} = \frac{\partial |\sum Z \cdot R^*|^2}{\partial \Delta} \cdot \frac{1}{\sum |R|^2} - |\sum Z \cdot R^*|^2 \cdot \frac{1}{(\sum |R|^2)^2} \cdot \frac{\partial \sum |R|^2}{\partial \Delta} = 0 \quad (4)$$

Accordingly, the calculating section 18 can calculate a solution for the variable that maximizes the correlation value between the ideal signal R and the measured signal Z by solving the equation expressed by Expression 5 below. In Expression 5, $\Delta$ represents the variable.

$$\frac{\partial |\sum Z \cdot R^*|^2}{\partial \Delta} \cdot (\sum |R|^2)^2 = |\sum Z \cdot R^*|^2 \cdot \sum |R|^2 \cdot \frac{\partial \sum |R|^2}{\partial \Delta} \quad (5)$$

The following is a detailed description of an exemplary calculation performed by the calculating section 18 when calculating the gain error of the quadrature demodulator 100.

The measured signal Z, which expresses the signal output from the quadrature demodulator 100 with a real component and an imaginary component, is expressed below in Expression 6. In Expression 6, $C_{re}(k)$ represents the real component of the measured signal Z, $C_{im}(k)$ represents the imaginary component of the measured signal Z, and k represents an arbitrary sampling point in each signal.

$$Z = C_{re}(k) + j \cdot C_{im}(k) \quad (6)$$

The ideal signal R, which includes the gain error as the variable and expresses the measured signal to be output from the quadrature demodulator 100, is expressed in Expression 7 below. In Expression 7, $R_{re}(k)$ represents the real component of the modulated signal under measurement supplied to the quadrature demodulator 100, $R_{im}(k)$ represents the imaginary component of the modulated signal, $\Delta$ represents the gain error, and $\theta_0$ represents a phase difference between a reference signal of the quadrature demodulator 100 and a carrier signal of the modulated signal under measurement supplied to the quadrature demodulator 100.

$$R = R_{re}(k) \cdot \cos\theta_0 - R_{im}(k) \cdot \sin\theta_0 + j \cdot (1+\Delta) \cdot [R_{re}(k) \cdot \sin\theta_0 + R_{im}(k) \cdot \cos\theta_0] \quad (7)$$

Expressions 6 and 7 are substituted into Expression 2, as shown below.

$$\rho' = \frac{|\sum Z \cdot R^*|^2}{\sum |R|^2} \quad (2)$$

The numerator $|\Sigma Z \cdot R^*|^2$ of Expression 2 into which Expressions 6 and 7 are substituted is expressed below in Expression 8.

$$\left|\sum Z \cdot R^*\right|^2 = \left|\sum \left[(C_{re}(k) + j \cdot C_{im}(k)) \cdot \left\{ \begin{array}{l} R_{re}(k) \cdot \cos\theta_0 - R_{im}(k) \cdot \sin\theta_0 - \\ j \cdot (1+\Delta) \cdot [R_{re}(k) \cdot \sin\theta_0 + R_{im}(k) \cdot \cos\theta_0] \end{array} \right\} \right] \right|^2 \quad (8)$$

$$= \left|\sum \begin{bmatrix} C_{re}(k) \cdot R_{re}(k) \cdot \cos\theta_0 - C_{re}(k) \cdot R_{im}(k) \cdot \sin\theta_0 - \\ j \cdot C_{re}(k) \cdot (1+\Delta) \cdot R_{re}(k) \cdot \sin\theta_0 - j \cdot C_{re}(k) \cdot (1+\Delta) \cdot R_{im}(k) \cdot \cos\theta_0 + \\ j \cdot C_{im}(k) \cdot R_{re}(k) \cos\theta_0 - j \cdot C_{im}(k) \cdot R_{im}(k) \sin\theta_0 + \\ C_{im}(k) \cdot (1+\Delta) \cdot R_{re}(k) \cdot \sin\theta_0 + C_{im}(k) \cdot (1+\Delta) \cdot R_{im}(k) \cdot \cos\theta_0 \end{bmatrix}\right|^2$$

$$= \left| \begin{array}{l} \sum C_{re}(k) \cdot R_{re}(k) \cdot \cos\theta_0 - \sum C_{re}(k) \cdot R_{im}(k) \cdot \sin\theta_0 + \\ \sum C_{im}(k) \cdot R_{re}(k) \cdot \sin\theta_0 + \Delta \cdot C_{im}(k) \cdot R_{re}(k) \cdot \sin\theta_0 + \\ \sum C_{im}(k) \cdot R_{im}(k) \cdot \cos\theta_0 + \Delta \cdot C_{im}(k) \cdot R_{im}(k) \cdot \cos\theta_0 - \\ j \cdot \sum C_{re}(k) \cdot R_{re}(k) \cdot \sin\theta_0 - j \cdot \Delta \cdot \sum C_{re}(k) \cdot R_{re}(k) \cdot \sin\theta_0 - \\ j \cdot \sum C_{re}(k) \cdot R_{im}(k) \cdot \cos\theta_0 - j \cdot \Delta \cdot \sum C_{re}(k) \cdot R_{im}(k) \cdot \cos\theta_0 + \\ j \cdot \sum C_{im}(k) \cdot R_{re}(k) \cdot \cos\theta_0 - j \cdot \sum C_{im}(k) \cdot R_{im}(k) \cdot \sin\theta_0 \end{array} \right|^2$$

Here, the expressions are defined as shown in Expression 9 below.

$$f_{re,re} = \Sigma C_{re}(k) \cdot R_{re}(k)$$

$$f_{im,im} = \Sigma C_{im}(k) \cdot R_{im}(k)$$

$$f_{im,re} = \Sigma C_{im}(k) \cdot R_{re}(k)$$

$$f_{re,im} = \Sigma C_{re}(k) \cdot R_{im}(k) \quad (9)$$

Substituting each expression defined in Expression 9 into Expression 8 results in the following expression.

$$\left|\sum Z \cdot R^*\right|^2 = \left| \begin{array}{l} \cos\theta_0 \cdot f_{re,re} - \sin\theta_0 \cdot f_{re,im} + \\ \sin\theta_0 \cdot f_{im,re} + \Delta \cdot \sin\theta_0 \cdot f_{im,re} + \\ \cos\theta_0 \cdot f_{im,im} + \Delta \cdot \cos\theta_0 \cdot f_{im,im} - \\ j \cdot \sin\theta_0 \cdot f_{re,re} - j \cdot \Delta \cdot \sin\theta_0 \cdot f_{re,re} - \\ j \cdot \cos\theta_0 \cdot f_{re,im} - j \cdot \Delta \cdot \cos\theta_0 \cdot f_{re,im} + \\ j \cdot \cos\theta_0 \cdot f_{im,re} - j \cdot \sin\theta_0 \cdot f_{im,im} \end{array} \right|^2 \quad (10)$$

$$= \left( \begin{array}{l} \cos\theta_0 \cdot f_{re,re} - \sin\theta_0 \cdot f_{re,im} + \\ \sin\theta_0 \cdot f_{im,re} + \Delta \cdot \sin\theta_0 \cdot f_{im,re} + \\ \cos\theta_0 \cdot f_{im,im} + \Delta \cdot \cos\theta_0 \cdot f_{im,im} \end{array} \right)^2 +$$

$$\left( \begin{array}{l} -\sin\theta_0 \cdot f_{re,re} - \Delta \cdot \sin\theta_0 \cdot f_{re,re} - \\ \cos\theta_0 \cdot f_{re,im} - \Delta \cdot \cos\theta_0 \cdot f_{re,im} + \\ \cos\theta_0 \cdot f_{im,re} - \sin\theta_0 \cdot f_{im,im} \end{array} \right)^2$$

Expanding this expression results in Expression 11.

$$\left|\sum Z \cdot R^*\right|^2 = \cos\theta_0 \cdot f_{re,re} \cdot \cos\theta_0 \cdot f_{re,re} - \cos\theta_0 \cdot f_{re,re} \cdot \sin\theta_0 \cdot f_{re,im} + \quad (11)$$

$$\cos\theta_0 \cdot f_{re,re} \cdot \sin\theta_0 \cdot f_{im,re} + \cos\theta_0 \cdot f_{re,re} \cdot \Delta \cdot \sin\theta_0 \cdot f_{im,re} +$$

-continued $$\cos\theta_0 \cdot f_{re,re} \cdot \cos\theta_0 \cdot f_{im,im} + \cos\theta_0 \cdot f_{re,re} \cdot \Delta \cdot \cos\theta_0 \cdot f_{im,im} -$$
$$\sin\theta_0 \cdot f_{re,im} \cdot \cos\theta_0 \cdot f_{re,re} + \sin\theta_0 \cdot f_{re,im} \cdot \sin\theta_0 \cdot f_{re,im} -$$
$$\sin\theta_0 \cdot f_{re,im} \cdot \sin\theta_0 \cdot f_{im,re} - \sin\theta_0 \cdot f_{re,im} \cdot \Delta \cdot \sin\theta_0 \cdot f_{im,re} -$$
$$\sin\theta_0 \cdot f_{re,im} \cdot \cos\theta_0 \cdot f_{im,im} - \sin\theta_0 \cdot f_{re,im} \cdot \Delta \cdot \cos\theta_0 \cdot f_{im,im} +$$
$$\sin\theta_0 \cdot f_{im,re} \cdot \cos\theta_0 \cdot f_{re,re} - \sin\theta_0 \cdot f_{im,re} \cdot \sin\theta_0 \cdot f_{re,im} +$$
$$\sin\theta_0 \cdot f_{im,re} \cdot \sin\theta_0 \cdot f_{im,re} + \sin\theta_0 \cdot f_{im,re} \cdot \Lambda \cdot \sin\theta_0 \cdot f_{im,re} +$$
$$\sin\theta_0 \cdot f_{im,re} \cdot \cos\theta_0 \cdot f_{im,im} + \sin\theta_0 \cdot f_{im,re} \cdot \Lambda \cdot \cos\theta_0 \cdot f_{im,im} +$$
$$\Delta \cdot \sin\theta_0 \cdot f_{im,re} \cdot \cos\theta_0 \cdot f_{re,re} - \Delta \cdot \sin\theta_0 \cdot f_{im,re} \cdot \sin\theta_0 \cdot f_{re,im} +$$
$$\Delta \cdot \sin\theta_0 \cdot f_{im,re} \cdot \sin\theta_0 \cdot f_{im,re} + \Delta \cdot \sin\theta_0 \cdot f_{im,re} \cdot \Delta \cdot \sin\theta_0 \cdot f_{im,re} +$$
$$\Delta \cdot \sin\theta_0 \cdot f_{im,re} \cdot \cos\theta_0 \cdot f_{im,im} + \Delta \cdot \sin\theta_0 \cdot f_{im,re} \cdot \Delta \cdot \cos\theta_0 \cdot f_{im,im} +$$
$$\cos\theta_0 \cdot f_{im,im} \cdot \cos\theta_0 \cdot f_{re,re} - \cos\theta_0 \cdot f_{im,im} \cdot \sin\theta_0 \cdot f_{re,im} +$$
$$\cos\theta_0 \cdot f_{im,im} \cdot \sin\theta_0 \cdot f_{im,re} + \cos\theta_0 \cdot f_{im,im} \cdot \Delta \cdot \sin\theta_0 \cdot f_{im,re} +$$
$$\cos\theta_0 \cdot f_{im,im} \cdot \cos\theta_0 \cdot f_{im,im} + \cos\theta_0 \cdot f_{im,im} \cdot \Delta \cdot \cos\theta_0 \cdot f_{im,im} +$$
$$\Delta \cdot \cos\theta_0 \cdot f_{im,im} \cdot \cos\theta_0 \cdot f_{re,re} - \Delta \cdot \cos\theta_0 \cdot f_{im,im} \cdot \sin\theta_0 \cdot f_{re,im} +$$
$$\Delta \cdot \cos\theta_0 \cdot f_{im,im} \cdot \sin\theta_0 \cdot f_{im,re} + \Delta \cdot \cos\theta_0 \cdot f_{im,im} \cdot \Delta \cdot \sin\theta_0 \cdot f_{im,re} +$$
$$\Delta \cdot \cos\theta_0 \cdot f_{im,im} \cdot \cos\theta_0 \cdot f_{im,im} + \Delta \cdot \cos\theta_0 \cdot f_{im,im} \cdot \Delta \cdot \cos\theta_0 \cdot f_{im,im} +$$
$$\sin\theta_0 \cdot f_{re,re} \cdot \sin\theta_0 \cdot f_{re,re} + \sin\theta_0 \cdot f_{re,re} \cdot \Delta \cdot \sin\theta_0 \cdot f_{re,re} +$$
$$\sin\theta_0 \cdot f_{re,re} \cdot \cos\theta_0 \cdot f_{re,im} + \sin\theta_0 \cdot f_{re,re} \cdot \Delta \cdot \cos\theta_0 \cdot f_{re,im} -$$
$$\sin\theta_0 \cdot f_{re,re} \cdot \cos\theta_0 \cdot f_{im,re} + \sin\theta_0 \cdot f_{re,re} \cdot \sin\theta_0 \cdot f_{im,im} +$$
$$\Delta \cdot \sin\theta_0 \cdot f_{re,re} \cdot \Delta \cdot \sin\theta_0 \cdot f_{re,re} + \Delta \cdot \sin\theta_0 \cdot f_{re,re} \cdot \Delta \cdot \sin\theta_0 \cdot f_{re,re} +$$
$$\Delta \cdot \sin\theta_0 \cdot f_{re,re} \cdot \cos\theta_0 \cdot f_{re,im} + \Delta \cdot \sin\theta_0 \cdot f_{re,re} \cdot \Delta \cdot \cos\theta_0 \cdot f_{re,im} -$$
$$\Delta \cdot \sin\theta_0 \cdot f_{re,re} \cdot \cos\theta_0 \cdot f_{im,re} + \Delta \cdot \sin\theta_0 \cdot f_{re,re} \cdot \sin\theta_0 \cdot f_{im,im} +$$
$$\cos\theta_0 \cdot f_{re,im} \cdot \sin\theta_0 \cdot f_{re,re} + \cos\theta_0 \cdot f_{re,im} \cdot \Delta \cdot \sin\theta_0 \cdot f_{re,re} +$$
$$\cos\theta_0 \cdot f_{re,im} \cdot \cos\theta_0 \cdot f_{re,im} + \cos\theta_0 \cdot f_{re,im} \cdot \Delta \cdot \cos\theta_0 \cdot f_{re,im} -$$
$$\cos\theta_0 \cdot f_{re,im} \cdot \cos\theta_0 \cdot f_{im,re} + \cos\theta_0 \cdot f_{re,im} \cdot \sin\theta_0 \cdot f_{im,im} +$$
$$\Delta \cdot \cos\theta_0 \cdot f_{re,im} \cdot \sin\theta_0 \cdot f_{re,re} + \Delta \cdot \cos\theta_0 \cdot f_{re,im} \cdot \Delta \cdot \sin\theta_0 \cdot f_{re,re} +$$
$$\Delta \cdot \cos\theta_0 \cdot f_{re,im} \cdot \cos\theta_0 \cdot f_{re,im} + \Delta \cdot \cos\theta_0 \cdot f_{re,im} \cdot \Delta \cdot \cos\theta_0 \cdot f_{re,im} -$$
$$\Delta \cdot \cos\theta_0 \cdot f_{re,im} \cdot \cos\theta_0 \cdot f_{im,re} + \Delta \cdot \cos\theta_0 \cdot f_{re,im} \cdot \sin\theta_0 \cdot f_{im,im} -$$
$$\cos\theta_0 \cdot f_{im,re} \cdot \sin\theta_0 \cdot f_{re,re} - \cos\theta_0 \cdot f_{im,re} \cdot \Delta \cdot \sin\theta_0 \cdot f_{re,re} -$$
$$\cos\theta_0 \cdot f_{im,re} \cdot \cos\theta_0 \cdot f_{re,im} - \cos\theta_0 \cdot f_{im,re} \cdot \Delta \cdot \cos\theta_0 \cdot f_{re,im} +$$
$$\cos\theta_0 \cdot f_{im,re} \cdot \cos\theta_0 \cdot f_{im,re} - \cos\theta_0 \cdot f_{im,re} \cdot \sin\theta_0 \cdot f_{im,im} +$$
$$\sin\theta_0 \cdot f_{im,im} \cdot \sin\theta_0 \cdot f_{re,re} + \sin\theta_0 \cdot f_{im,im} \cdot \Delta \cdot \sin\theta_0 \cdot f_{re,re} +$$
$$\sin\theta_0 \cdot f_{im,im} \cdot \cos\theta_0 \cdot f_{re,im} + \sin\theta_0 \cdot f_{im,im} \cdot \Delta \cdot \cos\theta_0 \cdot f_{re,im} -$$
$$\sin\theta_0 \cdot f_{im,im} \cdot \cos\theta_0 \cdot f_{im,re} + \sin\theta_0 \cdot f_{im,im} \cdot \sin\theta_0 \cdot f_{im,im}$$

Simplifying the constant terms of the variable $\Delta$ in Expression 11 results in the expression below.

$$\cos\theta_0 \cdot f_{re,re} \cdot \cos\theta_0 \cdot f_{re,re} - \cos\theta_0 \cdot f_{re,re} \cdot \sin\theta_0 \cdot f_{re,im} + \qquad (12)$$
$$\cos\theta_0 \cdot f_{re,re} \cdot \sin\theta_0 \cdot f_{im,re} + \cos\theta_0 \cdot f_{re,re} \cdot \cos\theta_0 \cdot f_{im,im} -$$
$$\sin\theta_0 \cdot f_{re,im} \cdot \cos\theta_0 \cdot f_{re,re} + \sin\theta_0 \cdot f_{re,im} \cdot \sin\theta_0 \cdot f_{re,im} -$$
$$\sin\theta_0 \cdot f_{re,im} \cdot \sin\theta_0 \cdot f_{im,re} - \sin\theta_0 \cdot f_{re,im} \cdot \cos\theta_0 \cdot f_{im,im} +$$
$$\sin\theta_0 \cdot f_{im,re} \cdot \cos\theta_0 \cdot f_{re,re} - \sin\theta_0 \cdot f_{im,re} \cdot \sin\theta_0 \cdot f_{re,im} +$$
$$\sin\theta_0 \cdot f_{im,re} \cdot \sin\theta_0 \cdot f_{im,re} + \sin\theta_0 \cdot f_{im,re} \cdot \cos\theta_0 \cdot f_{im,im} +$$
$$\cos\theta_0 \cdot f_{im,im} \cdot \cos\theta_0 \cdot f_{re,re} - \cos\theta_0 \cdot f_{im,im} \cdot \sin\theta_0 \cdot f_{re,im} +$$
$$\cos\theta_0 \cdot f_{im,im} \cdot \sin\theta_0 \cdot f_{im,re} + \cos\theta_0 \cdot f_{im,im} \cdot \cos\theta_0 \cdot f_{im,im} +$$
$$\sin\theta_0 \cdot f_{re,re} \cdot \sin\theta_0 \cdot f_{re,re} + \sin\theta_0 \cdot f_{re,re} \cdot \cos\theta_0 \cdot f_{re,im} -$$
$$\sin\theta_0 \cdot f_{re,re} \cdot \cos\theta_0 \cdot f_{im,re} + \sin\theta_0 \cdot f_{re,re} \cdot \sin\theta_0 \cdot f_{im,im} +$$
$$\cos\theta_0 \cdot f_{re,im} \cdot \sin\theta_0 \cdot f_{re,re} + \cos\theta_0 \cdot f_{re,im} \cdot \cos\theta_0 \cdot f_{re,im} -$$
$$\cos\theta_0 \cdot f_{re,im} \cdot \cos\theta_0 \cdot f_{im,re} + \cos\theta_0 \cdot f_{re,im} \cdot \sin\theta_0 \cdot f_{im,im} -$$
$$\cos\theta_0 \cdot f_{im,re} \cdot \sin\theta_0 \cdot f_{re,re} - \cos\theta_0 \cdot f_{im,re} \cdot \cos\theta_0 \cdot f_{re,im} +$$
$$\cos\theta_0 \cdot f_{im,re} \cdot \cos\theta_0 \cdot f_{im,re} - \cos\theta_0 \cdot f_{im,re} \cdot \sin\theta_0 \cdot f_{im,im} +$$
$$\sin\theta_0 \cdot f_{im,im} \cdot \sin\theta_0 \cdot f_{re,re} + \sin\theta_0 \cdot f_{im,im} \cdot \cos\theta_0 \cdot f_{re,im} -$$
$$\sin\theta_0 \cdot f_{im,im} \cdot \cos\theta_0 \cdot f_{im,re} + \sin\theta_0 \cdot f_{im,im} \cdot \sin\theta_0 \cdot f_{im,im} =$$
$$f_{re,re} \cdot f_{re,re} + 2 \cdot f_{re,re} \cdot f_{im,im} + f_{re,im} \cdot f_{re,im} -$$
$$2 \cdot f_{re,im} \cdot f_{im,re} + f_{im,re} \cdot f_{im,re} + f_{im,im} \cdot f_{im,im}$$

Simplifying the first-order terms of the variable $\Delta$ in Expression 11 results in the following expression.

$$\cos\theta_0 \cdot f_{re,re} \cdot \Delta \cdot \sin\theta_0 \cdot f_{im,re} + \cos\theta_0 \cdot f_{re,re} \cdot \Delta \cdot \cos\theta_0 \cdot f_{im,im} - \qquad (13)$$
$$\sin\theta_0 \cdot f_{re,im} \cdot \Delta \cdot \sin\theta_0 \cdot f_{im,re} - \sin\theta_0 \cdot f_{re,im} \cdot \Delta \cdot \cos\theta_0 \cdot f_{im,im} +$$
$$\sin\theta_0 \cdot f_{im,re} \cdot \Delta \cdot \sin\theta_0 \cdot f_{im,re} + \sin\theta_0 \cdot f_{im,re} \cdot \Delta \cdot \cos\theta_0 \cdot f_{im,im} +$$
$$\Delta \cdot \sin\theta_0 \cdot f_{im,re} \cdot \cos\theta_0 \cdot f_{re,re} - \Delta \cdot \sin\theta_0 \cdot f_{im,re} \cdot \sin\theta_0 \cdot f_{re,im} +$$
$$\Delta \cdot \sin\theta_0 \cdot f_{im,re} \cdot \sin\theta_0 \cdot f_{im,re} + \Delta \cdot \sin\theta_0 \cdot f_{im,re} \cdot \cos\theta_0 \cdot f_{im,im} +$$
$$\cos\theta_0 \cdot f_{im,im} \cdot \Delta \cdot \sin\theta_0 \cdot f_{im,re} + \cos\theta_0 \cdot f_{im,im} \cdot \Delta \cdot \cos\theta_0 \cdot f_{im,im} +$$
$$\Delta \cdot \cos\theta_0 \cdot f_{im,im} \cdot \cos\theta_0 \cdot f_{re,re} - \Delta \cdot \cos\theta_0 \cdot f_{im,im} \cdot \sin\theta_0 \cdot f_{re,im} +$$
$$\Delta \cdot \cos\theta_0 \cdot f_{im,im} \cdot \sin\theta_0 \cdot f_{im,re} + \Delta \cdot \cos\theta_0 \cdot f_{im,im} \cdot \cos\theta_0 \cdot f_{im,im} +$$
$$\sin\theta_0 \cdot f_{re,re} \cdot \Delta \cdot \sin\theta_0 \cdot f_{re,re} + \sin\theta_0 \cdot f_{re,re} \cdot \Delta \cdot \cos\theta_0 \cdot f_{re,im} +$$
$$\Delta \cdot \sin\theta_0 \cdot f_{re,re} \cdot \sin\theta_0 \cdot f_{re,re} + \Delta \cdot \sin\theta_0 \cdot f_{re,re} \cdot \cos\theta_0 \cdot f_{re,im} -$$
$$\Delta \cdot \sin\theta_0 \cdot f_{re,re} \cdot \cos\theta_0 \cdot f_{im,re} + \Delta \cdot \sin\theta_0 \cdot f_{re,re} \cdot \sin\theta_0 \cdot f_{im,im} +$$
$$\cos\theta_0 \cdot f_{re,im} \cdot \Delta \cdot \sin\theta_0 \cdot f_{re,re} + \cos\theta_0 \cdot f_{re,im} \cdot \Delta \cdot \cos\theta_0 \cdot f_{re,im} +$$
$$\Delta \cdot \cos\theta_0 \cdot f_{re,im} \cdot \sin\theta_0 \cdot f_{re,re} + \Delta \cdot \cos\theta_0 \cdot f_{re,im} \cdot \cos\theta_0 \cdot f_{re,im} -$$
$$\Delta \cdot \cos\theta_0 \cdot f_{re,im} \cdot \cos\theta_0 \cdot f_{im,re} + \Delta \cdot \cos\theta_0 \cdot f_{re,im} \cdot \sin\theta_0 \cdot f_{im,im} -$$
$$\cos\theta_0 \cdot f_{im,re} \cdot \Delta \cdot \sin\theta_0 \cdot f_{re,re} - \cos\theta_0 \cdot f_{im,re} \cdot \Delta \cdot \cos\theta_0 \cdot f_{re,im} +$$
$$\sin\theta_0 \cdot f_{im,im} \cdot \Delta \cdot \sin\theta_0 \cdot f_{re,re} + \sin\theta_0 \cdot f_{im,im} \cdot \Delta \cdot \cos\theta_0 \cdot f_{re,im} =$$
$$2 \cdot f_{re,re} \cdot \Delta \cdot f_{im,im} - 2 \cdot f_{re,im} \cdot \Delta \cdot f_{im,re} +$$
$$2 \cdot \sin\theta_0 \cdot f_{im,re} \cdot \Delta \cdot \sin\theta_0 \cdot f_{im,re} + 4 \cdot \sin\theta_0 \cdot f_{im,re} \cdot \Delta \cdot \cos\theta_0 \cdot f_{im,im} +$$
$$2 \cdot \cos\theta_0 \cdot f_{im,im} \cdot \Delta \cdot \cos\theta_0 \cdot f_{im,im} + 2 \cdot \sin\theta_0 \cdot f_{re,re} \cdot \Delta \cdot \sin\theta_0 \cdot f_{re,re} +$$
$$4 \cdot \sin\theta_0 \cdot f_{re,re} \cdot \Delta \cdot \cos\theta_0 \cdot f_{re,im} + 2 \cdot \cos\theta_0 \cdot f_{re,im} \cdot \Delta \cdot \cos\theta_0 \cdot f_{re,im}$$

Simplifying the second-order terms of the variable $\Delta$ in Expression 11 results in the following expression.

$$\Delta \cdot \sin\theta_0 \cdot f_{im,re} \cdot \Delta \cdot \sin\theta_0 \cdot f_{im,re} + \qquad (14)$$
$$\Delta \cdot \sin\theta_0 \cdot f_{im,re} \cdot \Delta \cdot \cos\theta_0 \cdot f_{im,im} + \Delta \cdot \cos\theta_0 \cdot f_{im,im} \cdot \Delta \cdot \sin\theta_0 \cdot f_{im,re} +$$
$$\Delta \cdot \cos\theta_0 \cdot f_{im,im} \cdot \Delta \cdot \cos\theta_0 \cdot f_{im,im} +$$

-continued $$\Delta \cdot \sin\theta_0 \cdot f_{re,re} \cdot \Delta \cdot \sin\theta_0 \cdot f_{re,re} + \Delta \cdot \sin\theta_0 \cdot f_{re,re} \cdot \Delta \cdot \cos\theta_0 \cdot f_{re,im} +$$

$$\Delta \cdot \cos\theta_0 \cdot f_{re,im} \cdot \Delta \cdot \sin\theta_0 \cdot f_{re,re} + \Delta \cdot \cos\theta_0 \cdot f_{re,im} \cdot \Delta \cdot \cos\theta_0 \cdot f_{re,im} =$$

$$\Delta \cdot \sin\theta_0 \cdot f_{im,re} \cdot \Delta \cdot \sin\theta_0 \cdot f_{im,re} + 2 \cdot \Delta \cdot \sin\theta_0 \cdot f_{im,re} \cdot \Delta \cdot \cos\theta_0 \cdot f_{im,im} +$$

$$\Delta \cdot \cos\theta_0 \cdot f_{im,im} \cdot \Delta \cdot \cos\theta_0 \cdot f_{im,im} +$$

$$\Delta \cdot \sin\theta_0 \cdot f_{re,re} \cdot \Delta \cdot \sin\theta_0 \cdot f_{re,re} + 2 \cdot \Delta \cdot \sin\theta_0 \cdot f_{re,re} \cdot \Delta \cdot \cos\theta_0 \cdot f_{re,im} + \cdot \Delta \cdot \cos\theta_0 \cdot f_{re,im} \cdot \Delta \cdot \cos\theta_0 \cdot f_{re,im}$$

Based on the above, when calculating the gain error of the quadrature demodulator 100, the numerator $|\Sigma Z \cdot R^*|^2$ of Expression 2 representing the correlation value ρ between the ideal signal R and the measured signal Z can be expressed by Expression 15 below.

$$\left|\sum Z \cdot R^*\right|^2 = f_{re,re} \cdot f_{re,re} + 2 \cdot f_{re,re} \cdot f_{im,im} + f_{re,im} \cdot f_{re,im} - 2 \cdot f_{re,im} \cdot f_{im,re} + f_{im,re} \cdot f_{im,re} + f_{im,im} \cdot f_{im,im} + \quad (15)$$

$$2 \cdot f_{re,re} \cdot \Delta \cdot f_{im,im} - 2 \cdot f_{re,im} \cdot \Delta \cdot f_{im,re} +$$

$$2 \cdot \sin\theta_0 \cdot f_{im,re} \cdot \Delta \cdot \sin\theta_0 \cdot f_{im,re} + 4 \cdot \sin\theta_0 \cdot f_{im,re} \cdot \Delta \cdot \cos\theta_0 \cdot f_{im,im} +$$

$$2 \cdot \cos\theta_0 \cdot f_{im,im} \cdot \Delta + \cos\theta_0 \cdot f_{im,im} + 2 \cdot \sin\theta_0 \cdot f_{re,re} \cdot \Delta \cdot \sin\theta_0 \cdot f_{re,re} +$$

$$4 \cdot \sin\theta_0 \cdot f_{re,re} \cdot \Delta \cdot \cos\theta_0 \cdot f_{re,im} + 2 \cdot \cos\theta_0 \cdot f_{re,im} \cdot \Delta \cdot \cos\theta_0 \cdot f_{re,im} +$$

$$\Delta \cdot \sin\theta_0 \cdot f_{im,re} \cdot \Delta \cdot \sin\theta_0 \cdot f_{im,re} + 2 \cdot \sin\theta_0 \cdot f_{im,re} \cdot \Delta \cdot \cos\theta_0 \cdot f_{im,im} +$$

$$\Delta \cdot \cos\theta_0 \cdot f_{im,im} \cdot \Delta \cdot \cos\theta_0 \cdot f_{im,im} +$$

$$\Delta \cdot \sin\theta_0 \cdot f_{re,re} \cdot \Delta \cdot \sin\theta_0 \cdot f_{re,re} + 2 \cdot \Delta \cdot \sin\theta_0 \cdot f_{re,re} \cdot \Delta \cdot \cos\theta_0 \cdot f_{re,im} +$$

$$\Delta \cdot \cos\theta_0 \cdot f_{re,im} \cdot \Delta \cdot \cos\theta_0 \cdot f_{re,im}$$

$$= f_{re,re} \cdot f_{re,re} + 2 \cdot f_{re,re} \cdot f_{im,im} + f_{re,im} \cdot f_{re,im} - 2 \cdot f_{re,im} \cdot f_{im,re} + f_{im,re} \cdot f_{im,re} + f_{im,im} \cdot f_{im,im} +$$

$$\Delta \cdot \begin{pmatrix} 2 \cdot f_{re,re} \cdot \Delta \cdot f_{im,im} - 2 \cdot f_{re,im} \cdot \Delta \cdot f_{im,re} + \\ 2 \cdot \sin\theta_0 \cdot f_{im,re} \cdot \sin\theta_0 \cdot f_{im,re} + 4 \cdot \sin\theta_0 \cdot f_{im,re} \cdot \cos\theta_0 \cdot f_{im,im} + \\ 2 \cdot \cos\theta_0 \cdot f_{im,im} \cdot \cos\theta_0 \cdot f_{im,im} + 2 \cdot \sin\theta_0 \cdot f_{re,re} \cdot \sin\theta_0 \cdot f_{re,re} + \\ 4 \cdot \sin\theta_0 \cdot f_{re,re} \cdot \cos\theta_0 \cdot f_{re,im} + 2 \cdot \cos\theta_0 \cdot f_{re,im} \cdot \cos\theta_0 \cdot f_{re,im} \end{pmatrix} +$$

$$\Delta^2 \cdot \begin{pmatrix} \sin\theta_0 \cdot f_{im,re} \cdot \sin\theta_0 \cdot f_{im,re} + 2 \cdot \sin\theta_0 \cdot f_{im,re} \cdot \cos\theta_0 \cdot f_{im,im} + \\ \cos\theta_0 \cdot f_{im,im} \cdot \cos\theta_0 \cdot f_{im,im} + \sin\theta_0 \cdot f_{re,re} \cdot \sin\theta_0 \cdot f_{re,re} + \\ 2 \cdot \sin\theta_0 \cdot f_{re,re} \cdot \cos\theta_0 \cdot f_{re,im} + \cos\theta_0 \cdot f_{re,im} \cdot \cos\theta_0 \cdot f_{re,im} \end{pmatrix}$$

The denominator $\Sigma |R|^2$ of Expression 2 into which Expressions 6 and 7 are substituted is expressed by Expression 16 below.

$$\sum |R|^2 = \sum \left\{ R_{re}(k) \cdot \cos\theta_0 - R_{im}(k) \cdot \sin\theta_0 + j \cdot (1 + \Delta) \cdot [R_{re}(k) \cdot \sin\theta_0 + R_{im}(k) \cdot \cos\theta_0] \right\}^2 \quad (16)$$

$$= \sum \{(R_{re}(k) \cdot \cos\theta_0 - R_{im}(k) \cdot \sin\theta_0)^2 + (1 + \Delta)^2 \cdot [R_{re}(k) \cdot \sin\theta_0 + R_{im}(k) \cdot \cos\theta_0]^2\}$$

$$= \sum \begin{Bmatrix} R_{re}(k) \cdot \cos\theta_0 \cdot R_{re}(k) \cdot \cos\theta_0 - 2 \cdot R_{re}(k) \cdot \cos\theta_0 \cdot R_{im}(k) \cdot \sin\theta_0 \cdot R_{im}(k) \cdot \sin\theta_0 \cdot R_{im}(k) \cdot \sin\theta_0 + \\ R_{re}(k) \cdot \sin\theta_0 \cdot R_{re}(k) \cdot \sin\theta_0 + 2 \cdot R_{re}(k) \cdot \sin\theta_0 \cdot R_{im}(k) \cdot \cos\theta_0 + R_{im}(k) \cdot \cos\theta_0 \cdot R_{im}(k) \cdot \cos\theta_0 + \\ 2 \cdot \Delta \cdot R_{re}(k) \cdot \sin\theta_0 \cdot R_{re}(k) \cdot \sin\theta_0 + 2 \cdot \Delta \cdot 2 \cdot R_{re}(k) \cdot \sin\theta_0 \cdot R_{im}(k) \cdot \cos\theta_0 + \\ 2 \cdot \Delta \cdot R_{im}(k) \cdot \cos\theta_0 \cdot R_{im}(k) \cdot \cos\theta_0 + \\ \Delta^2 \cdot R_{re}(k) \cdot \sin\theta_0 \cdot R_{re}(k) \cdot \sin\theta_0 + \Delta^2 \cdot R_{re}(k) \cdot \sin\theta_0 \cdot R_{im}(k) \cdot \cos\theta_0 + \\ \Delta^2 \cdot R_{im}(k) \cdot \cos\theta_0 \cdot R_{im}(k) \cdot \cos\theta_0 \end{Bmatrix}$$

$$= \sum R_{re}(k) \cdot R_{re}(k) + \sum R_{im}(k) \cdot R_{im}(k) +$$

$$2 \cdot \Delta \cdot \sin\theta_0 \cdot \sin\theta_0 \cdot \sum R_{re}(k) \cdot R_{re}(k) + 4 \cdot \Delta \cdot \sin\theta_0 \cdot \cos\theta_0 \cdot \sum R_{re}(k) \cdot R_{im}(k) +$$

$$2 \cdot \Delta \cdot \cos\theta_0 \cdot \cos\theta_0 \cdot \sum R_{im}(k) \cdot R_{im}(k) +$$
$$\Delta^2 \cdot \sin\theta_0 \cdot \sin\theta_0 \cdot \sum R_{re}(k) \cdot R_{re}(k) + 2 \cdot \Delta^2 \cdot \sin\theta_0 \cdot \cos\theta_0 \cdot \sum R_{re}(k) \cdot R_{im}(k) +$$
$$\Delta^2 \cdot \cos\theta_0 \cdot \cos\theta_0 \cdot \sum R_{im}(k) \cdot R_{im}(k)$$

Here, the expressions are defined as shown in Expression 17.

$$g_{re,re} = \Sigma R_{re}(k) \cdot R_{re}(k)$$
$$g_{im,im} = \Sigma R_{im}(k) \cdot R_{im}(k)$$
$$g_{im,re} = \Sigma R_{im}(k) \cdot R_{re}(k)$$
$$g_{re,im} = \Sigma R_{re}(k) \cdot R_{im}(k) \quad (17)$$

Each expression defined in Expression 17 is substituted into Expression 16 to achieve Expression 18 below. In other words, when calculating the gain error of the quadrature demodulator 100, the denominator $\Sigma|R|^2$ of Expression 2 representing the correlation value ρ between the ideal signal R and the measured signal Z can be expressed by Expression 18.

$$\sum |R|^2 = \qquad (18)$$
$$g_{re,re} + g_{im,im} + 2 \cdot \Delta \cdot \sin\theta_0 \cdot \sin\theta_0 \cdot g_{re,re} + 4 \cdot \Delta \cdot \sin\theta_0 \cdot \cos\theta_0 \cdot g_{re,im} +$$
$$2 \cdot \Delta \cdot \cos\theta_0 \cdot \cos\theta_0 \cdot g_{im,im} + \Delta^2 \cdot \sin\theta_0 \cdot \sin\theta_0 \cdot g_{re,re} +$$
$$2 \cdot \Delta^2 \cdot \sin\theta_0 \cdot \cos\theta_0 \cdot g_{re,im} + \Delta^2 \cdot \cos\theta_0 \cdot \cos\theta_0 \cdot g_{im,im} =$$
$$g_{re,re} + g_{im,im} + \Delta \cdot (2 \cdot \sin\theta_0 \cdot \sin\theta_0 \cdot g_{re,re} + 4 \cdot \sin\theta_0 \cdot \cos\theta_0 \cdot g_{re,im} +$$
$$2 \cdot \cos\theta_0 \cdot \cos\theta_0 \cdot g_{im,im}) + \Delta^2 \cdot (\sin\theta_0 \cdot \sin\theta_0 \cdot g_{re,re} +$$
$$2 \cdot \sin\theta_0 \cdot \cos\theta_0 \cdot g_{re,im} + \cos\theta_0 \cdot \cos\theta_0 \cdot g_{im,im})$$

Next, Expressions 15 and 18 are substituted into Expression 5, which represents an equation for which the derivative of the function ρ' is 0.

$$\frac{\partial |\sum Z \cdot R^*|^2}{\partial \Delta} \cdot \left(\sum |R|^2\right)^2 = \left|\sum Z \cdot R^*\right|^2 \cdot \sum |R|^2 \cdot \frac{\partial \sum |R|^2}{\partial \Delta} \quad (5)$$

Each expression on the left side of Expression 5 into which Expressions 15 and 18 are substituted is expressed by Expressions—19-1 and 19-2 below.

$$\frac{\partial |\sum Z \cdot R^*|^2}{\partial \Delta} = \begin{pmatrix} 2 \cdot f_{re,re} \cdot f_{im,im} - 2 \cdot f_{re,im} \cdot f_{im,re} + \\ 2 \cdot \sin\theta_0 \cdot f_{im,re} \cdot \sin\theta_0 \cdot f_{im,re} + 4 \cdot \sin\theta_0 \cdot f_{im,re} \cdot \cos\theta_0 \cdot f_{im,im} + \\ 2 \cdot \cos\theta_0 \cdot f_{im,im} \cdot \cos\theta_0 \cdot f_{im,im} + 2 \cdot \sin\theta_0 \cdot f_{re,re} \cdot \sin\theta_0 \cdot f_{re,re} + \\ 4 \cdot \sin\theta_0 \cdot f_{re,re} \cdot \cos\theta_0 \cdot f_{re,im} + 2 \cdot \cos\theta_0 \cdot f_{re,im} \cdot \cos\theta_0 \cdot f_{re,im} \end{pmatrix} + \quad (19\text{-}1)$$
$$2 \cdot \Delta \cdot \begin{pmatrix} \sin\theta_0 \cdot f_{im,re} \cdot \sin\theta_0 \cdot f_{im,re} + 2 \cdot \sin\theta_0 \cdot f_{im,re} \cdot \cos\theta_0 \cdot f_{im,im} + \\ \cos\theta_0 \cdot f_{im,im} \cdot \cos\theta_0 \cdot f_{im,im} + \sin\theta_0 \cdot f_{re,re} \cdot \sin\theta_0 \cdot f_{re,re} + \\ 2 \cdot \sin\theta_0 \cdot f_{re,re} \cdot \cos\theta_0 \cdot f_{re,im} + \cos\theta_0 \cdot f_{re,im} \cdot \cos\theta_0 \cdot f_{re,im} \end{pmatrix}$$

$$\left(\sum |R|^2\right)^2 = \begin{bmatrix} g_{re,re} + g_{im,im} + \\ \Delta \cdot (2 \cdot \sin\theta_0 \cdot \sin\theta_0 \cdot g_{re,re} + 4 \cdot \sin\theta_0 \cdot \cos\theta_0 \cdot g_{re,im} + 2 \cdot \cos\theta_0 \cdot \cos\theta_0 \cdot g_{im,im}) + \\ \Delta^2 \cdot (\sin\theta_0 \cdot \sin\theta_0 \cdot g_{re,re} + 2 \cdot \sin\theta_0 \cdot \cos\theta_0 \cdot g_{re,im} + \cos\theta_0 \cdot \cos\theta_0 \cdot g_{re,im}) \end{bmatrix}^2 \quad (19\text{-}2)$$

Here, the expressions are defined as shown in Expression 20.

$$h_1 = 2 \cdot f_{re,re} \cdot f_{im,im} - 2 \cdot f_{re,im} \cdot f_{im,re} + \quad (20)$$
$$2 \cdot \sin\theta_0 \cdot f_{im,re} \cdot \sin\theta_0 \cdot f_{im,re} + 4 \cdot \sin\theta_0 \cdot f_{im,re} \cdot \cos\theta_0 \cdot f_{im,im} +$$
$$2 \cdot \cos\theta_0 \cdot f_{im,im} \cdot \cos\theta_0 \cdot f_{im,im} + 2 \cdot \sin\theta_0 \cdot f_{re,re} \cdot \sin\theta_0 \cdot f_{re,re} +$$
$$4 \cdot \sin\theta_0 \cdot f_{re,re} \cdot \cos\theta_0 \cdot f_{re,im} + 2 \cdot \cos\theta_0 \cdot f_{re,im} \cdot \cos\theta_0 \cdot f_{re,im}$$

$$h_2 = \sin\theta_0 \cdot f_{im,re} \cdot \sin\theta_0 \cdot f_{im,re} + 2 \cdot \sin\theta_0 \cdot f_{im,re} \cdot \cos\theta_0 \cdot f_{im,im} +$$
$$\cos\theta_0 \cdot f_{im,im} \cdot \cos\theta_0 \cdot f_{im,im} + \sin\theta_0 \cdot f_{re,re} \cdot \sin\theta_0 \cdot f_{re,re} +$$
$$2 \cdot \sin\theta_0 \cdot f_{re,re} \cdot \cos\theta_0 \cdot f_{re,im} + \cos\theta_0 \cdot f_{re,im} \cdot \cos\theta_0 \cdot f_{re,im}$$

$$h_3 = g_{re,re} + g_{im,im}$$

$$h_4 = 2 \cdot \sin\theta_0 \cdot \sin\theta_0 \cdot g_{re,re} +$$
$$4 \cdot \sin\theta_0 \cdot \cos\theta_0 \cdot g_{re,im} + 2 \cdot \cos\theta_0 \cdot \cos\theta_0 \cdot g_{im,im}$$

$$h_5 = \sin\theta_0 \cdot \sin\theta_0 \cdot g_{re,re} + 2 \cdot \sin\theta_0 \cdot \cos\theta_0 \cdot g_{re,im} + \cos\theta_0 \cdot \cos\theta_0 \cdot g_{im,im}$$

Each expression defined in Expression 20 is substituted into Expressions 19-1 and 19-2 to achieve the following expression.

$$\frac{\partial |\sum Z \cdot R^*|^2}{\partial \Delta} = h_1 + 2 \cdot \Delta \cdot h_2 \quad (21)$$
$$\left(\sum |R|^2\right)^2 = (h_3 + \Delta \cdot h_4 + \Delta^2 \cdot h_5)^2$$

Accordingly, the left side of Expression 5 into which Expressions 15 and 18 are substituted is expressed by Expression 22 below.

$$\frac{\partial \left|\sum Z \cdot R^*\right|^2}{\partial \Delta} \cdot \left(\sum |R|^2\right)^2 = (h_1 + 2 \cdot \Delta \cdot h_2) \cdot (h_3 \cdot \Delta \cdot h_4 + \Delta^2 \cdot h_5) \cdot (h_3 \cdot \Delta \cdot h_4 + \Delta^2 \cdot h_5) \qquad (22)$$

$$= (h_1 + 2 \cdot \Delta \cdot h_2) \cdot \begin{pmatrix} h_3 \cdot h_3 \cdot h_3 \cdot \Delta \cdot h_4 + h_3 \cdot \Delta^2 \cdot h_5 + \\ \Delta \cdot h_4 \cdot h_3 + \Delta \cdot h_4 \cdot \Delta \cdot h_4 + \Delta \cdot h_4 \cdot \Delta^2 \cdot h_5 + \\ \Delta^2 \cdot h_5 \cdot h_3 \cdot \Delta^2 \cdot h_5 \cdot \Delta \cdot h_4 + \Delta^2 \cdot h_5 \cdot \Delta^2 \cdot h_5 \end{pmatrix}$$

$$= \begin{pmatrix} h_1 \cdot h_3 \cdot h_3 + h_1 \cdot h_3 \cdot \Delta \cdot h_4 + h_1 \cdot h_3 \cdot \Delta^2 \cdot h_5 + \\ h_1 \cdot \Delta \cdot h_4 \cdot h_3 + h_1 \cdot \Delta \cdot h_4 \cdot \Delta \cdot h_4 + h_1 \cdot \Delta \cdot h_4 \cdot \Delta^2 \cdot h_5 + \\ h_1 \cdot \Delta^2 \cdot h_5 \cdot h_3 + h_1 \cdot \Delta^2 \cdot h_5 \cdot \Delta \cdot h_4 + h_1 \cdot \Delta^2 \cdot h_5 \cdot \Delta^2 \cdot h_5 \end{pmatrix} +$$

$$\begin{pmatrix} 2 \cdot \Delta \cdot h_2 \cdot h_3 \cdot h_3 + 2 \cdot \Delta \cdot h_2 \cdot h_3 \cdot \Delta \cdot h_4 + 2 \cdot \Delta \cdot h_2 \cdot h_3 \cdot \Delta^2 \cdot h_5 + \\ 2 \cdot \Delta \cdot h_2 \cdot \Delta \cdot h_4 \cdot h_3 + 2 \cdot \Delta \cdot h_2 \cdot \Delta \cdot h_4 \cdot \Delta \cdot h_4 + 2 \cdot \Delta \cdot h_2 \cdot \Delta \cdot h_4 \cdot \Delta^2 \cdot h_5 + \\ 2 \cdot \Delta \cdot h_2 \cdot \Delta^2 \cdot h_5 \cdot h_3 + 2 \cdot \Delta \cdot h_2 \cdot \Delta^2 \cdot h_5 \cdot \Delta \cdot h_4 + 2 \cdot \Delta \cdot h_2 \cdot \Delta^2 \cdot h_5 \cdot \Delta^2 \cdot h_5 \end{pmatrix}$$

Simplifying each order of terms of the variable $\Delta$ in Expression 22 results in Expression 23.

$$\frac{\partial \left|\sum Z \cdot R^*\right|^2}{\partial \Delta} \cdot \left(\sum |R|^2\right)^2 = \qquad (23)$$
$$h_1 \cdot h_3 \cdot h_3 + \Delta \cdot (h_1 \cdot h_3 \cdot h_4 + h_1 \cdot h_4 \cdot h_3 + 2 \cdot h_2 \cdot h_3 \cdot h_3) +$$
$$\Delta^2 \cdot (h_1 \cdot h_3 \cdot h_5 + h_1 \cdot h_4 \cdot h_4 + h_1 \cdot h_5 \cdot h_3 + 2 \cdot h_2 \cdot h_3 \cdot h_4 +$$

-continued
$$2 \cdot h_2 \cdot h_4 \cdot h_3) + \Delta^3 \cdot (h_1 \cdot h_4 \cdot h_5 + h_1 \cdot h_5 \cdot h_4 +$$
$$2 \cdot h_2 \cdot h_3 \cdot h_5 + 2 \cdot h_2 \cdot h_4 \cdot h_4 + 2 \cdot h_2 \cdot h_5 \cdot h_3) +$$
$$\Delta^4 \cdot (h_1 \cdot h_5 \cdot h_5 + 2 \cdot h_2 \cdot h_4 \cdot h_5 + 2 \cdot h_2 \cdot h_5 \cdot h_4) + \Delta^5 \cdot (2 \cdot h_1 \cdot h_5 \cdot h_5)$$

Terms of a third-order or higher of the variable $\Delta$ are removed from Expression 23 to achieve a second-order equation expressed by Expression 24.

$$\frac{\partial \left|\sum Z \cdot R^*\right|^2}{\partial \Delta} \cdot \left(\sum |R|^2\right)^2 \cong \qquad (24)$$
$$h_1 \cdot h_3 \cdot h_3 + \Delta \cdot (2 \cdot h_1 \cdot h_3 \cdot h_4 + 2 \cdot h_2 \cdot h_3 \cdot h_3) +$$
$$\Delta^2 \cdot (2 \cdot h_1 \cdot h_3 \cdot h_5 + h_1 \cdot h_4 \cdot h_4 + 4 \cdot h_2 \cdot h_3 \cdot h_4)$$

Each expression on the right side of Expression 5 of into which Expressions 15 and 18 are substituted is expressed by Expressions—25-1, 25-2, and 25-3.

$$\left|\sum Z \cdot R^*\right|^2 = f_{re,re} \cdot f_{re,re} + 2 \cdot f_{re,re} \cdot f_{im,im} + f_{re,im} \cdot f_{re,im} - 2 \cdot f_{re,im} \cdot f_{im,re} + f_{im,re} \cdot f_{im,re} + f_{im,im} \cdot f_{im,im} + \qquad (25\text{-}1)$$

$$\Delta \cdot \begin{pmatrix} 2 \cdot f_{re,re} \cdot f_{im,im} - 2 \cdot f_{re,im} \cdot f_{im,re} + \\ 2 \cdot \sin\theta_0 \cdot f_{im,re} \cdot \sin\theta_0 \cdot f_{im,re} + 4 \cdot \sin\theta_0 \cdot f_{im,re} \cdot \cos\theta_0 \cdot f_{im,im} + \\ 2 \cdot \cos\theta_0 \cdot f_{im,im} \cdot \cos\theta_0 \cdot f_{im,im} + 2 \cdot \sin\theta_0 \cdot f_{re,re} \cdot \sin\theta_0 \cdot f_{re,re} + \\ 4 \cdot \sin\theta_0 \cdot f_{re,re} \cdot \cos\theta_0 \cdot f_{re,im} + 2 \cdot \cos\theta_0 \cdot f_{re,im} \cdot \cos\theta_0 \cdot f_{re,im} \end{pmatrix} +$$

$$\Delta^2 \cdot \begin{pmatrix} \sin\theta_0 \cdot f_{im,re} \cdot \sin\theta_0 \cdot f_{im,re} + 2 \cdot \sin\theta_0 \cdot f_{im,re} \cdot \cos\theta_0 \cdot f_{im,im} + \\ \cos\theta_0 \cdot f_{im,im} \cdot \cos\theta_0 \cdot f_{im,im} + \sin\theta_0 \cdot f_{re,re} \cdot \sin\theta_0 \cdot f_{re,re} + \\ 2 \cdot \sin\theta_0 \cdot f_{re,re} \cdot \cos\theta_0 \cdot f_{re,im} + \cos\theta_0 \cdot f_{re,im} \cdot \cos\theta_0 \cdot f_{re,im} \end{pmatrix}$$

$$\sum |R|^2 = g_{re,re} + g_{im,im} + \qquad (25\text{-}2)$$
$$\Delta \cdot (2 \cdot \sin\theta_0 \cdot \sin\theta_0 \cdot g_{re,re} + 4 \cdot \sin\theta_0 \cdot \cos\theta_0 \cdot g_{re,im} + 2 \cdot \cos\theta_0 \cdot \cos\theta_0 \cdot g_{im,im}) +$$
$$\Delta^2 \cdot (\sin\theta_0 \cdot \sin\theta_0 \cdot g_{re,re} + 2 \cdot \sin\theta_0 \cdot \cos\theta_0 \cdot g_{re,im} + \cos\theta_0 \cdot \cos\theta_0 \cdot g_{im,im})$$

$$\frac{\partial \sum |R|^2}{\partial \Delta} = (2 \cdot \sin\theta_0 \cdot \sin\theta_0 \cdot g_{re,re} + 4 \cdot \sin\theta_0 \cdot \cos\theta_0 \cdot g_{re,im} + 2 \cdot \cos\theta_0 \cdot \cos\theta_0 \cdot g_{im,im}) + \qquad (25\text{-}3)$$
$$2 \cdot \Delta \cdot (\sin\theta_0 \cdot \sin\theta_0 \cdot g_{re,re} \cdot 2 \cdot \sin\theta_0 \cdot \cos\theta_0 \cdot g_{re,im} + \cos\theta_0 \cdot \cos\theta_0 \cdot g_{im,im})$$

Here, each expression is defined as shown in Expression 26.

$$h_6 = f_{re,re} \cdot f_{re,re} + 2 \cdot f_{re,re} \cdot f_{im,im} + f_{re,im} \cdot f_{re,im} - 2 \cdot f_{re,im} \cdot f_{im,re} + f_{im,re} \cdot f_{im,re} + f_{im,im} \cdot f_{im,im} \qquad (26)$$

Each expression defined in Expressions 20 and 26 is substituted into Expressions—25-1, 25-2, and 25-3 to achieve the following expressions.

$$\left|\sum Z \cdot R^*\right|^2 = h_6 + \Delta \cdot h_1 + \Delta^2 \cdot h_2 \quad (27)$$

$$\sum |R|^2 = h_3 + \Delta \cdot h_4 + \Delta^2 \cdot h_5$$

$$\frac{\partial \sum |R|^2}{\partial \Delta} = h_4 + 2 \cdot \Delta \cdot h_5$$

Accordingly, the right side of Expression 5 into which Expressions 15 and 18 are substituted is expressed by Expression 28.

$$\left|\sum Z \cdot R^*\right|^2 \cdot \sum |R|^2 \cdot \frac{\partial \sum |R|^2}{\partial \Delta} = (h_6 + \Delta \cdot h_1 + \Delta^2 \cdot h_2) \cdot (h_3 + \Delta \cdot h_4 + \Delta^2 \cdot h_5) \cdot (h_4 + 2 \cdot \Delta \cdot h_5) \quad (28)$$

$$= \begin{pmatrix} h_6 \cdot h_3 + h_6 \cdot \Delta \cdot h_4 + h_6 \cdot \Delta^2 \cdot h_5 + \\ \Delta \cdot h_1 \cdot h_3 + \Delta \cdot h_1 \cdot \Delta \cdot h_4 + \Delta \cdot h_1 \cdot \Delta^2 \cdot h_5 + \\ \Delta^2 \cdot h_2 \cdot h_3 + \Delta^2 \cdot h_2 \cdot \Delta \cdot h_4 + \Delta^2 \cdot h_2 \cdot \Delta^2 \cdot h_5 \end{pmatrix} \cdot (h_4 + 2 \cdot \Delta \cdot h_5)$$

$$= \begin{pmatrix} h_4 \cdot h_6 \cdot h_3 + h_4 \cdot h_6 \cdot \Delta \cdot h_4 + h_4 \cdot h_6 \cdot \Delta_2 \cdot h_5 + \\ h_4 \cdot \Delta \cdot h_1 \cdot h_3 + h_4 \cdot \Delta \cdot h_1 \cdot \Delta \cdot h_4 + h_4 \cdot \Delta \cdot h_1 \cdot \Delta^2 \cdot h_5 + \\ h_4 \cdot \Delta^2 \cdot h_2 \cdot h_3 + h_4 \cdot \Delta^2 \cdot h_2 \cdot \Delta \cdot h_4 + h_4 \cdot \Delta^2 \cdot h_2 \cdot \Delta^2 \cdot h_5 \end{pmatrix} +$$

$$\begin{pmatrix} 2 \cdot \Delta \cdot h_5 \cdot h_6 \cdot h_3 + 2 \cdot \Delta \cdot h_5 \cdot h_6 \cdot \Delta \cdot h_4 + 2 \cdot \Delta \cdot h_5 \cdot h_6 \cdot \Delta^2 \cdot h_5 + \\ 2 \cdot \Delta \cdot h_5 \cdot \Delta \cdot h_1 \cdot h_3 + 2 \cdot \Delta \cdot h_5 \cdot \Delta \cdot h_1 \cdot \Delta \cdot h_4 + 2 \cdot \Delta \cdot h_5 \cdot \Delta \cdot h_1 \cdot \Delta^2 \cdot h_5 + \\ 2 \cdot \Delta \cdot h_5 \cdot \Delta^2 \cdot h_2 \cdot h_3 + 2 \cdot \Delta \cdot h_5 \cdot \Delta^2 \cdot h_2 \cdot \Delta \cdot h_4 + 2 \cdot \Delta \cdot h_5 \cdot \Delta^2 \cdot h_2 \cdot \Delta^2 \cdot h_5 \end{pmatrix}$$

Simplifying each order of terms of the variable $\Delta$ in Expression 28 results in Expression 29.

$$\left|\sum Z \cdot R^*\right|^2 \cdot \sum |R|^2 \cdot \frac{\partial \sum |R|^2}{\partial \Delta} = \quad (29)$$

$$h_4 \cdot h_6 \cdot h_3 + \Delta \cdot (h_4 \cdot h_6 \cdot h_4 + h_4 \cdot h_1 \cdot h_3 + 2 \cdot h_5 \cdot h_6 \cdot h_3) +$$

$$\Delta^2 \cdot (h_4 \cdot h_6 \cdot h_5 + h_4 \cdot h_1 \cdot h_4 + h_4 \cdot h_2 \cdot h_3 + 2 \cdot h_5 \cdot h_6 \cdot h_4 +$$

$$2 \cdot h_5 \cdot h_1 \cdot h_3) + \Delta^3 \cdot (h_4 \cdot h_1 \cdot h_5 + h_4 \cdot h_2 \cdot h_4 +$$

$$2 \cdot h_5 \cdot h_6 \cdot h_5 + 2 \cdot h_5 \cdot h_1 \cdot h_4 + 2 \cdot h_5 \cdot h_2 \cdot h_3) +$$

$$\Delta^4 \cdot (h_4 \cdot h_2 \cdot h_5 + 2 \cdot h_5 \cdot h_1 \cdot h_5 + 2 \cdot h_5 \cdot h_2 \cdot h_4) + \Delta^5 \cdot (2 \cdot h_5 \cdot h_2 \cdot h_5)$$

Terms of a third-order or higher of the variable $\Delta$ are removed from Expression 29 to achieve a second-order equation expressed by Expression 30.

$$\left|\sum Z \cdot R^*\right|^2 \cdot \sum |R|^2 \cdot \frac{\partial \sum |R|^2}{\partial \Delta} \cong \quad (30)$$

$$h_4 \cdot h_6 \cdot h_3 + \Delta \cdot (h_4 \cdot h_6 \cdot h_4 + h_4 \cdot h_1 \cdot h_3 + 2 \cdot h_5 \cdot h_6 \cdot h_3) +$$

$$\Delta^2 \cdot (h_4 \cdot h_1 \cdot h_4 + h_4 \cdot h_2 \cdot h_3 + 3 \cdot h_5 \cdot h_6 \cdot h_4 + 2 \cdot h_5 \cdot h_1 \cdot h_3)$$

Accordingly, the equation for which the derivative of the correlation value between the ideal signal R and the measured signal has a value of 0 can be expressed as a second-order equation of the variable $\Delta$, as shown in Expression 31, by simplifying Expressions 24 and 30.

$$\frac{\partial \left|\sum Z \cdot R^*\right|^2}{\partial \Delta} \cdot \left(\sum |R|^2\right)^2 - \left|\sum Z \cdot R^*\right|^2 \cdot \sum |R|^2 \cdot \frac{\partial \sum |R|^2}{\partial \Delta} = 0 \quad (31)$$

$$h_1 \cdot h_3 \cdot h_3 + \Delta \cdot (2 \cdot h_1 \cdot h_3 \cdot h_4 + 2 \cdot h_2 \cdot h_3 \cdot h_3) +$$

$$\Delta^2 \cdot (2 \cdot h_1 \cdot h_3 \cdot h_5 + h_1 \cdot h_4 \cdot h_4 + 4 \cdot h_2 \cdot h_3 \cdot h_4) -$$

$$h_4 \cdot h_6 \cdot h_3 - \Delta \cdot (h_4 \cdot h_6 \cdot h_4 + h_4 \cdot h_1 \cdot h_3 + 2 \cdot h_5 \cdot h_6 \cdot h_3) -$$

$$\Delta^2 \cdot (h_4 \cdot h_1 \cdot h_4 + h_4 \cdot h_2 \cdot h_3 + 3 \cdot h_5 \cdot h_6 \cdot h_4 + 2 \cdot h_5 \cdot h_1 \cdot h_3) = 0$$

-continued $$h_1 \cdot h_3 \cdot h_3 - h_4 \cdot h_6 \cdot h_3 +$$

$$\Delta \cdot (h_1 \cdot h_3 \cdot h_4 + 2 \cdot h_2 \cdot h_3 \cdot h_3 - h_4 \cdot h_6 \cdot h_4 - 2 \cdot h_5 \cdot h_6 \cdot h_3) +$$

$$\Delta^2 \cdot (3 \cdot h_2 \cdot h_3 \cdot h_4 - 3 \cdot h_5 \cdot h_6 \cdot h_4) = 0$$

The calculating section 18 can calculate the value of the variable $\Delta$ that maximizes the correlation value between the ideal signal R and the measured signal Z by calculating solutions of the variable $\Delta$ in the second-order equation expressed by Expression 31. The solutions to the second-order equation of Expression 31 are supplied by the formula for solutions shown in Expression 32. In Expression 31, $h_1$, $h_2$, $h_3$, $h_4$, $h_5$, and $h_6$ are as expressed in Expressions 20 and 26.

$$\Delta = \frac{-b \pm \sqrt{b^2 - 4ac}}{2a} \quad (32)$$

$$a = 3 \cdot h_2 \cdot h_3 \cdot h_4 - 3 \cdot h_5 \cdot h_6 \cdot h_4$$

$$b = h_1 \cdot h_3 \cdot h_4 + 2 \cdot h_2 \cdot h_3 \cdot h_3 - h_4 \cdot h_6 \cdot h_4 - 2 \cdot h_5 \cdot h_6 \cdot h_3$$

$$c = h_1 \cdot h_3 \cdot h_3 - h_4 \cdot h_6 \cdot h_3$$

Based on the above, when calculating the gain error of the quadrature demodulator 100, the calculating section 18 can use Expression 32 to calculate a solution for the variable $\Delta$ that maximizes the correlation value between the ideal signal R and the measured signal Z. In other words, the calculating section 18 calculates a solution for the variable that maximizes the correlation value between the ideal signal R and the measured signal Z based on a second-order equation obtained by removing third-order terms and higher of the variable $\Delta$ from an equation for which the derivative of the function representing the correlation value between the ideal signal R and the measured signal Z has a value of 0. In this way, the calculating section 18 can calculate an approximate solution for the gain error of the quadrature demodulator 100 using a simple computation.

Furthermore, the calculating section 18 substitutes each of the two solutions of the second-order equation into a function, such as Expression 2, expressing the correlation value between the ideal signal R and the measured signal Z, and determines the gain error to be whichever of the two solutions results in a greater correlation value. In this way, the calculating section 18 selects a single solution from among the two solutions of the second-order equation.

As described above, the calculating section 18 of the present embodiment can use Expression 32 to calculate the gain error of the quadrature demodulator 100. In this way, the calculating section 18 can easily calculate the gain error without using the determinant of a matrix or the like.

The following is a detailed description of an exemplary computation performed by the calculating section 18 when calculating the gain error of the quadrature modulator 200.

The measured signal Z representing the real component and the imaginary component of the modulated signal output by the quadrature modulator 200 is expressed by Expression 33 below. In Expression 33, $C_{re}(k)$ represents the real component of the measured signal Z, $C_{im}(k)$ represents the imaginary component of the measured signal Z, and k represents an arbitrary sampling point of each signal.

$$Z = C_{re}(k) + j \cdot C_{im}(k) \qquad (33)$$

The ideal signal R, which includes the gain error as the variable and expresses the measured signal to be output from the quadrature modulator 200, is expressed in Expression 34 below. In Expression 34, $R_{re}(k)$ represents the real component of the signal under measurement supplied to the quadrature modulator 200, $R_{im}(k)$ represents the imaginary component of the signal, and $\Delta$ represents the gain error.

$$R = R_{re}(k) + j \cdot (1+\Delta) \cdot R_{im}(k) \qquad (34)$$

Here, the ideal signal R expressing the measured signal to be output from the quadrature modulator 200 when the measured signal Z is phase-rotated by $\theta_0$ is expressed by Expression 35.

$$R = R_{re}(k) \cdot \cos\theta_0 - R_{im}(k) \cdot \sin\theta_0 + j \cdot (1+\Delta) \cdot [R_{re}(k) \cdot \sin\theta_0 + R_{im}(k) \cdot \cos\theta_0] \qquad (35)$$

Expression 35 is the same as Expression 7 for the ideal signal when calculating the gain error of the quadrature demodulator 100. Accordingly, the calculation of the gain error of the quadrature modulator 200 when the measured signal Z is phase-rotated by $\theta_0$ is the same as the calculation made for the quadrature demodulator 100.

Therefore, when the gain error of the quadrature modulator 200 is measured, the calculating section 18 performs a correction, such as a phase rotation, on the phase of the measured signal Z according to $\theta_0$, and then performs the same calculation, such as Expression 32, as performed for the quadrature demodulator 100. In this way, the calculating section 18 of the present embodiment can easily calculate the gain error of the quadrature modulator 200 without using the determinant of a matrix or the like.

The following is a detailed description of an exemplary computation performed by the calculating section 18 when calculating the phase error of the quadrature demodulator 100.

The measured signal Z, which expresses a real component and an imaginary component of the signal output from the quadrature demodulator 100 with, is expressed below in Expression 36. In Expression 36, $C_{re}(k)$ represents the real component of the measured signal Z, $C_{im}(k)$ represents the imaginary component of the measured signal Z, and k represents an arbitrary sampling point in each signal.

$$Z = C_{re}(k) + j \cdot C_{im}(k) \qquad (36)$$

The ideal signal R, which includes the phase error as the variable and expresses the measured signal to be output from the quadrature demodulator 100, is expressed in Expression 37 below. In Expression 37, $R_{re}(k)$ represents the real component of the modulated signal under measurement supplied to the quadrature demodulator 100, $R_{im}(k)$ represents the imaginary component of the modulated signal, $\Delta$ represents the gain error, and $\theta_0$ represents a phase difference between a reference signal of the quadrature demodulator 100 and a carrier signal of the modulated signal under measurement supplied to the quadrature demodulator 100.

$$R = R_{re}(k) \cdot \cos\theta_0 - R_{im}(k) \cdot \sin\theta_0 + j \cdot [R_{re}(k) \cdot \sin(\theta_0 - \Delta) + R_{im}(k) \cdot \cos(\theta_0 - \Delta)] \qquad (37)$$

Expressions 36 and 37 are substituted into Expression 2, as shown below.

$$\rho' = \frac{\left|\sum Z \cdot R^*\right|^2}{\sum |R|^2} \qquad (2)$$

The numerator $\left|\sum Z \cdot R^*\right|^2$ of Expression 2 into which Expressions 36 and 37 are substituted is expressed below in Expression 38.

$$\left|\sum Z \cdot R^*\right|^2 = \left|\sum \left[(C_{re}(k) + j \cdot C_{im}(k)) \cdot \left\{\begin{array}{l} R_{re}(k) \cdot \cos\theta_0 - R_{im}(k) \cdot \sin\theta_0 - \\ j \cdot [R_{re}(k) \cdot \sin(\theta_0 - \Delta) + R_{im}(k) \cdot \cos(\theta_0 - \Delta)] \end{array}\right\}\right]\right|^2 \qquad (38)$$

$$= \left|\sum \begin{bmatrix} C_{re}(k) \cdot R_{re}(k) \cdot \cos\theta_0 - C_{re}(k) \cdot R_{im}(k) \cdot \sin\theta_0 - \\ j \cdot C_{re}(k) \cdot R_{re}(k) \cdot \sin(\theta_0 - \Delta) - j \cdot C_{re}(k) \cdot R_{im}(k) \cdot \cos(\theta_0 - \Delta) + \\ j \cdot C_{im}(k) \cdot R_{re}(k) \cdot \cos\theta_0 - j \cdot C_{im}(k) \cdot R_{im}(k) \cdot \sin\theta_0 + \\ C_{im}(k) \cdot R_{re}(k) \cdot \sin(\theta_0 - \Delta) + C_{im}(k) \cdot R_{im}(k) \cdot \cos(\theta_0 - \Delta) \end{bmatrix}\right|^2$$

$$= \left|\begin{array}{l} \sum C_{re}(k) \cdot R_{re}(k) \cdot \cos\theta_0 - \sum C_{re}(k) \cdot R_{im}(k) \cdot \sin\theta_0 + \\ \sum C_{im}(k) \cdot R_{re}(k) \cdot \sin(\theta_0 - \Delta) + \sum C_{im}(k) \cdot R_{im}(k) \cdot \cos(\theta_0 - \Delta) - \\ j \cdot \sum C_{re}(k) \cdot R_{re}(k) \cdot \sin(\theta_0 - \Delta) - j \cdot \sum C_{re}(k) \cdot R_{im}(k) \cdot \cos(\theta_0 - \Delta) + \\ j \cdot \sum C_{im}(k) \cdot R_{re}(k) \cdot \cos\theta_0 - j \cdot \sum C_{im}(k) \cdot R_{im}(k) \cdot \sin\theta_0 \end{array}\right|^2$$

Here, the expressions are defined as shown in Expression 39 below.

$$f_{re,re} = \Sigma C_{re}(k) \cdot R_{re}(k)$$

$$f_{im,im} = \Sigma C_{im}(k) \cdot R_{im}(k)$$

$$f_{im,re} = \Sigma C_{im}(k) \cdot R_{re}(k)$$

$$f_{re,im} = \Sigma C_{re}(k) \cdot R_{im}(k) \tag{39}$$

Substituting each expression defined in Expression 39 into Expression 38 results in the following expression.

$$\left|\sum Z \cdot R^*\right|^2 = \begin{vmatrix} \cos\theta_0 \cdot f_{re,re} - \sin\theta_0 \cdot f_{re,im} + \\ \sin(\theta_0 - \Delta) \cdot f_{im,re} + \cos(\theta_0 - \Delta) \cdot f_{im,im} - \\ j \cdot \sin(\theta_0 - \Delta) \cdot f_{re,re} - j \cdot \cos(\theta_0 - \Delta) \cdot f_{re,im} + \\ j \cdot \cos\theta_0 \cdot f_{im,re} - j \cdot \sin\theta_0 \cdot f_{im,im} \end{vmatrix}^2 \tag{40}$$

$$= \begin{pmatrix} \cos\theta_0 \cdot f_{re,re} - \sin\theta_0 \cdot f_{re,im} + \\ \sin(\theta_0 - \Delta) \cdot f_{im,re} + \cos(\theta_0 - \Delta) \cdot f_{im,im} \end{pmatrix}^2 +$$

$$\begin{pmatrix} -\sin(\theta_0 - \Delta) \cdot f_{re,re} - \cos(\theta_0 - \Delta) \cdot f_{re,im} + \\ \cos\theta_0 \cdot f_{im,re} - \sin\theta_0 \cdot f_{im,im} \end{pmatrix}^2$$

Expanding this expression results in the following expression.

$$\left|\sum Z \cdot R^*\right|^2 = \cos\theta_0 \cdot f_{re,re} \cdot \cos\theta_0 \cdot f_{re,re} - \tag{41}$$

$$\cos\theta_0 \cdot f_{re,re} \cdot \sin\theta_0 \cdot f_{re,im} + \cos\theta_0 \cdot f_{re,re} \cdot \sin(\theta_0 - \Delta) \cdot f_{im,re} +$$

$$\cos\theta_0 \cdot f_{re,re} \cdot \cos(\theta_0 - \Delta) \cdot f_{im,im} - \sin\theta_0 \cdot f_{re,im} \cdot \cos\theta_0 \cdot f_{re,re} +$$

$$\sin\theta_0 \cdot f_{re,im} \cdot \sin\theta_0 \cdot f_{re,im} - \sin\theta_0 \cdot f_{re,im} \cdot \sin(\theta_0 - \Delta) \cdot f_{im,re} -$$

$$\sin\theta_0 \cdot f_{re,im} \cdot \cos(\theta_0 - \Delta) \cdot f_{im,im} + \sin(\theta_0 - \Delta) \cdot f_{im,re} \cdot \cos\theta_0 \cdot f_{re,re} -$$

$$\sin(\theta - \Delta) \cdot \sin\theta_0 \cdot f_{re,im} + \sin(\theta_0 - \Delta) \cdot f_{im,re} \cdot \sin(\theta_0 - \Delta) \cdot f_{re,re} +$$

$$\sin(\theta_0 - \Delta) \cdot f_{im,re} \cdot \cos(\theta_0 - \Delta) \cdot f_{im,im} +$$

$$\cos(\theta_0 - \Delta) \cdot f_{im,im} \cdot \cos\theta_0 \cdot f_{re,re} - \cos(\theta_0 - \Delta) \cdot f_{im,im} \cdot \sin\theta_0 \cdot f_{re,im} +$$

$$\cos(\theta_0 - \Delta) \cdot f_{im,im} \cdot \sin(\theta_0 - \Delta) \cdot f_{im,re} +$$

$$\cos(\theta_0 - \Delta) \cdot f_{im,im} \cdot \cos(\theta_0 - \Delta) \cdot f_{im,im} +$$

$$\sin(\theta_0 - \Delta) \cdot f_{re,re} \cdot \sin(\theta_0 - \Delta) \cdot f_{re,re} +$$

$$\sin(\theta_0 - \Delta) \cdot f_{re,re} \cdot \cos(\theta_0 - \Delta) \cdot f_{re,im} -$$

$$\sin(\theta_0 - \Delta) \cdot f_{re,re} \cdot \cos\theta_0 \cdot f_{im,re} + \sin(\theta_0 - \Delta) \cdot f_{re,re} \cdot \sin\theta_0 \cdot f_{im,im} +$$

$$\cos(\theta_0 - \Delta) \cdot f_{re,im} \cdot \sin(\theta_0 - \Delta) \cdot f_{re,re} +$$

$$\cos(\theta_0 - \Delta) \cdot f_{re,im} \cdot \cos(\theta_0 - \Delta) \cdot f_{re,im} -$$

$$\cos(\theta_0 - \Delta) \cdot f_{re,im} \cdot \cos\theta_0 \cdot f_{im,re} + \cos(\theta_0 - \Delta) \cdot f_{re,im} \cdot \sin\theta_0 \cdot f_{im,im} -$$

$$\cos\theta_0 \cdot f_{im,re} \cdot \sin(\theta_0 - \Delta) \cdot f_{re,re} - \cos\theta_0 \cdot f_{im,re} \cdot \cos(\theta_0 - \Delta) \cdot f_{re,im} +$$

$$\cos\theta_0 \cdot f_{im,re} \cdot \cos\theta_0 \cdot f_{im,re} - \cos\theta_0 \cdot f_{im,re} \cdot \sin\theta_0 \cdot f_{im,im} +$$

$$\sin\theta_0 \cdot f_{im,im} \cdot \sin(\theta_0 - \Delta) \cdot f_{re,re} + \sin\theta_0 \cdot f_{im,im} \cdot \cos(\theta_0 - \Delta) \cdot f_{re,im} -$$

$$\sin\theta_0 \cdot f_{im,im} \cdot \cos\theta_0 \cdot f_{im,re} + \sin\theta_0 \cdot f_{im,im} \cdot \sin\theta_0 \cdot f_{im,im}$$

Based on the above, when calculating the phase error of the quadrature demodulator 100, the numerator $|\Sigma Z \cdot R^*|^2$ of Expression 2 representing the correlation value $\rho$ between the ideal signal R and the measured signal Z can be expressed by Expression 42 below.

$$\left|\sum Z \cdot R^*\right|^2 = \tag{42}$$

$$\cos\theta_0 \cdot f_{re,re} \cdot \cos\theta_0 \cdot f_{re,re} + \frac{1}{2} \cdot f_{re,re} \cdot f_{re,re} \cdot (1 - \cos(2 \cdot \theta_0 - 2 \cdot \Delta)) +$$

$$\frac{1}{2} \cdot f_{im,im} \cdot f_{im,im} \cdot (1 + \cos(2 \cdot \theta_0 - 2 \cdot \Delta)) +$$

$$\sin\theta_0 \cdot f_{im,im} \cdot \sin\theta_0 \cdot f_{im,im} + 2 \cdot f_{re,re} \cdot f_{im,im} \cdot \cos\Delta +$$

$$\frac{1}{2} \cdot f_{re,im} \cdot f_{re,im} \cdot (1 + \cos(2 \cdot \theta_0 - 2 \cdot \Delta)) +$$

$$\sin\theta_0 \cdot f_{re,im} \cdot \sin\theta_0 \cdot f_{re,im} + \cos\theta_0 \cdot f_{im,re} \cdot \cos\theta_0 \cdot f_{im,re} +$$

$$\frac{1}{2} \cdot f_{im,re} \cdot f_{im,re} \cdot (1 - \cos(2 \cdot \theta_0 - 2 \cdot \Delta)) - 2 \cdot f_{im,re} \cdot f_{im,re} \cdot \cos\Delta -$$

$$2 \cdot \cos\theta_0 \cdot f_{re,re} \cdot \sin\theta_0 \cdot f_{re,im} + f_{re,re} \cdot f_{re,re} \cdot \sin(2 \cdot \theta_0 - 2 \cdot \Delta) +$$

$$f_{im,re} \cdot f_{im,im} \cdot \sin(2 \cdot \theta_0 - 2 \cdot \Delta) - 2 \cdot \cos\theta_0 \cdot f_{im,re} \cdot \sin\theta_0 \cdot f_{im,im} =$$

$$\cos\theta_0 \cdot f_{re,re} \cdot \cos\theta_0 \cdot f_{re,re} + \sin\theta_0 \cdot f_{im,im} \cdot \sin\theta_0 \cdot f_{im,im} +$$

$$\sin\theta_0 \cdot f_{re,im} \cdot \sin\theta_0 \cdot f_{re,im} + \cos\theta_0 \cdot f_{im,re} \cdot \cos\theta_0 \cdot f_{im,re} -$$

$$2 \cdot \cos\theta_0 \cdot f_{re,re} \cdot \sin\theta_0 \cdot f_{re,im} -$$

$$2 \cdot \cos\theta_0 \cdot f_{im,re} \cdot \sin\theta_0 \cdot f_{im,im} + \frac{1}{2} \cdot f_{re,re} \cdot f_{re,re} +$$

$$\frac{1}{2} \cdot f_{im,im} \cdot f_{im,im} + \frac{1}{2} \cdot f_{re,im} \cdot f_{re,im} + \frac{1}{2} \cdot f_{im,re} \cdot f_{im,re} +$$

$$\cos\Delta \cdot (2 \cdot f_{re,re} \cdot f_{im,im} - 2 \cdot f_{re,im} \cdot f_{im,re}) + \frac{1}{2} \cdot \cos(2 \cdot \theta_0 - 2 \cdot \Delta) \cdot$$

$$(-f_{re,re} \cdot f_{re,re} + f_{im,im} \cdot f_{im,im} + f_{re,im} \cdot f_{re,im} - f_{im,re} \cdot f_{im,re}) +$$

$$\sin(2 \cdot \theta_0 - 2 \cdot \Delta) \cdot (f_{re,im} \cdot f_{re,re} + f_{im,re} \cdot f_{im,im})$$

The denominator $\Sigma|R|^2$ of Expression 2 into which Expressions 36 and 37 are substituted is expressed by Expression 43 below.

$$\sum |R|^2 = \sum \{R_{re}(k) \cdot \cos\theta_0 - R_{im}(k) \cdot \sin\theta_0 + j \cdot [R_{re}(k) \cdot \sin(\theta_0 - \Delta) + R_{im}(k) \cdot \cos(\theta_0 - \Delta)]\}^2 \tag{43}$$

$$= \sum \{(R_{re}(k) \cdot \cos\theta_0 - R_{im}(k) \cdot \sin\theta_0)^2 + \cdot [R_{re}(k) \cdot \sin(\theta_0 - \Delta) + R_{im}(k) \cdot \cos(\theta_0 - \Delta)]^2\}$$

$$= \sum \begin{cases} R_{re}(k) \cdot \cos\theta_0 \cdot R_{re}(k) \cdot \cos\theta_0 - 2 \cdot R_{re}(k) \cdot \cos\theta_0 \cdot R_{im}(k) \cdot \sin\theta_0 + R_{im}(k) \cdot \sin\theta_0 \cdot R_{im}(k) \cdot \sin\theta_0 + \\ R_{re}(k) \cdot \sin(\theta_0 - \Delta) \cdot R_{re}(k) \cdot \sin(\theta_0 - \Delta) + 2 \cdot R_{re}(k) \cdot \sin(\theta_0 - \Delta) \cdot R_{im}(k) \cdot \cos(\theta_0 - \Delta) + \\ R_{im}(k) \cdot \cos(\theta_0 - \Delta) \cdot R_{im}(k) \cdot \cos(\theta_0 - \Delta) \end{cases}$$

$$= \cos\theta_0 \cdot \cos\theta_0 \cdot \sum R_{re}(k) \cdot R_{re}(k) - 2 \cdot \cos\theta_0 \cdot \sin\theta_0 \cdot \sum R_{re}(k) \cdot R_{im}(k) + \sin\theta_0 \cdot \sin\theta_0 \cdot \sum R_{im}(k) \cdot R_{im}(k) +$$

$$\sin(\theta_0 - \Delta) \cdot \sin(\theta_0 - \Delta) \cdot \sum R_{re}(k) \cdot R_{re}(k) + 2 \cdot \sin(\theta_0 - \Delta) \cdot \cos(\theta_0 - \Delta) \cdot \sum R_{re}(k) \cdot R_{im}(k) +$$

$$\cos(\theta_0 - \Delta) \cdot \cos(\theta_0 - \Delta) \cdot \sum R_{im}(k) \cdot R_{im}(k)$$

$$= \cos\theta_0 \cdot \cos\theta_0 \cdot \sum R_{re}(k) \cdot R_{re}(k) - 2 \cdot \cos\theta_0 \cdot \sin\theta_0 \cdot \sum R_{re}(k) \cdot R_{im}(k) + \sin\theta_0 \cdot \sin\theta_0 \cdot \sum R_{im}(k) \cdot R_{im}(k) +$$
$$\frac{1}{2} \cdot [1 - \cos(2 \cdot \theta_0 - 2 \cdot \Delta)] \cdot \sum R_{re}(k) \cdot R_{re}(k) + \sin(2 \cdot \theta_0 - 2 \cdot \Delta) \cdot \sum R_{re}(k) \cdot R_{im}(k) +$$
$$\frac{1}{2} \cdot [1 + \cos(2 \cdot \theta_0 - 2 \cdot \Delta)] \cdot \sum R_{im}(k) \cdot R_{im}(k)$$

Here, the expressions are defined as shown in Expression 44.

$$g_{re,re} = \Sigma R_{re}(k) \cdot R_{re}(k)$$
$$g_{im,im} = \Sigma R_{im}(k) \cdot R_{im}(k)$$
$$g_{im,re} = \Sigma R_{im}(k) \cdot R_{re}(k)$$
$$g_{re,im} = \Sigma R_{re}(k) \cdot R_{im}(k) \quad (44)$$

Each expression defined in Expression 44 is substituted into Expression 43 to achieve Expression 45 below. In other words, when calculating the phase error of the quadrature demodulator 100, the denominator $\Sigma |R|^2$ of Expression 2 representing the correlation value $\rho$ between the ideal signal R and the measured signal Z can be expressed by Expression 45.

$$\sum |R|^2 = \qquad (45)$$
$$\cos\theta_0 \cdot \cos\theta_0 \cdot g_{re,re} - 2 \cdot \cos\theta_0 \cdot \sin\theta_0 \cdot g_{re,im} + \sin\theta_0 \cdot \sin\theta_0 \cdot g_{im,im} +$$
$$\frac{1}{2} \cdot [1 - \cos(2 \cdot \theta_0 - 2 \cdot \Delta)] \cdot g_{re,re} + \sin(2 \cdot \theta_0 - 2 \cdot \Delta) \cdot g_{re,im} +$$
$$\frac{1}{2} \cdot [1 + \cos(2 \cdot \theta_0 - 2 \cdot \Delta)] \cdot g_{im,im} =$$
$$\frac{1}{2} \cdot g_{re,re} + \frac{1}{2} \cdot g_{im,im} + \cos\theta_0 \cdot \cos\theta_0 \cdot g_{re,re} -$$
$$2 \cdot \cos\theta_0 \cdot \sin\theta_0 \cdot g_{re,im} + \sin\theta_0 \cdot \sin\theta_0 \cdot g_{im,im} +$$
$$\frac{1}{2} \cdot \cos(2 \cdot \theta_0 - 2 \cdot \Delta) \cdot (g_{im,im} - g_{re,re}) + \sin(2 \cdot \theta_0 - 2 \cdot \Delta) \cdot g_{re,im}$$

Next, Expressions 42 and 45 are substituted into Expression 5, which represents an equation for which the derivative of the function $\rho'$ is 0.

$$\frac{\partial \left|\sum Z \cdot R^*\right|^2}{\partial \Delta} \cdot \left(\sum |R|^2\right)^2 = \left|\sum Z \cdot R^*\right|^2 \cdot \sum |R|^2 \cdot \frac{\partial \sum |R|^2}{\partial \Delta} \qquad (5)$$

Each expression on the left side of Expression 5 into which Expressions 42 and 45 are substituted is expressed by Expressions—46-1 and 46-2 below.

$$\frac{\partial \left|\sum Z \cdot R^*\right|^2}{\partial \Delta} = -\sin\Delta \cdot (2 \cdot f_{re,re} \cdot f_{im,im} - 2 \cdot f_{re,im} \cdot f_{im,re}) + \qquad (46\text{-}1)$$
$$\sin(2 \cdot \theta_0 - 2 \cdot \Delta) \cdot (-f_{re,re} \cdot f_{re,re} + f_{im,im} \cdot f_{im,im} + f_{re,im} \cdot f_{re,im} - f_{im,re} \cdot f_{im,re}) -$$
$$2 \cdot \cos(2 \cdot \theta_0 - 2 \cdot \Delta) \cdot (f_{re,im} \cdot f_{re,re} + f_{im,re} \cdot f_{im,im})$$

$$\left(\sum |R|^2\right)^2 = \begin{bmatrix} \frac{1}{2} \cdot g_{re,re} + \frac{1}{2} \cdot g_{im,im} + \cos\theta_0 \cdot \cos\theta_0 \cdot g_{re,re} - 2 \cdot \cos\theta_0 \cdot \sin\theta_0 \cdot g_{re,im} + \sin\theta_0 \cdot \sin\theta_0 \cdot g_{im,im} + \\ \frac{1}{2} \cdot \cos(2 \cdot \theta_0 - 2 \cdot \Delta) \cdot (g_{im,im} - g_{re,re}) + \sin(2 \cdot \theta_0 - 2 \cdot \Delta) \cdot g_{re,im} \end{bmatrix}^2 \qquad (46\text{-}2)$$

Replacing the trigonometric functions of Expressions—46-1 and 46-2 with approximation expressions results in Expressions—47-1 and 47-2.

$$\frac{\partial \left|\sum Z \cdot R^*\right|^2}{\partial \Delta} = -\Delta \cdot (2 \cdot f_{re,re} \cdot f_{im,im} - 2 \cdot f_{re,im} \cdot f_{im,re}) + \qquad (47\text{-}1)$$
$$[\sin(2 \cdot \theta_0) - 2 \cdot \Delta \cdot \cos(2 \cdot \theta_0)] \cdot (-f_{re,re} \cdot f_{re,re} + f_{im,im} \cdot f_{im,im} + f_{re,im} \cdot f_{re,im} - f_{im,re} \cdot f_{im,re}) -$$
$$2 \cdot [\cos(2 \cdot \theta_0) + 2 \cdot \Delta \cdot \sin(2 \cdot \theta_0)] \cdot (f_{re,im} \cdot f_{re,re} + f_{im,re} \cdot f_{im,im})$$
$$= -2 \cdot \cos(2 \cdot \theta_0) \cdot (f_{re,im} \cdot f_{re,re} + f_{im,re} \cdot f_{im,im}) +$$
$$\sin(2 \cdot \theta_0) \cdot (-f_{re,re} \cdot f_{re,re} + f_{im,im} \cdot f_{im,im} + f_{re,im} \cdot f_{re,im} - f_{im,re} \cdot f_{im,re}) +$$
$$\Delta \cdot \begin{bmatrix} -2 \cdot \cos(2 \cdot \theta_0) \cdot (-f_{re,re} \cdot f_{re,re} + f_{im,im} \cdot f_{im,im} + f_{re,im} \cdot f_{re,im} - f_{im,re} \cdot f_{im,re}) - \\ 4 \cdot \sin(2 \cdot \theta_0) \cdot (f_{re,im} \cdot f_{re,re} + f_{im,re} \cdot f_{im,im}) - (2 \cdot f_{re,re} \cdot f_{im,im} - 2 \cdot f_{re,im} \cdot f_{im,re}) \end{bmatrix}$$

-continued $$\left(\sum |R|^2\right)^2 = \begin{bmatrix} \frac{1}{2}\cdot g_{re,re} + \frac{1}{2}\cdot g_{im,im} + \cos\theta_0\cdot\cos\theta_0\cdot g_{re,re} - 2\cdot\cos\theta_0\cdot\sin\theta_0\cdot g_{re,im} + \sin\theta_0\cdot\sin\theta_0\cdot g_{im,im} + \\ \left[\frac{1}{2}\cdot\cos(2\cdot\theta_0) + \Delta\cdot\sin(2\cdot\theta_0)\right]\cdot(g_{im,im} - g_{re,re}) + [\sin(2\cdot\theta_0) - 2\cdot\Delta\cdot\cos(2\cdot\theta_0)]\cdot g_{re,im} \end{bmatrix}^2 \quad (47\text{-}2)$$

$$= \begin{bmatrix} \frac{1}{2}\cdot g_{re,re} + \frac{1}{2}\cdot g_{im,im} + \cos\theta_0\cdot\cos\theta_0\cdot g_{re,re} - 2\cdot\cos\theta_0\cdot\sin\theta_0\cdot g_{re,im} + \sin\theta_0\cdot\sin\theta_0\cdot g_{im,im} + \\ \frac{1}{2}\cdot\cos(2\cdot\theta_0)\cdot(g_{im,im} - g_{re,re}) + \sin(2\cdot\theta_0)\cdot g_{re,im} + \\ \Delta\cdot[\sin(2\cdot\theta_0)\cdot(g_{im,im} - g_{re,re}) - 2\cdot\cos(2\cdot\theta_0)\cdot g_{re,im}] \end{bmatrix}$$

Here, the expressions are defined as shown in Expression 48.

$$h_1 = -2\cdot\cos(2\cdot\theta_0)\cdot(f_{re,im}\cdot f_{re,re} + f_{im,re}\cdot f_{im,im}) + \sin(2\cdot\theta_0)\cdot \quad (48)$$

$$(-f_{re,re}\cdot f_{re,re} + f_{im,im}\cdot f_{im,im} + f_{re,im}\cdot f_{re,im} - f_{im,re}\cdot f_{im,re})$$

$$h_2 = -2\cdot\cos(2\cdot\theta_0)\cdot(-f_{re,re}\cdot f_{re,re} + f_{im,im}\cdot f_{im,im} + f_{re,im}\cdot f_{re,im} - f_{im,re}\cdot f_{im,re}) - 4\cdot\sin(2\cdot\theta_0)\cdot(f_{re,im}\cdot f_{re,re} + f_{im,re}\cdot f_{im,im}) -$$

$$(2\cdot f_{re,re}\cdot f_{im,im} - 2\cdot f_{re,im}\cdot f_{im,re})$$

$$h_3 = \frac{1}{2}\cdot g_{re,re} + \frac{1}{2}\cdot g_{im,im} + \cos\theta_0\cdot\cos\theta_0\cdot g_{re,re} -$$

$$2\cdot\cos\theta_0\cdot\sin\theta_0\cdot g_{re,im} + \sin\theta_0\cdot\sin\theta_0\cdot g_{im,im} +$$

$$\frac{1}{2}\cdot\cos(2\cdot\theta_0)\cdot(g_{im,im} - g_{re,re}) + \sin(2\cdot\theta_0)\cdot g_{re,im}$$

$$h_4 = \sin(2\cdot\theta_0)\cdot(g_{im,im} - g_{re,re}) - 2\cdot\cos(2\cdot\theta_0)\cdot g_{re,im}$$

Each expression defined in Expression 48 is substituted into Expressions 47-1 and 47-2 to achieve Expressions—49-1 and 49-2.

$$\frac{\partial\left|\sum Z\cdot R^*\right|^2}{\partial\Delta} = h_1 + \Delta\cdot h_2 \quad (49\text{-}1)$$

$$\left(\sum |R|^2\right)^2 = (h_3 + \Delta\cdot h_4)^2 \quad (49\text{-}2)$$

Accordingly, the left side of Expression 5 into which Expressions 42 and 45 are substituted is expressed by Expression 50 below.

$$\frac{\partial\left|\sum Z\cdot R^*\right|^2}{\partial\Delta}\cdot\left(\sum |R|^2\right)^2 = (h_1 + \Delta\cdot h_2)\cdot(h_3 + \Delta\cdot h_4)\cdot(h_3 + \Delta\cdot h_4) = \quad (50)$$

$$(h_1 + \Delta\cdot h_2)\cdot(h_3\cdot h_3 + 2\cdot h_3\cdot\Delta\cdot h_4 + \Delta\cdot h_4\cdot\Delta\cdot h_4) =$$

$$h_1\cdot h_3\cdot h_3 + 2\cdot h_1\cdot h_3\cdot\Delta\cdot h_4 + h_1\cdot\Delta\cdot h_4\cdot\Delta\cdot h_4 +$$

$$\Delta\cdot h_2\cdot h_3\cdot h_3 + 2\cdot\Delta\cdot h_2\cdot h_3\cdot\Delta\cdot h_4 + \Delta\cdot h_2\cdot\Delta\cdot h_4\cdot\Delta\cdot h_4 =$$

$$h_1\cdot h_3\cdot h_3 + \Delta\cdot(2\cdot h_1\cdot h_3\cdot h_4 + h_2\cdot h_3\cdot h_3) +$$

$$\Delta^2\cdot(h_1\cdot h_4\cdot h_4 + 2\cdot h_2\cdot h_3\cdot h_4) + \Delta^3\cdot(h_2\cdot h_4\cdot h_4)$$

Terms of a third-order or higher of the variable $\Delta$ are removed from Expression 50 to achieve a second-order equation expressed by Expression 51.

$$\frac{\partial\left|\sum Z\cdot R^*\right|^2}{\partial\Delta}\cdot\left(\sum |R|^2\right)^2 \cong h_1\cdot h_3\cdot h_3 + \quad (51)$$

$$\Delta\cdot(2\cdot h_1\cdot h_3\cdot h_4 + h_2\cdot h_3\cdot h_3) + \Delta^2\cdot(h_1\cdot h_4\cdot h_4 + 2\cdot h_2\cdot h_3\cdot h_4)$$

Each expression on the right side of Expression 5 of into which Expressions 42 and 45 are substituted is expressed by Expressions—52-1, 52-2, and 52-3.

$$\left|\sum Z\cdot R^*\right|^2 = \cos\theta_0\cdot f_{re,re}\cdot\cos\theta_0\cdot f_{re,re} + \quad (52\text{-}1)$$

$$\sin\theta_0\cdot f_{im,im}\cdot\sin\theta_0\cdot f_{im,im} + \sin\theta_0\cdot f_{re,im}\cdot\sin\theta_0\cdot f_{re,im} +$$

$$\cos\theta_0\cdot f_{im,re}\cdot\cos\theta_0\cdot f_{im,re} - 2\cdot\cos\theta_0\cdot f_{re,re}\cdot\sin\theta_0\cdot f_{re,im} -$$

$$2\cdot\cos\theta_0\cdot f_{im,re}\cdot\sin\theta_0\cdot f_{im,im} + \frac{1}{2}\cdot f_{re,re}\cdot f_{re,re} +$$

$$\frac{1}{2}\cdot f_{im,im}\cdot f_{im,im} + \frac{1}{2}\cdot f_{re,im}\cdot f_{re,im} + \frac{1}{2}\cdot f_{im,re}\cdot f_{im,re} +$$

$$\cos\Delta\cdot(2\cdot f_{re,re}\cdot f_{im,im} - 2\cdot f_{re,im}\cdot f_{im,re}) + \frac{1}{2}\cdot\cos(2\cdot\theta_0 - 2\cdot\Delta)\cdot$$

$$(-f_{re,re}\cdot f_{re,re} + f_{im,im}\cdot f_{im,im} + f_{re,im}\cdot f_{re,im} - f_{im,re}\cdot f_{im,re}) +$$

$$\sin(2\cdot\theta_0 - 2\cdot\Delta)\cdot(f_{re,im}\cdot f_{re,re} + f_{im,re}\cdot f_{im,im})$$

$$\sum |R|^2 = \frac{1}{2}\cdot g_{re,re} + \frac{1}{2}\cdot g_{im,im} + \cos\theta_0\cdot\cos\theta_0\cdot g_{re,re} - \quad (52\text{-}2)$$

$$2\cdot\cos\theta_0\cdot\sin\theta_0\cdot g_{re,im} + \sin\theta_0\cdot\sin\theta_0\cdot g_{im,im} +$$

$$\frac{1}{2}\cdot\cos(2\cdot\theta_0 - 2\cdot\Delta)\cdot(g_{im,im} - g_{re,re}) + \sin(2\cdot\theta_0 - 2\cdot\Delta)\cdot g_{re,im}$$

$$\frac{\partial\sum |R|^2}{\partial\Delta} = \quad (52\text{-}3)$$

$$\sin(2\cdot\theta_0 - 2\cdot\Delta)\cdot(g_{im,im} - g_{re,re}) - 2\cdot\cos(2\cdot\theta_0 - 2\cdot\Delta)\cdot g_{re,im}$$

Replacing the trigonometric functions of Expressions—52-1, 52-2, and 52-3 with approximation expressions results in Expressions—53-1, 53-2, and 53-3.

$$\left|\sum Z \cdot R^*\right|^2 = \cos\theta \cdot f_{re,re} \cdot \cos\theta_0 \cdot f_{re,re} + \sin\theta_0 \cdot f_{im,im} \cdot \sin\theta_0 \cdot f_{im,im} + \quad (53\text{-}1)$$

$$\sin\theta_0 \cdot f_{re,im} \cdot \sin\theta_0 \cdot f_{re,im} + \cos\theta_0 \cdot f_{im,re} \cdot \cos\theta_0 \cdot f_{im,re} -$$

$$2 \cdot \cos\theta_0 \cdot f_{re,re} \cdot \sin\theta_0 \cdot f_{re,im} - 2 \cdot \cos\theta_0 \cdot f_{im,re} \cdot \sin\theta_0 \cdot f_{im,im} +$$

$$\frac{1}{2} \cdot f_{re,re} \cdot f_{re,re} + \frac{1}{2} \cdot f_{im,im} \cdot f_{im,im} + \frac{1}{2} \cdot f_{re,im} \cdot f_{re,im} + \frac{1}{2} \cdot f_{im,re} \cdot f_{im,re} +$$

$$1 \cdot (2 \cdot f_{re,re} \cdot f_{im,im} - 2 \cdot f_{re,im} \cdot f_{im,re}) +$$

$$\left[\frac{1}{2} \cdot \cos(2 \cdot \theta_0) + \Delta \cdot \sin(2 \cdot \theta_0)\right] \cdot (-f_{re,re} \cdot f_{re,re} + f_{im,im} \cdot f_{im,im} + f_{re,im} \cdot f_{re,im} - f_{im,re} \cdot f_{im,re}) +$$

$$[\sin(2 \cdot \theta_0) - 2 \cdot \Delta \cdot \cos(2 \cdot \theta_0)] \cdot (f_{re,im} \cdot f_{re,re} + f_{im,re} \cdot f_{im,im})$$

$$= \begin{bmatrix} \frac{1}{2} \cdot (f_{re,re} \cdot f_{re,re} + f_{im,im} \cdot f_{im,im} + f_{re,im} \cdot f_{re,im} + f_{im,re} \cdot f_{im,re}) + \\ 2 \cdot f_{re,re} \cdot f_{im,im} - 2 \cdot f_{re,im} \cdot f_{im,re} \\ \cos\theta_0 \cdot \cos\theta_0 \cdot (f_{re,re} \cdot f_{re,re} + f_{im,re} \cdot f_{im,re}) + \\ \sin\theta_0 \cdot \sin\theta_0 \cdot \left(\begin{array}{c} f_{im,im} \cdot f_{im,im} + \\ f_{re,im} \cdot f_{re,im} \end{array}\right) - 2 \cdot \\ \cos\theta_0 \cdot \sin\theta_0 \cdot (f_{re,re} \cdot f_{re,im} + f_{im,re} \cdot f_{im,im}) + \\ \frac{1}{2} \cdot \cos(2 \cdot \theta_0) \cdot (-f_{re,re} \cdot f_{re,re} + f_{im,im} \cdot f_{im,im} + f_{re,im} \cdot f_{re,im} - f_{im,re} \cdot f_{im,re}) + \\ \sin(2 \cdot \theta_0) \cdot (f_{re,re} \cdot f_{re,re} + f_{im,re} \cdot f_{im,im}) \end{bmatrix} +$$

$$\Delta \cdot \begin{bmatrix} -2 \cdot \cos(2 \cdot \theta_0) \cdot (f_{re,im} \cdot f_{re,re} + f_{im,re} \cdot f_{im,im}) + \\ \sin(2 \cdot \theta_0) \cdot (-f_{re,re} \cdot f_{re,re} + f_{im,im} \cdot f_{im,im} + f_{re,im} \cdot f_{re,im} - f_{im,re} \cdot f_{im,re}) \end{bmatrix}$$

$$\sum |R|^2 = \frac{1}{2} \cdot g_{re,re} + \frac{1}{2} \cdot g_{im,im} + \cos\theta_0 \cdot \cos\theta_0 \cdot g_{re,re} - 2 \cdot \cos\theta_0 \cdot \sin\theta_0 \cdot g_{re,im} + \sin\theta_0 \cdot \sin\theta_0 \cdot g_{im,im} + \quad (53\text{-}2)$$

$$\left[\frac{1}{2} \cdot \cos(2 \cdot \theta_0) + \Delta \cdot \sin(2 \cdot \theta_0)\right] \cdot (g_{im,im} - g_{re,re}) + [\sin(2 \cdot \theta_0) - 2 \cdot \Delta \cdot \cos(2 \cdot \theta_0)] \cdot g_{re,im}$$

$$= \frac{1}{2} \cdot g_{re,re} + \frac{1}{2} \cdot g_{im,im} + \cos\theta_0 \cdot \cos\theta_0 \cdot g_{re,re} - 2 \cdot \cos\theta_0 \cdot \sin\theta_0 \cdot g_{re,im} + \sin\theta_0 \cdot \sin\theta_0 \cdot g_{im,im} +$$

$$\frac{1}{2} \cdot \cos(2 \cdot \theta_0) \cdot (g_{im,im} - g_{re,re}) + \sin(2 \cdot \theta_0) \cdot g_{re,im} +$$

$$\Delta \cdot [\sin(2 \cdot \theta_0) \cdot (g_{im,im} - g_{re,re}) - 2 \cdot \cos(2 \cdot \theta_0) \cdot g_{re,im}]$$

$$\frac{\partial \sum |R|^2}{\partial \Delta} = [\sin(2 \cdot \theta_0) - 2 \cdot \Delta \cdot \cos(2 \cdot \theta_0)] \cdot (g_{im,im} - g_{re,re}) - 2 \cdot [\cos(2 \cdot \theta_0) + 2 \cdot \Delta \cdot \sin(2 \cdot \theta_0)] \cdot g_{re,im} \quad (53\text{-}3)$$

$$= \sin(2 \cdot \theta_0) \cdot (g_{im,im} - g_{re,re}) - 2 \cdot \cos(2 \cdot \theta_0) \cdot g_{re,im} +$$

$$\Delta \cdot [-2 \cdot \cos(2 \cdot \theta_0) \cdot (g_{im,im} - g_{re,re}) - 4 \cdot \sin(2 \cdot \theta_0) \cdot g_{re,im}]$$

Here, each expression is defined as shown in Expression 54.

$$h_5 = \frac{1}{2} \cdot (f_{re,re} \cdot f_{re,re} + f_{im,im} \cdot f_{im,im} + f_{re,im} \cdot f_{re,im} + f_{im,re} \cdot f_{im,re}) + \quad (54)$$

$$2 \cdot f_{re,re} \cdot f_{im,im} - 2 \cdot f_{re,im} \cdot f_{im,re} +$$

$$\cos\theta_0 \cdot \cos\theta_0 \cdot (f_{re,re} \cdot f_{re,re} + f_{im,re} \cdot f_{im,re}) +$$

$$\sin\theta_0 \cdot \sin\theta_0 \cdot (f_{im,im} \cdot f_{im,im} + f_{re,im} \cdot f_{re,im}) -$$

$$2 \cdot \cos\theta_0 \cdot \sin\theta_0 \cdot (f_{re,re} \cdot f_{re,im} + f_{im,re} \cdot f_{im,im}) + \frac{1}{2} \cdot \cos(2 \cdot \theta_0) \cdot$$

$$(-f_{re,re} \cdot f_{re,re} + f_{im,im} \cdot f_{im,im} + f_{re,im} \cdot f_{re,im} - f_{im,re} \cdot f_{im,re}) +$$

$$\sin(2 \cdot \theta_0) \cdot (f_{re,im} \cdot f_{re,re} + f_{im,re} \cdot f_{im,im})$$

$$h_6 = -2 \cdot \cos(2 \cdot \theta_0) \cdot (g_{im,im} - g_{re,re}) - 4 \cdot \sin(2 \cdot \theta_0) \cdot g_{re,im}$$

Each expression defined in Expressions 48 and 54 is substituted into Expressions—53-1, 53-2, and 53-3 to achieve Expressions—55-1, 55-2, and 55-3.

$$\left|\sum Z \cdot R^*\right|^2 = h_5 + \Delta \cdot h_1 \quad (55\text{-}1)$$

$$\sum |R|^2 = h_3 + \Delta \cdot h_4 \quad (55\text{-}2)$$

$$\frac{\partial \sum |R|^2}{\partial \Delta} = h_4 + \Delta \cdot h_6 \quad (55\text{-}3)$$

Accordingly, the right side of Expression 5 into which Expressions 42 and 45 are substituted is expressed by Expression 56.

$$\left|\sum Z \cdot R^*\right|^2 \cdot \sum |R|^2 \cdot \frac{\partial \sum |R|^2}{\partial \Delta} = \quad (56)$$

$$(h_5 + \Delta \cdot h_1) \cdot (h_3 + \Delta \cdot h_4) \cdot (h_4 + \Delta \cdot h_6) =$$

$$(h_5 + \Delta \cdot h_1) \cdot (h_3 \cdot h_4 + h_3 \cdot \Delta \cdot h_6 + \Delta \cdot h_4 \cdot h_4 + \Delta \cdot h_4 \cdot \Delta \cdot h_6) =$$

$$h_5 \cdot h_3 \cdot h_4 + h_5 \cdot h_3 \cdot \Delta \cdot h_6 + h_5 \cdot \Delta \cdot h_4 \cdot h_4 +$$

$$h_5 \cdot \Delta \cdot h_4 \cdot \Delta \cdot h_6 + \Delta \cdot h_1 \cdot h_3 \cdot h_4 + \Delta \cdot h_1 \cdot h_3 \cdot \Delta \cdot h_6 +$$

$$\Delta \cdot h_1 \cdot \Delta \cdot h_4 \cdot h_4 + \Delta \cdot h_1 \cdot \Delta \cdot h_4 \cdot \Delta \cdot h_6 =$$

-continued $$h_5 \cdot h_3 \cdot h_4 + \Delta \cdot (h_5 \cdot h_3 \cdot h_6 + h_5 \cdot h_4 \cdot h_4 + h_1 \cdot h_3 \cdot h_4) +$$
$$\Delta^2 \cdot (h_5 \cdot h_4 \cdot h_6 + h_1 \cdot h_3 \cdot h_6 + h_1 \cdot h_4 \cdot h_4) + \Delta^3 \cdot (h_1 \cdot h_4 \cdot h_6)$$

Terms of a third-order or higher of the variable Δ are removed from Expression 56 to achieve a second-order equation expressed by Expression 57.

$$\left|\sum Z \cdot R^*\right|^2 \cdot \sum |R|^2 \cdot \frac{\partial \sum |R|^2}{\partial \Delta} \cong \qquad (57)$$
$$h_5 \cdot h_3 \cdot h_4 + \Delta \cdot (h_5 \cdot h_3 \cdot h_6 + h_5 \cdot h_4 \cdot h_4 + h_1 \cdot h_3 \cdot h_4) +$$
$$\Delta^2 \cdot (h_5 \cdot h_4 \cdot h_6 + h_1 \cdot h_3 \cdot h_6 + h_1 \cdot h_4 \cdot h_4)$$

Accordingly, the equation for which the derivative of the correlation value between the ideal signal R and the measured signal has a value of 0 can be expressed as a second-order equation of the variable Δ, as shown in Expression 58, by simplifying Expressions 51 and 57.

$$\frac{\partial \left|\sum Z \cdot R^*\right|^2}{\partial \Delta} \cdot \left(\sum |R|^2\right)^2 - \left|\sum Z \cdot R^*\right|^2 \cdot \sum |R|^2 \cdot \frac{\partial \sum |R|^2}{\partial \Delta} = 0 \qquad (58)$$

$$h_1 \cdot h_3 \cdot h_3 + \Delta \cdot (2 \cdot h_1 \cdot h_3 \cdot h_4 + h_2 \cdot h_3 \cdot h_3) +$$
$$\Delta^2 \cdot (h_1 \cdot h_4 \cdot h_4 + 2 \cdot h_2 \cdot h_3 \cdot h_4) - [h_5 \cdot h_3 \cdot h_4 +$$
$$\Delta \cdot (h_5 \cdot h_3 \cdot h_6 + h_5 \cdot h_4 \cdot h_4 + h_1 \cdot h_3 \cdot h_4) +$$
$$\Delta^2 \cdot (h_5 \cdot h_4 \cdot h_6 + h_1 \cdot h_3 \cdot h_6 + h_1 \cdot h_4 \cdot h_4)] = 0$$

$$h_1 \cdot h_3 \cdot h_3 - h_5 \cdot h_3 \cdot h_4 + \Delta \cdot (2 \cdot h_1 \cdot h_3 \cdot h_4 + h_2 \cdot h_3 \cdot h_3 -$$
$$h_5 \cdot h_3 \cdot h_6 - h_5 \cdot h_4 \cdot h_4 - h_1 \cdot h_3 \cdot h_4) +$$
$$\Delta^2 \cdot (h_1 \cdot h_4 \cdot h_4 + 2 \cdot h_2 \cdot h_3 \cdot h_4 - h_5 \cdot h_4 \cdot h_6 -$$
$$h_1 \cdot h_3 \cdot h_6 - h_1 \cdot h_4 \cdot h_4) = 0$$

$$h_1 \cdot h_3 \cdot h_3 - h_5 \cdot h_3 \cdot h_4 + \Delta \cdot (h_1 \cdot h_3 \cdot h_4 + h_2 \cdot h_3 \cdot h_3 -$$
$$h_5 \cdot h_3 \cdot h_6 - h_5 \cdot h_4 \cdot h_4) +$$
$$\Delta^2 \cdot (2 \cdot h_2 \cdot h_3 \cdot h_4 - h_5 \cdot h_4 \cdot h_6 - h_1 \cdot h_3 \cdot h_6 - h_1 \cdot h_4 \cdot h_4) = 0$$

The calculating section 18 can calculate the value of the variable Δ that maximizes the correlation value between the ideal signal R and the measured signal Z by calculating solutions of the variable Δ in the second-order equation expressed by Expression 58. The solutions to the second-order equation of Expression 58 are supplied by the formula for solutions shown in Expression 59. In Expression 59, $h_1$, $h_2$, $h_3$, $h_4$, $h_5$, and $h_6$ are as expressed in Expressions 48 and 54.

$$\Delta = \frac{-b \pm \sqrt{b^2 - 4ac}}{2a} \qquad (59)$$
$$a = 2 \cdot h_2 \cdot h_3 \cdot h_4 - h_5 \cdot h_4 \cdot h_6 - h_1 \cdot h_3 \cdot h_6 - h_1 \cdot h_4 \cdot h_5$$
$$b = h_1 \cdot h_3 \cdot h_4 + h_2 \cdot h_3 \cdot h_3 - h_5 \cdot h_3 \cdot h_6 - h_5 \cdot h_4 \cdot h_4$$
$$c = h_1 \cdot h_3 \cdot h_3 - h_5 \cdot h_3 \cdot h_4$$

Based on the above, when calculating the phase error of the quadrature demodulator 100, the calculating section 18 can use Expression 59 to calculate a solution for the variable Δ that maximizes the correlation value between the ideal signal R and the measured signal Z. In other words, the calculating section 18 calculates a solution for the variable that maximizes the correlation value between the ideal signal R and the measured signal Z based on a second-order equation obtained by removing third-order terms and higher of the variable Δ from an equation for which the derivative of the function representing the correlation value between the ideal signal R and the measured signal Z has a value of 0. In this way, the calculating section 18 can calculate an approximate solution for the phase error of the quadrature demodulator 100 using a simple computation.

Furthermore, the calculating section 18 substitutes each of the two solutions of the second-order equation into a function, such as Expression 2, expressing the correlation value between the ideal signal R and the measured signal Z, and determines the phase error to be whichever of the two solutions results in a greater correlation value. In this way, the calculating section 18 selects a single solution from among the two solutions of the second-order equation.

As described above, the calculating section 18 of the present embodiment can use Expression 59 to calculate the phase error of the quadrature demodulator 100. In this way, the calculating section 18 can easily calculate the phase error without using the determinant of a matrix or the like.

The following is a detailed description of an exemplary computation performed by the calculating section 18 when calculating the phase error of the quadrature modulator 200.

The measured signal Z representing the real component and the imaginary component of the modulated signal output by the quadrature modulator 200 is expressed by Expression 60 below. In Expression 60, $C_{re}(k)$ represents the real component of the measured signal Z, $C_{im}(k)$ represents the imaginary component of the measured signal Z, and k represents an arbitrary sampling point of each signal.

$$Z = C_{re}(k) + j \cdot C_{im}(k) \qquad (60)$$

The ideal signal R, which includes the phase error as the variable and expresses the measured signal to be output from the quadrature modulator 200, is expressed in Expression 61 below. In Expression 61, $R_{re}(k)$ represents the real component of the signal under measurement supplied to the quadrature modulator 200, $R_{im}(k)$ represents the imaginary component of the signal, Δ represents the phase error, and g represents the pre-measured gain error. If the gain error has not already been measured, the value of g in Expression 61 may be 0, for example.

$$R = R_{re}(k) - (1+g) \cdot R_{im}(k) \cdot \sin(-\Delta) + j \cdot \qquad (61)$$
$$(1+g) \cdot R_{im}(k) \cdot \cos(-\Delta)$$
$$= R_{re}(k) + (1+g) \cdot R_{im}(k) \cdot \sin\Delta + j \cdot (1+g) \cdot R_{im}(k) \cdot \cos\Delta$$

Expressions 60 and 61 are substituted into Expression 2, as shown below.

$$\rho' = \frac{\left|\sum Z \cdot R^*\right|^2}{\sum |R|^2} \qquad (2)$$

The numerator $|\Sigma Z \cdot R^*|^2$ of Expression 2 into which Expressions 60 and 61 are substituted is expressed below in Expression 62.

$$\left|\sum Z \cdot R^*\right|^2 = \left|\sum [(C_{re}(k) + j \cdot C_{im}(k)) \cdot \{R_{re}(k) + (1+g) \cdot R_{im}(k) \cdot \sin\Delta - j \cdot (1-g) \cdot R_{im}(k) \cdot \cos\Delta\}]\right|^2 \quad (62)$$

$$= \left|\sum \begin{bmatrix} C_{re}(k) \cdot R_{re}(k) + C_{re}(k) \cdot R_{im}(k) \cdot \sin\Delta + C_{re}(k) \cdot g \cdot R_{im}(k) \cdot \sin\Delta - \\ j \cdot C_{re}(k) \cdot R_{im}(k) \cdot \cos\Delta - j \cdot C_{re}(k) \cdot g \cdot R_{im}(k) \cdot \cos\Delta + \\ j \cdot C_{im}(k) \cdot R_{re}(k) + j \cdot C_{im}(k) \cdot R_{im}(k) \cdot \sin\Delta + j \cdot C_{im}(k) \cdot g \cdot R_{im}(k) \cdot \sin\Delta + \\ C_{im}(k) \cdot R_{im}(k) \cdot \cos\Delta + C_{im}(k) \cdot g \cdot R_{im}(k) \cdot \cos\Delta \end{bmatrix}\right|^2$$

$$= \left|\begin{array}{l} \sum C_{re}(k) \cdot R_{re}(k) + \sin\Delta \cdot \sum C_{re}(k) \cdot R_{im}(k) + g \cdot \sin\Delta \cdot \sum C_{re}(k) \cdot R_{im}(k) + \\ \cos\Delta \cdot \sum C_{im}(k) \cdot R_{im}(k) + g \cdot \cos\Delta \cdot \sum C_{im}(k) \cdot R_{im}(k) - \\ j \cdot \cos\Delta \cdot \sum C_{re}(k) \cdot R_{im}(k) - j \cdot g \cdot \cos\Delta \cdot \sum C_{re}(k) \cdot R_{im}(k) + \\ j \cdot \sum C_{im}(k) \cdot R_{re}(k) + j \cdot \sin\Delta \cdot \sum C_{im}(k) \cdot R_{im}(k) + j \cdot g \cdot \sin\Delta \cdot \sum C_{im}(k) \cdot R_{im}(k) \end{array}\right|^2$$

Here, the expressions are defined as shown in Expression 63 below.

$$f_{re,re} = \Sigma C_{re}(k) \cdot R_{re}(k)$$

$$f_{im,im} = \Sigma C_{im}(k) \cdot R_{im}(k)$$

$$f_{im,re} = \Sigma C_{im}(k) \cdot R_{re}(k)$$

$$f_{re,im} = \Sigma C_{re}(k) \cdot R_{im}(k) \quad (63)$$

Substituting each expression defined in Expression 63 into Expression 62 results in the following expression.

$$\left|\sum Z \cdot R^*\right|^2 = \left|\begin{array}{l} f_{re,re} + \sin\Delta \cdot f_{re,im} + g \cdot \sin\Delta \cdot f_{re,im} + \cos\Delta \cdot f_{im,im} + g \cdot \cos\Delta \cdot f_{im,im} - \\ j \cdot \cos\Delta \cdot f_{re,im} - j \cdot g \cdot \cos\Delta \cdot f_{re,im} + j \cdot f_{im,re} + j \cdot \sin\Delta \cdot f_{im,im} + j \cdot g \cdot \sin\Delta \cdot f_{im,im} \end{array}\right|^2 \quad (64)$$

$$= (f_{re,re} + \sin\Delta \cdot f_{re,im} + g \cdot \sin\Delta \cdot f_{re,im} + \cos\Delta \cdot f_{im,im} + g \cdot \cos\Delta \cdot f_{im,im})^2 +$$

$$(-\cos\Delta \cdot f_{re,im} - g \cdot \cos\Delta \cdot f_{re,im} + f_{im,re} + \sin\Delta \cdot f_{im,im} + g \cdot \sin\Delta \cdot f_{im,im})^2$$

Expanding this expression results in the following expression.

$$\left|\sum Z \cdot R^*\right|^2 = f_{re,re} \cdot f_{re,re} + f_{re,re} \cdot \sin\Delta \cdot f_{re,im} + \quad (65)$$

$$f_{re,re} \cdot g \cdot \sin\Delta \cdot f_{re,im} + f_{re,re} \cdot \cos\Delta \cdot f_{im,im} + f_{re,re} \cdot g \cdot \cos\Delta \cdot f_{im,im} +$$

$$\sin\Delta \cdot f_{re,im} \cdot f_{re,re} + \sin\Delta \cdot f_{re,im} \cdot \sin\Delta \cdot f_{re,im} +$$

$$\sin\Delta \cdot f_{re,im} \cdot g \cdot \sin\Delta \cdot f_{re,im} + \sin\Delta \cdot f_{re,im} \cdot \cos\Delta \cdot f_{im,im} +$$

$$\sin\Delta \cdot f_{re,im} \cdot g \cdot \cos\Delta \cdot f_{im,im} + g \cdot \sin\Delta \cdot f_{re,re} \cdot f_{re,re} +$$

$$g \cdot \sin\Delta \cdot f_{re,im} \cdot \sin\Delta \cdot f_{re,im} + g \cdot \sin\Delta \cdot f_{re,im} \cdot g \cdot \sin\Delta \cdot f_{re,im} +$$

$$g \cdot \sin\Delta \cdot f_{re,im} \cdot \cos\Delta \cdot f_{im,im} + g \cdot \sin\Delta \cdot f_{re,im} \cdot g \cdot \cos\Delta \cdot f_{im,im} +$$

$$\cos\Delta \cdot f_{im,im} \cdot f_{re,re} + \cos\Delta \cdot f_{im,im} \cdot \sin\Delta \cdot f_{re,im} +$$

$$\cos\Delta \cdot f_{im,im} \cdot g \cdot \sin\Delta \cdot f_{re,im} + \cos\Delta \cdot f_{im,im} \cdot \cos\Delta \cdot f_{im,im} +$$

$$\cos\Delta \cdot f_{im,im} \cdot g \cdot \cos\Delta \cdot f_{im,im} + g \cdot \cos\Delta \cdot f_{im,im} \cdot f_{re,re} +$$

$$g \cdot \cos\Delta \cdot f_{im,im} \cdot \sin\Delta \cdot f_{re,im} + g \cdot \cos\Delta \cdot f_{im,im} \cdot g \cdot \sin\Delta \cdot f_{re,im} +$$

$$g \cdot \cos\Delta \cdot f_{im,im} \cdot \cos\Delta \cdot f_{im,im} + g \cdot \cos\Delta \cdot f_{im,im} \cdot g \cdot \cos\Delta \cdot f_{im,im} +$$

$$\cos\Delta \cdot f_{re,im} \cdot \cos\Delta \cdot f_{re,im} + \cos\Delta \cdot f_{re,im} \cdot g \cdot \cos\Delta \cdot f_{re,im} -$$

$$\cos\Delta \cdot f_{re,im} \cdot f_{im,re} - \cos\Delta \cdot f_{re,im} \cdot \sin\Delta \cdot f_{im,im} -$$

$$\cos\Delta \cdot f_{re,im} \cdot g \cdot \sin\Delta \cdot f_{im,im} + g \cdot \cos\Delta \cdot f_{re,im} \cdot \cos\Delta \cdot f_{re,im} +$$

$$g \cdot \cos\Delta \cdot f_{re,im} \cdot g \cdot \cos\Delta \cdot f_{re,im} - g \cdot \cos\Delta \cdot f_{re,im} \cdot f_{im,re} -$$

$$g \cdot \cos\Delta \cdot f_{re,im} \cdot \sin\Delta \cdot f_{im,im} - g \cdot \cos\Delta \cdot f_{re,im} \cdot g \cdot \sin\Delta \cdot f_{im,im} -$$

-continued $$f_{im,re} \cdot \cos\Delta \cdot f_{re,im} - f_{im,re} \cdot g \cdot \cos\Delta \cdot f_{re,im} +$$

$$f_{im,re} \cdot f_{im,re} \cdot \sin\Delta \cdot f_{im,im} + f_{im,re} \cdot g \cdot \sin\Delta \cdot f_{im,im} -$$

$$\sin\Delta \cdot f_{im,im} \cdot \cos\Delta \cdot f_{re,im} - \sin\Delta \cdot f_{im,im} \cdot g \cdot \cos\Delta \cdot f_{re,im} +$$

$$\sin\Delta \cdot f_{im,im} \cdot f_{im,re} + \sin\Delta \cdot f_{im,im} \cdot \sin\Delta \cdot f_{im,im} +$$

$$\sin\Delta \cdot f_{im,im} \cdot g \cdot \sin\Delta \cdot f_{im,im} - g \cdot \sin\Delta \cdot f_{im,im} \cdot \cos\Delta \cdot f_{re,im} -$$

$$g \cdot \sin\Delta \cdot f_{im,im} \cdot g \cdot \cos\Delta \cdot f_{re,im} + g \cdot \sin\Delta \cdot f_{im,im} \cdot f_{im,re} +$$

$$g \cdot \sin\Delta \cdot f_{im,im} \cdot \sin\Delta \cdot f_{im,im} + g \cdot \sin\Delta \cdot f_{im,im} \cdot g \cdot \sin\Delta \cdot f_{im,im}$$

Expanding this expression results in the expression shown below.

$$\left|\sum Z \cdot R^*\right|^2 = \quad (66)$$

$$f_{re,re} \cdot f_{re,re} + f_{im,re} \cdot f_{im,re} + f_{re,re} \cdot \cos\Delta \cdot f_{im,im} \cdot g \cdot \cos\Delta \cdot f_{im,im} +$$

$$\cos\Delta \cdot f_{im,im} \cdot f_{re,re} + g \cdot \cos\Delta \cdot f_{im,im} \cdot f_{re,re} -$$

$$\cos\Delta \cdot f_{re,im} \cdot f_{im,re} - g \cdot \cos\Delta \cdot f_{re,im} \cdot f_{im,re} - f_{im,re} \cdot \cos\Delta \cdot f_{re,im} -$$

$$f_{im,re} \cdot g \cdot \cos\Delta \cdot f_{re,im} + f_{re,re} \cdot \sin\Delta \cdot f_{re,im} \cdot g \cdot \sin\Delta \cdot f_{re,im} +$$

$$\sin\Delta \cdot f_{re,im} \cdot f_{re,re} + g \cdot \sin\Delta \cdot f_{re,im} \cdot f_{re,re} + f_{im,re} \cdot \sin\Delta \cdot f_{im,im} +$$

$$f_{im,re} \cdot g \cdot \sin\Delta \cdot f_{im,im} + \sin\Delta \cdot f_{im,im} \cdot f_{im,re} + g \cdot \sin\Delta \cdot f_{im,im} \cdot f_{im,re} +$$

$$\cos\Delta \cdot f_{im,im} \cdot \cos\Delta \cdot f_{im,im} + \cos\Delta \cdot f_{im,im} \cdot g \cdot \cos\Delta \cdot f_{im,im} +$$

$$g \cdot \cos\Delta \cdot f_{im,im} \cdot \cos\Delta \cdot f_{im,im} + g \cdot \cos\Delta \cdot f_{im,im} \cdot g \cdot \cos\Delta \cdot f_{im,im} +$$

$$\cos\Delta \cdot f_{re,im} \cdot \cos\Delta \cdot f_{re,im} \cdot g \cdot \cos\Delta \cdot f_{re,im} +$$

$$g \cdot \cos\Delta \cdot f_{re,im} \cdot \cos\Delta \cdot f_{re,im} + g \cdot \cos\Delta \cdot f_{re,im} \cdot g \cdot \cos\Delta \cdot f_{re,im} +$$

$$\sin\Delta \cdot f_{re,im} \cdot \cos\Delta \cdot f_{im,im} + \sin\Delta \cdot f_{re,im} \cdot g \cdot \cos\Delta \cdot f_{im,im} +$$

$$g \cdot \sin\Delta \cdot f_{re,im} \cdot \cos\Delta \cdot f_{im,im} + g \cdot \sin\Delta \cdot f_{re,im} \cdot g \cdot \cos\Delta \cdot f_{im,im} +$$

$$\cos\Delta \cdot f_{im,im} \cdot \sin\Delta \cdot f_{re,im} + \cos\Delta \cdot f_{im,im} \cdot g \cdot \sin\Delta \cdot f_{re,im} +$$

-continued
$$g \cdot \cos\Delta \cdot f_{im,im} \cdot \sin\Delta \cdot f_{re,im} + g \cdot \cos\Delta \cdot f_{im,im} \cdot g \cdot \sin\Delta \cdot f_{re,im} -$$
$$\cos\Delta \cdot f_{re,im} \cdot \sin\Delta \cdot f_{im,im} - \cos\Delta \cdot f_{re,im} \cdot g \cdot \sin\Delta \cdot f_{im,im} -$$
$$g \cdot \cos\Delta \cdot f_{re,im} \cdot \sin\Delta \cdot f_{im,im} - g \cdot \cos\Delta \cdot f_{re,im} \cdot g \cdot \sin\Delta \cdot f_{im,im} -$$
$$\sin\Delta \cdot f_{im,im} \cdot \cos\Delta \cdot f_{re,im} - \sin\Delta \cdot f_{im,im} \cdot g \cdot \cos\Delta \cdot f_{re,im} -$$
$$g \cdot \sin\Delta \cdot f_{im,im} \cdot \cos\Delta \cdot f_{re,im} - g \cdot \sin\Delta \cdot f_{im,im} \cdot g \cdot \cos\Delta \cdot f_{re,im} +$$
$$\sin\Delta \cdot f_{re,im} \cdot \sin\Delta \cdot f_{re,im} + \sin\Delta \cdot f_{re,im} \cdot g \cdot \sin\Delta \cdot f_{re,im} +$$
$$g \cdot \sin\Delta \cdot f_{re,im} \cdot \sin\Delta \cdot f_{re,im} + g \cdot \sin\Delta \cdot f_{re,im} \cdot g \cdot \sin\Delta \cdot f_{re,im} +$$
$$\sin\Delta \cdot f_{im,im} \cdot \sin\Delta \cdot f_{im,im} + \sin\Delta \cdot f_{im,im} \cdot g \cdot \sin\Delta \cdot f_{im,im} +$$
$$g \cdot \sin\Delta \cdot f_{im,im} \cdot \sin\Delta \cdot f_{im,im} + g \cdot \sin\Delta \cdot f_{im,im} \cdot g \cdot \sin\Delta \cdot f_{im,im}$$

Simplifying the constants and trigonometric functions in this expression results in Expression 67.

$$\left|\sum Z \cdot R^*\right|^2 = f_{re,re} \cdot f_{re,re} + f_{im,re} \cdot f_{im,re} + \qquad (67)$$
$$\cos\Delta \cdot (2 \cdot f_{re,re} \cdot f_{im,im} + 2 \cdot g \cdot f_{re,re} \cdot f_{im,im} - 2 \cdot f_{re,im} \cdot f_{im,re} - 2 \cdot g \cdot f_{re,im} \cdot f_{im,re}) +$$
$$\sin\Delta \cdot (2 \cdot f_{re,re} \cdot f_{re,im} + 2 \cdot g \cdot f_{re,re} \cdot f_{re,im} + 2 \cdot f_{im,re} \cdot f_{im,im} + 2 \cdot g \cdot f_{im,re} \cdot f_{im,im}) +$$
$$\cos\Delta \cdot \cos\Delta \cdot \left( \begin{array}{l} f_{im,im} \cdot f_{im,im} + 2 \cdot g \cdot f_{im,im} \cdot f_{im,im} + g^2 \cdot f_{im,im} \cdot f_{im,im} + \\ f_{re,im} \cdot f_{re,im} + 2 \cdot g \cdot f_{re,im} \cdot f_{re,im} + g^2 \cdot f_{re,im} \cdot f_{re,im} \end{array} \right) +$$
$$\cos\Delta \cdot \sin\Delta \cdot 0 +$$
$$\sin\Delta \cdot \sin\Delta \cdot \left( \begin{array}{l} f_{re,im} \cdot f_{re,im} + 2 \cdot g \cdot f_{re,im} \cdot f_{re,im} + g^2 \cdot f_{re,im} \cdot f_{re,im} + \\ f_{im,im} \cdot f_{im,im} + 2 \cdot g \cdot f_{im,im} \cdot f_{im,im} + g^2 \cdot f_{im,im} \cdot f_{im,im} \end{array} \right)$$
$$= f_{re,re} \cdot f_{re,re} + f_{im,re} \cdot f_{im,re} +$$
$$\cos\Delta \cdot (2 \cdot f_{re,re} \cdot f_{im,im} + 2 \cdot g \cdot f_{re,re} \cdot f_{im,im} - 2 \cdot f_{re,im} \cdot f_{im,re} - 2 \cdot g \cdot f_{re,im} \cdot f_{im,re}) +$$
$$\sin\Delta \cdot (2 \cdot f_{re,re} \cdot f_{re,im} + 2 \cdot g \cdot f_{re,re} \cdot f_{re,im} + 2 \cdot f_{im,re} \cdot f_{im,im} + 2 \cdot g \cdot f_{im,re} \cdot f_{im,im}) +$$
$$\frac{1}{2} \cdot [1 + \cos(2 \cdot \Delta)] \cdot \left( \begin{array}{l} f_{im,im} \cdot f_{im,im} + 2 \cdot g \cdot f_{im,im} \cdot f_{im,im} + g^2 \cdot f_{im,im} \cdot f_{im,im} + \\ f_{re,im} \cdot f_{re,im} + 2 \cdot g \cdot f_{re,im} \cdot f_{re,im} + g^2 \cdot f_{re,im} \cdot f_{re,im} \end{array} \right) +$$
$$\frac{1}{2} \cdot [1 - \cos(2 \cdot \Delta)] \cdot \left( \begin{array}{l} f_{re,im} \cdot f_{re,im} + 2 \cdot g \cdot f_{re,im} \cdot f_{re,im} + g^2 \cdot f_{re,im} \cdot f_{re,im} + \\ f_{im,im} \cdot f_{im,im} + 2 \cdot g \cdot f_{im,im} \cdot f_{im,im} + g^2 \cdot f_{im,im} \cdot f_{im,im} \end{array} \right)$$

Further simplifying Expression 67 results in Expression 68.

$$\left|\sum Z \cdot R^*\right|^2 = f_{re,re} \cdot f_{re,re} + f_{im,re} \cdot f_{im,re} + \qquad (68)$$
$$f_{re,im} \cdot f_{re,im} + f_{im,im} \cdot f_{im,im} + 2 \cdot g \cdot f_{im,im} \cdot f_{im,im} +$$
$$g^2 \cdot f_{im,im} \cdot f_{im,im} + 2 \cdot g \cdot f_{re,im} \cdot f_{re,im} + g^2 \cdot f_{re,im} \cdot f_{re,im} +$$
$$\cos\Delta \cdot (2 \cdot f_{re,re} \cdot f_{im,im} + 2 \cdot g \cdot f_{re,re} \cdot f_{im,im} - 2 \cdot f_{re,im} \cdot f_{im,re} -$$
$$2 \cdot g \cdot f_{re,im} \cdot f_{im,re}) + \sin\Delta \cdot (2 \cdot f_{re,re} \cdot f_{re,im} +$$
$$2 \cdot g \cdot f_{re,re} \cdot f_{re,im} + 2 \cdot f_{im,re} \cdot f_{im,im} + 2 \cdot g \cdot f_{im,re} \cdot f_{im,im})$$

Here, the expressions are defined as shown in Expression 69.

$$h_1 = f_{re,re} \cdot f_{re,re} + f_{im,re} \cdot f_{im,re} + \qquad (69)$$
$$f_{re,im} \cdot f_{re,im} + f_{im,im} \cdot f_{im,im} + 2 \cdot g \cdot f_{im,im} \cdot f_{im,im} +$$
$$g^2 \cdot f_{im,im} \cdot f_{im,im} + 2 \cdot g \cdot f_{re,im} \cdot f_{re,im} + g^2 \cdot f_{re,im} \cdot f_{re,im}$$
$$h_2 = 2 \cdot f_{re,re} \cdot f_{im,im} + 2 \cdot g \cdot f_{re,re} \cdot f_{im,im} -$$
$$2 \cdot f_{re,im} \cdot f_{im,re} - 2 \cdot g \cdot f_{re,im} \cdot f_{im,re}$$
$$h_3 = 2 \cdot f_{re,re} \cdot f_{re,im} + 2 \cdot g \cdot f_{re,re} \cdot f_{re,im} +$$
$$2 \cdot f_{im,re} \cdot f_{im,im} + 2 \cdot g \cdot f_{im,re} \cdot f_{im,im}$$

By substituting each expression defined in Expression 69 into Expression 69, the denominator $|\Sigma Z \cdot R^*|^2$ of Expression 2 into which Expressions 60 and 61 are substituted becomes Expression 70 below.

$$|\Sigma Z \cdot R^*|^2 = h_1 + \cos\Delta \cdot h_2 + \sin\Delta \cdot h_3 \qquad (70)$$

The denominator $\Sigma |R|^2$ of Expression 2 into which Expressions 60 and 61 are substituted is expressed by Expression 71.

$$\sum |R|^2 = \sum \{R_{re}(k) + (1+g) \cdot R_{im}(k) \cdot \sin\Delta + j \cdot (1+g) \cdot R_{im}(k) \cdot \cos\Delta\}^2 \qquad (71)$$
$$= \sum \{[R_{re}(k) + R_{im}(k) \cdot \sin\Delta + g \cdot R_{im}(k) \cdot \sin\Delta]^2 + [R_{im}(k) \cdot \cos\Delta + g \cdot R_{im}(k) \cdot \cos\Delta]^2\}$$

-continued $$= \sum \begin{Bmatrix} R_{re}(k) \cdot R_{re}(k) + R_{re}(k) \cdot R_{im}(k) \cdot \sin\Delta + R_{re}(k) \cdot g \cdot R_{im}(k) \cdot \sin\Delta + \\ R_{im}(k) \cdot \sin\Delta \cdot R_{re}(k) + R_{im}(k) \cdot \sin\Delta + R_{im}(k) \cdot \sin\Delta \cdot g \cdot R_{im}(k) \cdot \sin\Delta + \\ g \cdot R_{im}(k) \cdot \sin\Delta \cdot R_{re}(k) + g \cdot R_{im}(k) \cdot \sin\Delta \cdot R_{im}(k) \cdot \sin\Delta + g \cdot R_{im}(k) \cdot \sin\Delta \cdot g \cdot R_{im}(k) \cdot \sin\Delta + \\ R_{im}(k) \cdot \cos\Delta \cdot R_{im}(k) \cdot \cos\Delta + R_{im}(k) \cdot \cos\Delta \cdot g \cdot R_{im}(k) \cdot \cos\Delta + \\ g \cdot R_{im}(k) \cdot \cos\Delta \cdot R_{im}(k) \cdot \cos\Delta + g \cdot R_{im}(k) \cdot \cos\Delta \cdot g \cdot R_{im}(k) \cdot \cos\Delta \end{Bmatrix}$$

$$= \sum R_{re}(k) \cdot R_{re}(k) + \sin\Delta \cdot \sum R_{re}(k) \cdot R_{im}(k) + g \cdot \sin\Delta \cdot \sum R_{re}(k) \cdot R_{im}(k) +$$
$$\sin\Delta \cdot \sum R_{im}(k) \cdot R_{re}(k) + \sin\Delta \cdot \sin\Delta \cdot \sum R_{im}(k) \cdot R_{im}(k) + g \cdot \sin\Delta \cdot \sin\Delta \cdot \sum R_{im}(k) \cdot R_{im}(k) +$$
$$g \cdot \sin\Delta \cdot \sum R_{im}(k) \cdot R_{re}(k) + g \cdot \sin\Delta \cdot \sin\Delta \cdot \sum R_{im}(k) \cdot R_{im}(k) + g^2 \cdot \sin\Delta \cdot \sin\Delta \cdot \sum R_{im}(k) \cdot R_{im}(k) +$$
$$\cos\Delta \cdot \cos\Delta \cdot \sum R_{im}(k) \cdot R_{im}(k) + g \cdot \cos\Delta \cdot \cos\Delta \cdot \sum R_{im}(k) \cdot R_{im}(k) +$$
$$g \cdot \cos\Delta \cdot \cos\Delta \cdot \sum R_{im}(k) \cdot R_{im}(k) + g^2 \cdot \cos\Delta \cdot \cos\Delta \cdot \sum R_{im}(k) \cdot R_{im}(k)$$

Here, the expressions are defined as shown in Expression 72 below.

$$g_{re,re} = \Sigma R_{re}(k) \cdot R_{re}(k)$$

$$g_{im,im} = \Sigma R_{im}(k) \cdot R_{im}(k)$$

$$g_{im,re} = \Sigma R_{im}(k) \cdot R_{re}(k)$$

$$g_{re,im} = \Sigma R_{re}(k) \cdot R_{im}(k) \tag{72}$$

Substituting each expression defined in Expression 72 into Expression 71 results in the following expression.

$$\sum |R|^2 = \tag{73}$$

$$g_{re,re} + \sin\Delta \cdot g_{re,im} + g \cdot \sin\Delta \cdot g_{re,im} + \sin\Delta \cdot g_{re,im} + \sin\Delta \cdot g_{im,im} +$$
$$g \cdot \sin\Delta \cdot \sin\Delta \cdot g_{im,im} + g \cdot \sin\Delta \cdot g_{re,im} + g \cdot \sin\Delta \cdot \sin\Delta \cdot g_{im,im} +$$
$$g^2 \cdot \sin\Delta \cdot g_{im,im} + \cos\Delta \cdot \cos\Delta \cdot g_{im,im} + g \cdot \cos\Delta \cdot \cos\Delta \cdot g_{im,im} +$$
$$g \cdot \cos\Delta \cdot \cos\Delta \cdot g_{im,im} + g^2 \cdot \cos\Delta \cdot \cos\Delta \cdot g_{im,im}$$

Simplifying the constants and trigonometric functions in this expression results in Expression 74.

$$\sum |R|^2 = g_{re,re} + \sin\Delta \cdot (g_{re,im} + g \cdot g_{re,im} + g_{re,im} + g \cdot g_{re,im}) + \tag{74}$$
$$\cos\Delta \cdot \cos\Delta \cdot (g_{im,im} + g \cdot g_{im,im} + g \cdot g_{im,im} + g^2 \cdot g_{im,im}) +$$
$$\sin\Delta \cdot \sin\Delta \cdot (g_{im,im} + g \cdot g_{im,im} + g \cdot g_{im,im} + g^2 \cdot g_{im,im})$$

Further simplifying Expression 74 results in Expression 75.

$$\sum |R|^2 = g_{re,re} + \sin\Delta \cdot (2 \cdot g_{re,im} + 2 \cdot g \cdot g_{re,im}) + \tag{75}$$
$$\frac{1}{2} \cdot [1 + \cos(2 \cdot \Delta)] \cdot (g_{im,im} + 2 \cdot g \cdot g_{im,im} + g^2 \cdot g_{im,im}) +$$
$$\frac{1}{2} \cdot [1 - \cos(2 \cdot \Delta)] \cdot (g_{im,im} + 2 \cdot g \cdot g_{im,im} + g^2 \cdot g_{im,im}) = g_{re,re} +$$
$$g_{im,im} + 2 \cdot g \cdot g_{im,im} + g^2 \cdot g_{im,im} + \sin\Delta \cdot (2 \cdot g_{re,im} + 2 \cdot g \cdot g_{re,im})$$

Here, the expressions are defined as shown in Expression 76.

$$h_4 = g_{re,re} + g_{im,im} + 2 \cdot g \cdot g_{im,im} + g^2 \cdot g_{im,im}$$

$$h_5 = 2 \cdot g_{re,im} + 2 \cdot g \cdot g_{re,im} \tag{76}$$

By substituting each expression defined in Expression 76 into Expression 75, the denominator $\Sigma|R|^2$ of Expression 2 into which Expressions 60 and 61 are substituted becomes Expression 77 below.

$$\Sigma|R|^2 = h_4 + \sin\Delta \cdot h_5 \tag{77}$$

Next, Expressions 70 and 77 are substituted into Expression 5, which represents an equation for which the derivative of the function $\rho'$ is 0.

$$\frac{\partial \left|\sum Z \cdot R^*\right|^2}{\partial \Delta} \cdot \left(\sum |R|^2\right)^2 = \left|\sum Z \cdot R^*\right|^2 \cdot \sum |R|^2 \cdot \frac{\partial \sum |R|^2}{\partial \Delta} \tag{5}$$

Each expression on the left side of Expression 5 into which Expressions 70 and 77 are substituted is expressed by Expressions—78-1 and 78-2 below.

$$\frac{\partial \left|\sum Z \cdot R^*\right|^2}{\partial \Delta} = -\sin\Delta \cdot h_2 + \cos\Delta \cdot h_3 \tag{78-1}$$

$$\left(\sum |R|^2\right)^2 = [h_4 + \sin\Delta \cdot h_5]^2 \tag{78-2}$$

Replacing the trigonometric functions of Expressions—78-1 and 78-2 with approximation expressions results in Expressions—79-1 and 79-2.

$$\frac{\partial \left|\sum Z \cdot R^*\right|^2}{\partial \Delta} = -\Delta \cdot h_2 + h_3 \tag{79-1}$$

$$\left(\sum |R|^2\right)^2 = [h_4 + \Delta \cdot h_5]^2 \tag{79-2}$$

Accordingly, the left side of Expression 5 into which Expressions 70 and 77 are substituted is expressed by Expression 80 below.

$$\frac{\partial \left|\sum Z \cdot R^*\right|^2}{\partial \Delta} \cdot \left(\sum |R|^2\right) = (-\Delta \cdot h_2 + h_3) \cdot (h_4 + \Delta \cdot h_5)^2 = \tag{80}$$
$$(-\Delta \cdot h_2 + h_3) \cdot (h_4 \cdot h_4 + h_4 \cdot 2 \cdot \Delta \cdot h_5 + \Delta \cdot h_5 \cdot \Delta \cdot h_5) =$$
$$-\Delta \cdot h_2 \cdot h_4 \cdot h_4 - \Delta \cdot h_2 \cdot h_4 \cdot 2 \cdot \Delta \cdot h_5 - \Delta \cdot h_2 \cdot \Delta \cdot h_5 \cdot \Delta \cdot h_5 +$$
$$h_3 \cdot h_4 \cdot h_4 + h_3 \cdot h_4 \cdot 2 \cdot \Delta \cdot h_5 + h_3 \cdot \Delta \cdot h_5 \cdot \Delta \cdot h_5$$

Terms of a third-order or higher of the variable Δ are removed from Expression 80 to achieve a second-order equation expressed by Expression 81.

$$\frac{\partial \left|\sum Z \cdot R^*\right|^2}{\partial \Delta} \cdot \left(\sum |R|^2\right)^2 = \tag{81}$$
$$-\Delta \cdot h_2 \cdot h_4 \cdot h_4 - \Delta \cdot h_2 \cdot h_4 \cdot 2 \cdot \Delta \cdot h_5 + h_3 \cdot h_4 \cdot h_4 + h_3 \cdot h_4 \cdot 2 \cdot \Delta \cdot h_5 +$$
$$h_3 \cdot \Delta \cdot h_5 \cdot \Delta \cdot h_5 = h_3 \cdot h_4 \cdot h_4 + \Delta \cdot (-h_2 \cdot h_4 \cdot h_4 + 2 \cdot h_3 \cdot h_4 \cdot h_5) +$$
$$\Delta^2 \cdot (-2 \cdot h_2 \cdot h_4 \cdot h_5 + h_3 \cdot h_5 \cdot h_5)$$

Each expression on the right side of Expression 5 of into which Expressions 70 and 77 are substituted is expressed by Expressions—82-1, 82-2, and 82-3.

$$\left|\sum Z \cdot R^*\right|^2 = h_1 + \cos\Delta \cdot h_2 + \sin\Delta \cdot h_3 \tag{82-1}$$

$$\sum |R|^2 = h_4 + \sin\Delta \cdot h_5 \tag{82-2}$$

$$\frac{\partial \sum |R|^2}{\partial \Delta} = \cos\Delta \cdot h_5 \tag{82-3}$$

Replacing the trigonometric functions of Expressions—82-1, 82-2, and 82-3 with approximation expressions results in Expressions—83-1, 83-2, and 83-3.

$$\left|\sum Z \cdot R^*\right|^2 = h_1 + h_2 + \Delta \cdot h_3 \tag{83-1}$$

$$\sum |R|^2 = h_4 + \Delta \cdot h_5 \tag{83-2}$$

$$\frac{\partial \sum |R|^2}{\partial \Delta} = h_5 \tag{83-3}$$

Accordingly, the right side of Expression 5 into which Expressions 70 and 77 are substituted is expressed by Expression 84.

$$\left|\sum Z \cdot R^*\right|^2 \cdot \sum |R|^2 \cdot \frac{\partial \sum |R|^2}{\partial \Delta} = \tag{84}$$
$$(h_1 + h_2 + \Delta \cdot h_3) \cdot (h_4 + \Delta \cdot h_5) \cdot h_5 =$$
$$(h_1 + h_2 + \Delta \cdot h_3) \cdot (h_4 \cdot h_5 + \Delta \cdot h_5 \cdot h_5) =$$
$$h_1 \cdot h_4 \cdot h_5 + h_1 \cdot \Delta \cdot h_5 \cdot h_5 + h_2 \cdot h_4 \cdot h_5 +$$
$$h_2 \cdot \Delta \cdot h_5 \cdot h_5 + \Delta \cdot h_3 \cdot h_4 \cdot h_5 + \Delta \cdot h_3 \cdot \Delta \cdot h_5 \cdot h_5$$

Terms of a third-order or higher of the variable Δ are removed from Expression 84 to achieve a second-order equation expressed by Expression 85.

$$\left|\sum Z \cdot R^*\right|^2 \cdot \sum |R|^2 \cdot \frac{\partial \sum |R|^2}{\partial \Delta} = \tag{85}$$
$$h_1 \cdot h_4 \cdot h_5 + h_1 \cdot \Delta \cdot h_5 \cdot h_5 + h_2 \cdot h_4 \cdot h_5 + h_2 \cdot \Delta \cdot h_5 \cdot h_5 +$$
$$\Delta \cdot h_3 \cdot h_4 \cdot h_5 + \Delta \cdot h_3 \cdot \Delta \cdot h_5 \cdot h_5 = h_1 \cdot h_4 \cdot h_5 + h_2 \cdot h_4 \cdot h_5 +$$
$$\Delta \cdot (h_1 \cdot h_5 \cdot h_5 + h_2 \cdot h_5 \cdot h_5 + h_3 \cdot h_4 \cdot h_5) + \Delta^2 \cdot h_3 \cdot h_5 \cdot h_5$$

Accordingly, when calculating the phase error of the quadrature modulator 200, an equation for which the derivative of the correlation value between the ideal signal R and the measured signal has a value of 0 can be expressed as a second-order equation of the variable Δ, as shown in Expression 86, by simplifying Expressions 81 and 85.

$$\frac{\partial \left|\sum Z \cdot R^*\right|^2}{\partial \Delta} \cdot \left(\sum |R|^2\right)^2 - \left|\sum Z \cdot R^*\right|^2 \cdot \sum |R|^2 \cdot \frac{\partial \sum |R|^2}{\partial \Delta} = 0 \tag{86}$$
$$h_3 \cdot h_4 \cdot h_4 + \Delta \cdot (-h_2 \cdot h_4 \cdot h_4 + 2 \cdot h_3 \cdot h_4 \cdot h_5) +$$
$$\Delta^2 \cdot (-2 \cdot h_2 \cdot h_4 \cdot h_5 + h_3 \cdot h_5 \cdot h_5) - [h_1 \cdot h_4 \cdot h_5 + h_2 \cdot h_4 \cdot h_5 +$$
$$\Delta \cdot (h_1 \cdot h_5 \cdot h_5 + h_2 \cdot h_5 \cdot h_5 + h_3 \cdot h_4 \cdot h_5) + \Delta^2 \cdot h_3 \cdot h_5 \cdot h_5] = 0$$
$$h_3 \cdot h_4 \cdot h_4 - h_1 \cdot h_4 \cdot h_5 - h_2 \cdot h_4 \cdot h_5 + \Delta \cdot (-h_2 \cdot h_4 \cdot h_4 +$$
$$2 \cdot h_3 \cdot h_4 \cdot h_5 - h_1 \cdot h_5 \cdot h_5 - h_2 \cdot h_5 \cdot h_5 - h_3 \cdot h_4 \cdot h_5) +$$
$$\Delta^2 \cdot (-2 \cdot h_2 \cdot h_4 \cdot h_5 + h_3 \cdot h_5 \cdot h_5 - h_3 \cdot h_5 \cdot h_5) = 0$$
$$h_3 \cdot h_4 \cdot h_4 + h_1 \cdot h_4 \cdot h_5 - h_2 \cdot h_4 \cdot h_5 +$$
$$\Delta \cdot (-h_2 \cdot h_4 \cdot h_4 + h_3 \cdot h_4 \cdot h_5 - h_1 \cdot h_5 \cdot h_5 - h_2 \cdot h_5 \cdot h_5) +$$
$$\Delta^2 \cdot (-2 \cdot h_2 \cdot h_4 \cdot h_5) = 0$$

The calculating section 18 can calculate the value of the variable Δ that maximizes the correlation value between the ideal signal R and the measured signal Z by calculating solutions of the variable Δ in the second-order equation expressed by Expression 86. The solutions to the second-order equation of Expression 86 are supplied by the formula for solutions shown in Expression 87. In Expression 86, $h_1$, $h_2$, $h_3$, $h_4$, $h_5$, and $h_6$ are as expressed in Expressions 69 and 76.

$$\Delta = \frac{-b \pm \sqrt{b^2 - 4ac}}{2a} \tag{87}$$
$$a = -2 \cdot h_2 \cdot h_4 \cdot h_5$$
$$b = -h_2 \cdot h_4 \cdot h_4 + h_3 \cdot h_4 \cdot h_5 - h_1 \cdot h_5 \cdot h_5 - h_2 \cdot h_5 \cdot h_5$$
$$c = h_3 \cdot h_4 \cdot h_4 - h_1 \cdot h_4 \cdot h_5 - h_2 \cdot h_4 \cdot h_5$$

Based on the above, when calculating the phase error of the quadrature modulator 200, the calculating section 18 can use Expression 87 to calculate a solution for the variable Δ that maximizes the correlation value between the ideal signal R and the measured signal Z. In other words, the calculating section 18 calculates a solution for the variable that maximizes the correlation value between the ideal signal R and the measured signal Z based on a second-order equation obtained by removing third-order terms and higher of the variable Δ from an equation for which the derivative of the function representing the correlation value between the ideal signal R and the measured signal Z has a value of 0. In this way, the calculating section 18 can calculate an approximate solution for the phase error of the quadrature modulator 200 using a simple computation.

Furthermore, the calculating section 18 substitutes each of the two solutions of the second-order equation into a function, such as Expression 2, expressing the correlation value between the ideal signal R and the measured signal Z, and determines the phase error to be whichever of the two solutions results in a greater correlation value. In this way, the calculating section 18 selects a single solution from among the two solutions of the second-order equation.

As described above, the calculating section 18 of the present embodiment can use Expression 87 to calculate the phase error of the quadrature modulator 200. In this way, the calculating section 18 can easily calculate the phase error without using the determinant of a matrix or the like.

Figure 3:
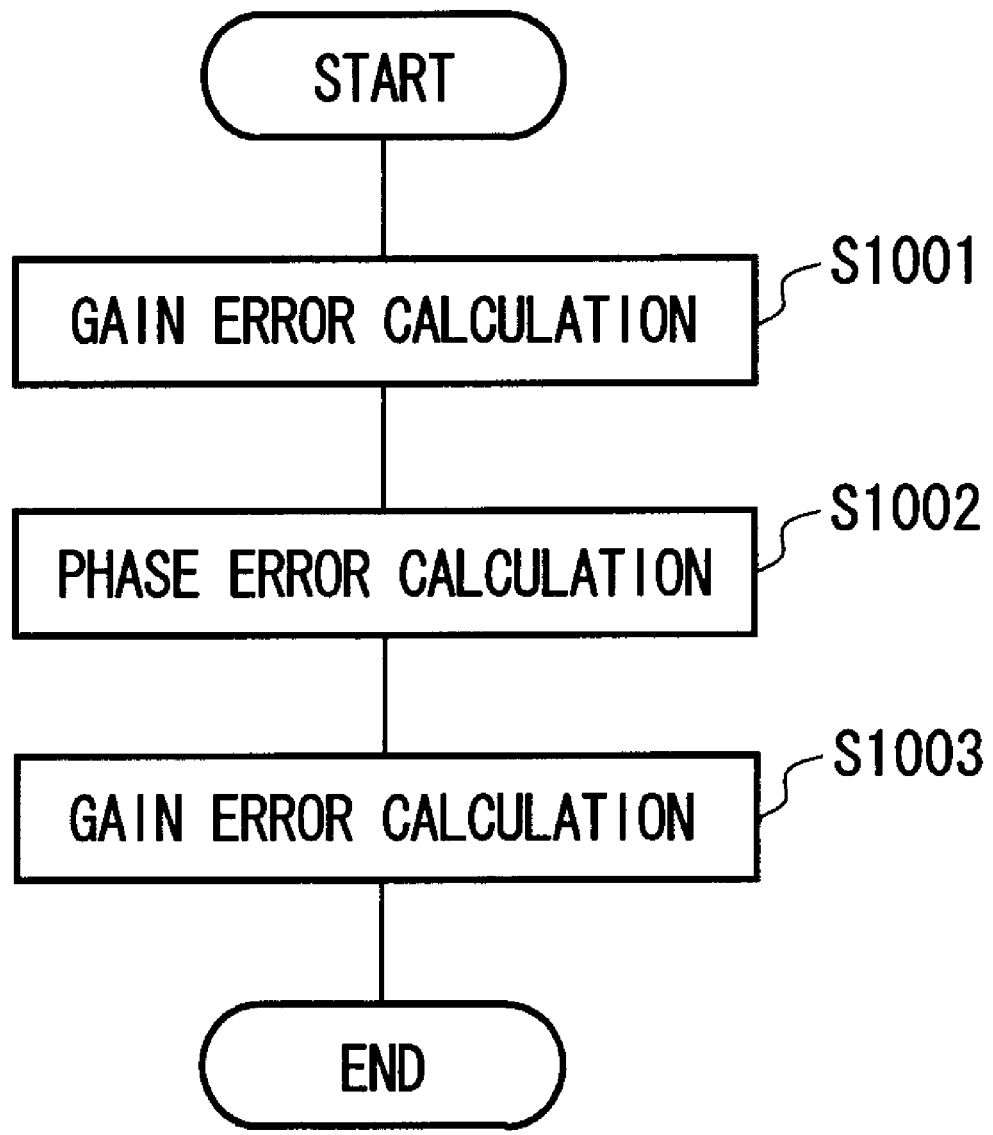
FIG. 3 shows a flow chart for calculation of the gain error and the phase error performed by the measurement apparatus 10 according to the present embodiment.

FIG. 3 shows a flow chart for calculation of the gain error and the phase error performed by the measurement apparatus 10 according to the present embodiment. In the present embodiment, the calculating section 18 may calculate a solution of the variable that maximizes the correlation value between the measured signal and the ideal signal in which either the gain error or the phase error, whichever of these two errors is not being measured, has a value of 0. In this way, the calculating section 18 can perform the calculation easily by treating the error not being measured as having a value of 0.

If whichever of the gain error and the phase error not being measured has already been calculated, the calculating section 18 may calculate a solution of the variable that maximizes the correlation value between the measured signal and the ideal signal that includes the calculated error as a constant. Instead, the calculating section 18 may calculate a solution of the variable that maximizes the correlation value between the ideal signal and the measured signal that has been corrected based on the calculated error. In this way, the calculating section 18 can more accurately calculate the error.

The calculating section 18 may calculate the gain error and the phase error according to the process flow shown in FIG. 3. First, the calculating section 18 uses Expression 31, for example, to calculate the gain error (S1001). In this case, the calculating section 18 calculates the gain error while assuming a value of 0 for the phase error.

Next, the calculating section 18 uses Expression 59 or Expression 87, for example, to calculate the phase error (S1002). In this case, the calculating section 18 corrects the ideal signal or the measured signal according to the gain error calculated at step S1001. When calculating the phase error of the quadrature demodulator 100, for example, the calculating section 18 performs the calculation using Expression 59, based on the measured signal corrected according to the gain error calculated at step S1001. On the other hand, when calculating the phase error of the quadrature modulator 200, for example, the calculating section 18 performs the calculation using Expression 87, with the gain error calculated at step S1001 substituted for the parameter g representing the gain error.

Next, the calculating section 18 uses Expression 31, for example, to recalculate the gain error (S1003). In this case, the calculating section 18 corrects the measured signal according to the phase difference calculated at step S1002.

In this way, the calculating section 18 repeatedly and alternately calculates the gain error and the phase error with an error calculation process that uses the measured signal or the ideal signal in which an error, which has been measured previously and is not the error being currently measured, is corrected. Therefore, the calculating section 18 can accurately calculate the gain error and the phase error.

Figure 4:
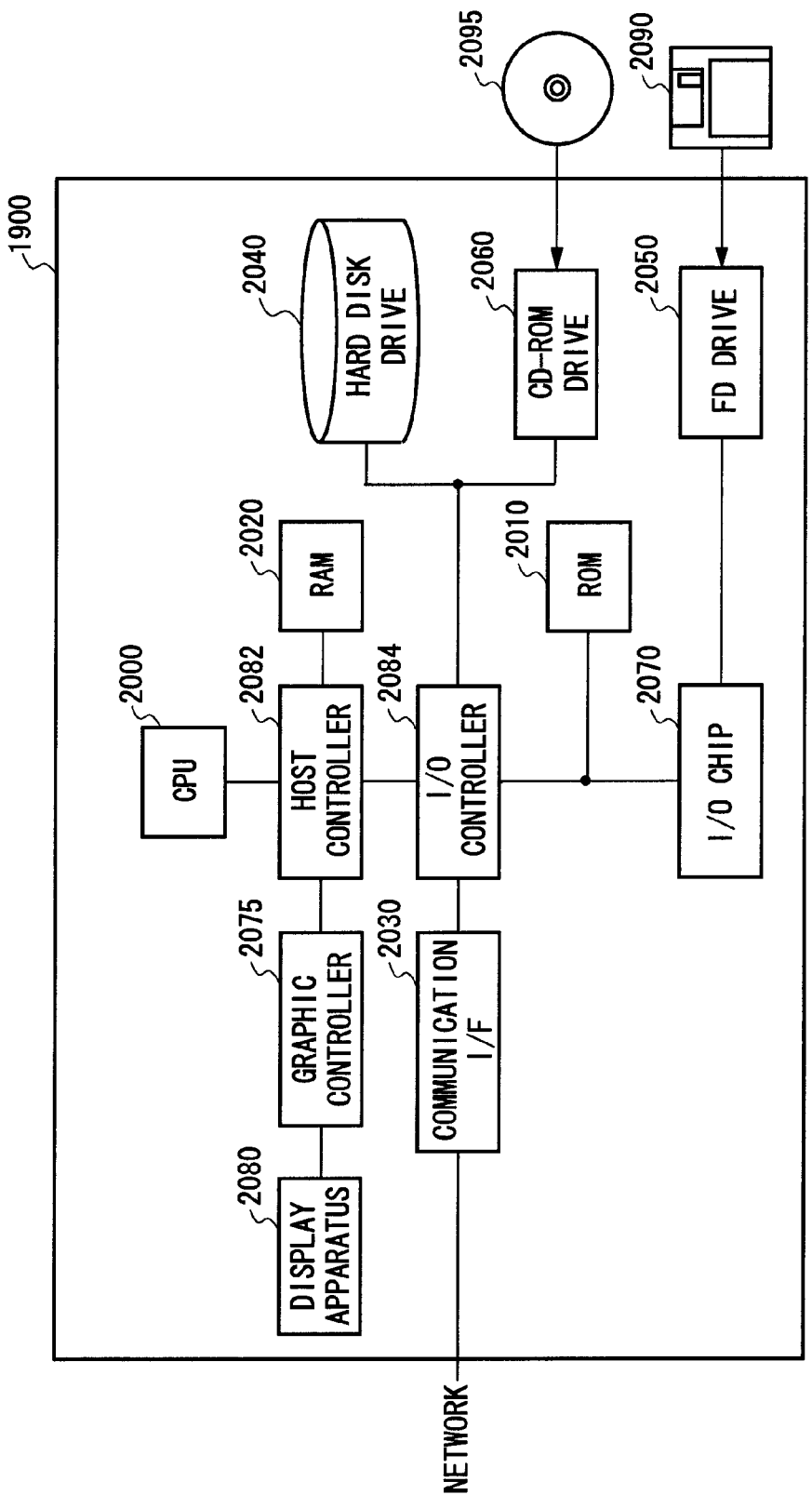
FIG. 4 shows an example of a hardware configuration of a computer 1900 according to the present embodiment.

FIG. 4 shows an example of a hardware configuration of a computer 1900 according to the present embodiment. The computer 1900 according to the present embodiment is provided with a CPU peripheral including a CPU 2000, a RAM 2020, a graphic controller 2075, and a display apparatus 2080, all of which are connected to each other by a host controller 2082; an input/output section including a communication interface 2030, a measurement interface 2032, a hard disk drive 2040, and a CD-ROM drive 2060, all of which are connected to the host controller 2082 by an input/output controller 2084; and a legacy input/output section including a ROM 2010, a flexible disk drive 2050, and an input/output chip 2070, all of which are connected to the input/output controller 2084.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the display apparatus 2080. In addition, the graphic controller 2075 may internally include the frame buffer storing the image data generated by the CPU 2000 or the like.

The input/output controller 2084 connects the communication interface 2030 serving as a relatively high speed input/output apparatus, and the hard disk drive 2040, and the CD-ROM drive 2060 to the host controller 2082. The communication interface 2030 communicates with other apparatuses via a network. The hard disk drive 2040 stores the programs and data used by the CPU 2000 housed in the computer 1900. The CD-ROM drive 2060 reads the programs and data from a CD-ROM 2095 and provides the read information to the hard disk drive 2040 via the RAM 2020.

Furthermore, the input/output controller 2084 is connected to the ROM 2010, and is also connected to the flexible disk drive 2050 and the input/output chip 2070 serving as a relatively high speed input/output apparatus. The ROM 2010 stores a boot program performed when the computer 1900 starts up, a program relying on the hardware of the computer 1900, and the like. The flexible disk drive 2050 reads programs or data from a flexible disk 2090 and supplies the read information to the hard disk drive 2040 via the RAM 2020. The input/output chip 2070 connects the flexible disk drive 2050 to the input/output controller 2084 along with each of the input/output apparatuses via, a parallel port, a serial port, a keyboard port, a mouse port, or the like.

The programs provided to the hard disk drive 2040 via the RAM 2020 are stored in a storage medium, such as the flexible disk 2090, the CD-ROM 2095, or an IC card, and provided by a user. The programs are read from storage medium, installed in the hard disk drive 2040 inside the computer 1900 via the RAM 2020, and performed by the CPU 2000.

The programs installed in the computer 1900 to make the computer 1900 function as a portion of the measurement apparatus 10 are provided with an output control module, a detection module, and a calculation module. These programs and modules prompt the CPU 2000 or the like to make the computer 1900 function as the output control section 14, the detecting section 16, and the calculating section 18, respectively.

The programs and modules shown above may also be stored in an external storage medium. The flexible disk 2090, the CD-ROM 2095, an optical storage medium such as a DVD or CD, a magneto-optical storage medium, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the computer 1900 via the network.

Although some aspects of the present invention have been described by way of exemplary embodiments, it should be understood that those skilled in the art might make many changes and substitutions without departing from the spirit and the scope of the present invention which is defined only by the appended claims.

The operations, the processes, the steps, or the like in the apparatus, the system, the program, and the method described in the claims, the specification, and the drawings are not necessarily performed in the described order. The operations, the processes, the steps, or the like can be performed in an arbitrary order, unless the output of the former-described processing is used in the later processing. Even when expressions such as "First," or "Next," or the like are used to explain the operational flow in the claims, the specification, or the drawings, they are intended to facilitate the understanding of the invention, and are never intended to show that the described order is mandatory.

What is claimed is:

1. A measurement apparatus that measures, as an error under measurement, at least one of a gain error and a phase error of a quadrature demodulator or a quadrature modulator serving as a measurement target, the measurement apparatus comprising:
  an output control section that causes the measurement target to output a signal;
  a detecting section that detects a measured signal representing a real component and an imaginary component of the signal output from the measurement target; and
  a calculating section that calculates, as the gain error or the phase error, based on (i) the measured signal detected by the detecting section and (ii) an ideal signal that represents the measured signal that should be output by the measurement target and includes a variable representing the error under measurement, a value of the variable that maximizes a correlation value between the measured signal detected by the detecting section and the ideal signal.

2. The measurement apparatus according to claim 1, wherein
  the calculating section calculates the value of the variable that maximizes the correlation value between the ideal signal and the measured signal based on an equation for which a derivative of a function representing the correlation value between the ideal signal and the measured signal has a value of 0.

3. The measurement apparatus according to claim 2, wherein
  the calculating section calculates the value of the variable that maximizes the correlation value between the ideal signal and the measured signal based on an equation for which the derivative of a function $\rho'$ has a value of 0, wherein $$\rho' = \frac{|\sum Z \cdot R^*|^2}{\sum |R|^2}.$$

R represents the ideal signal,
  Z represents the measured signal, and
  R* represents a complex conjugate of R.

4. The measurement apparatus according to claim 2, wherein
  the calculating section calculates the value of the variable that maximizes the correlation value between the ideal signal and the measured signal based on a second-order equation obtained by removing third-order terms and higher of the variable from the equation for which the derivative of the function representing the correlation value between the ideal signal and the measured signal has a value of 0.

5. The measurement apparatus according to claim 4, wherein
  the calculating section substitutes two solutions of the second-order equation into the function representing the correlation value between the ideal signal and the measured signal, and determines the gain error or the phase error to be whichever of the two solutions results in a larger correlation value.

6. The measurement apparatus according to claim 5, wherein
  when the gain error of the quadrature demodulator is measured, the calculating section uses the following expression:

$$\Delta = \frac{-b \pm \sqrt{b^2 - 4ac}}{2a}$$

$$a = 3 \cdot h_2 \cdot h_3 \cdot h_4 - 3 \cdot h_5 \cdot h_6 \cdot h_4$$

$$b = h_1 \cdot h_3 \cdot h_4 + 2 \cdot h_2 \cdot h_3 \cdot h_3 - h_4 \cdot h_6 \cdot h_4 - 2 \cdot h_5 \cdot h_6 \cdot h_3$$

$$c = h_1 \cdot h_3 \cdot h_3 - h_4 \cdot h_6 \cdot h_3,$$

$\Delta$ represents the gain error,
$h_1$, $h_2$, $h_3$, $h_4$, $h_5$, and $h_6$ are defined as follows:

$$h_1 = 2 \cdot f_{re,re} \cdot f_{im,im} - 2 \cdot f_{re,im} \cdot f_{im,re} +$$
$$2 \cdot \sin\theta_0 \cdot f_{im,re} \cdot \sin\theta_0 \cdot f_{im,re} + 4 \cdot \sin\theta_0 \cdot f_{im,re} \cdot \cos\theta_0 \cdot f_{im,im} +$$
$$2 \cdot \cos\theta_0 \cdot f_{im,im} \cdot \cos\theta_0 \cdot f_{im,im} + 2 \cdot \sin\theta_0 \cdot f_{re,re} \cdot \sin\theta_0 \cdot f_{re,re} +$$
$$4 \cdot \sin\theta_0 \cdot f_{re,re} \cdot \cos\theta_0 \cdot f_{re,im} + 2 \cdot \cos\theta_0 \cdot f_{re,im} \cdot \cos\theta_0 \cdot f_{re,im}$$

$$h_2 = \sin\theta_0 \cdot f_{im,re} \cdot \sin\theta_0 \cdot f_{im,re} + 2 \cdot \sin\theta_0 \cdot f_{im,re} \cdot \cos\theta_0 \cdot f_{im,im} +$$
$$\cos\theta_0 \cdot f_{im,im} \cdot \cos\theta_0 \cdot f_{im,im} + \sin\theta_0 \cdot f_{re,re} \cdot \sin\theta_0 \cdot f_{re,re} +$$
$$2 \cdot \sin\theta_0 \cdot f_{re,re} \cdot \cos\theta_0 \cdot f_{re,im} + \cos\theta_0 \cdot f_{re,im} \cdot \cos\theta_0 \cdot f_{re,im}$$

$$h_3 = g_{re,re} + g_{im,im}$$

$$h_4 = 2 \cdot \sin\theta_0 \cdot \sin\theta_0 \cdot g_{re,re} + 4 \cdot \sin\theta_0 \cdot \cos\theta_0 \cdot g_{re,im} +$$
$$2 \cdot \cos\theta_0 \cdot \cos\theta_0 \cdot g_{im,im}$$

$$h_5 = \sin\theta_0 \cdot \sin\theta_0 \cdot g_{re,re} + 2 \cdot \sin\theta_0 \cdot \cos\theta_0 \cdot g_{re,im} + \cos\theta_0 \cdot \cos\theta_0 \cdot g_{im,im}$$

$$h_6 = f_{re,re} \cdot f_{re,re} + 2 \cdot f_{re,re} \cdot f_{im,im} + f_{re,im} \cdot f_{re,im} -$$
$$2 \cdot f_{re,im} \cdot f_{im,re} + f_{im,re} \cdot f_{im,re} + f_{im,im} \cdot f_{im,im},$$

$\theta_0$ represents a phase difference between a reference signal of the quadrature demodulator serving as the measurement target and a carrier signal of a modulated signal supplied to the quadrature demodulator,
each expression included in $h_1$, $h_2$, $h_3$, $h_4$, $h_5$, and $h_6$ is defined as follows:

$f_{re,re} = \Sigma C_{re}(k) \cdot R_{re}(k)$ $f_{im,im} = \Sigma C_{im}(k) \cdot R_{im}(k)$ $f_{im,re} = \Sigma C_{im}(k) \cdot R_{re}(k)$ $f_{re,im} = \Sigma C_{re}(k) \cdot R_{im}(k)$ $g_{re,re} = \Sigma R_{re}(k) \cdot R_{re}(k)$ $g_{im,im} = \Sigma R_{im}(k) \cdot R_{im}(k)$ $g_{im,re} = \Sigma R_{im}(k) \cdot R_{re}(k)$ $g_{re,im} = \Sigma R_{re}(k) \cdot R_{im}(k)$ $C_{re}(k)$ represents the real component of the measured signal, $C_{im}(k)$ represents the imaginary component of the measured signal, $R_{re}(k)$ represents a real component of the modulated signal supplied to the quadrature demodulator serving as the measurement target, $R_{im}(k)$ represents an imaginary component of the modulated signal, and k represents an arbitrary sampling point.

7. The measurement apparatus according to claim 6, wherein when the gain error of the quadrature modulator is measured, the calculating section corrects a phase of the measured signal according to $\theta_0$, and performs the calculation using the following expression:

$$\Delta = \frac{-b \pm \sqrt{b^2 - 4ac}}{2a}$$
$$a = 3 \cdot h_2 \cdot h_3 \cdot h_4 - 3 \cdot h_5 \cdot h_6 \cdot h_4$$
$$b = h_1 \cdot h_3 \cdot h_4 + 2 \cdot h_2 \cdot h_3 \cdot h_3 - h_4 \cdot h_6 \cdot h_4 - 2 \cdot h_5 \cdot h_6 \cdot h_3$$
$$c = h_1 \cdot h_3 \cdot h_3 - h_4 \cdot h_6 \cdot h_3.$$

8. The measurement apparatus according to claim 5, wherein when the phase error of the quadrature demodulator is measured, the calculating section uses the following expression:

$$\Delta = \frac{-b \pm \sqrt{b^2 - 4ac}}{2a}$$
$$a = 2 \cdot h_2 \cdot h_3 \cdot h_4 - h_5 \cdot h_4 \cdot h_6 - h_1 \cdot h_3 \cdot h_6 - h_1 \cdot h_4 \cdot h_5$$
$$b = h_1 \cdot h_3 \cdot h_4 + h_2 \cdot h_3 \cdot h_3 - h_5 \cdot h_3 \cdot h_6 - h_5 \cdot h_4 \cdot h_4$$
$$c = h_1 \cdot h_3 \cdot h_3 - h_5 \cdot h_3 \cdot h_4,$$

$\Delta$ represents the phase error, $h_1, h_2, h_3, h_4, h_5, h_6$ are defined as follows:

$$h_1 = -2 \cdot \cos(2 \cdot \theta_0) \cdot (f_{re,im} \cdot f_{re,re} + f_{im,re} \cdot f_{im,im}) + \sin(2 \cdot \theta_0) \cdot$$
$$(-f_{re,re} \cdot f_{re,re} + f_{im,im} \cdot f_{im,im} + f_{re,im} \cdot f_{re,im} - f_{im,re} \cdot f_{im,re})$$
$$h_2 = -2 \cdot \cos(2 \cdot \theta_0) \cdot (-f_{re,re} \cdot f_{re,re} + f_{im,im} \cdot f_{im,im} +$$
$$f_{re,im} \cdot f_{re,im} - f_{im,re} \cdot f_{im,re}) - 4 \cdot \sin(2 \cdot \theta_0) \cdot$$
$$(f_{re,im} \cdot f_{re,re} + f_{im,re} \cdot f_{im,im}) - (2 \cdot f_{re,re} \cdot f_{im,im} - 2 \cdot f_{re,im} \cdot f_{im,re})$$
$$h_3 = \frac{1}{2} \cdot g_{re,re} + \frac{1}{2} \cdot g_{im,im} + \cos\theta_0 \cdot \cos\theta_0 \cdot g_{re,re} -$$
$$2 \cdot \cos\theta_0 \cdot \sin\theta_0 \cdot g_{re,im} + \sin\theta_0 \cdot \sin\theta_0 \cdot g_{im,im} +$$
$$\frac{1}{2} \cdot \cos(2 \cdot \theta_0) \cdot (g_{im,im} - g_{re,re}) + \sin(2 \cdot \theta_0) \cdot g_{re,im}$$
$$h_4 = \sin(2 \cdot \theta_0) \cdot (g_{im,im} - g_{re,re}) - 2 \cdot \cos(2 \cdot \theta_0) \cdot g_{re,im}$$
$$h_5 = \frac{1}{2} \cdot (f_{re,re} \cdot f_{re,re} + f_{im,im} \cdot f_{im,im} + f_{re,im} \cdot f_{re,im} + f_{im,re} \cdot f_{im,re}) +$$
$$2 \cdot f_{re,re} \cdot f_{im,im} - 2 \cdot f_{re,im} \cdot f_{im,re} + \cos\theta_0 \cdot \cos\theta_0 \cdot$$
$$(f_{re,re} \cdot f_{re,re} + f_{im,re} \cdot f_{im,re}) + \sin\theta_0 \cdot \sin\theta_0 \cdot$$

$$(f_{im,im} \cdot f_{im,im} + f_{re,im} \cdot f_{re,im}) - 2 \cdot \cos\theta_0 \cdot \sin\theta_0 \cdot$$
$$(f_{re,re} \cdot f_{re,im} + f_{im,re} \cdot f_{im,im}) + \frac{1}{2} \cdot \cos(2 \cdot \theta_0) \cdot$$
$$(-f_{re,re} \cdot f_{re,re} + f_{im,im} \cdot f_{im,im} + f_{re,im} \cdot f_{re,im} - f_{im,re} \cdot f_{im,re}) +$$
$$\sin(2 \cdot \theta_0) \cdot (f_{re,im} \cdot f_{re,re} + f_{im,re} \cdot f_{im,im})$$
$$h_6 = -2 \cdot \cos(2 \cdot \theta_0) \cdot (g_{im,im} - g_{re,re}) - 4 \cdot \sin(2 \cdot \theta_0) \cdot g_{re,im},$$

$\theta_0$ represents phase difference between a reference signal of the quadrature demodulator serving as the measurement target and a carrier signal of a modulated signal supplied to the quadrature demodulator, each expression included in $h_1, h_2, h_3, h_4, h_5, h_6$ is defined as follows:

$$f_{re,re} = \Sigma C_{re}(k) \cdot R_{re}(k)$$
$$f_{im,im} = \Sigma C_{im}(k) \cdot R_{im}(k)$$
$$f_{im,re} = \Sigma C_{im}(k) \cdot R_{re}(k)$$
$$f_{re,im} = \Sigma C_{re}(k) \cdot R_{im}(k)$$
$$g_{re,re} = \Sigma R_{re}(k) \cdot R_{re}(k)$$
$$g_{im,im} = \Sigma R_{im}(k) \cdot R_{im}(k)$$
$$g_{im,re} = \Sigma R_{im}(k) \cdot R_{re}(k)$$
$$g_{re,im} = \Sigma R_{re}(k) \cdot R_{im}(k)$$

$C_{re}(k)$ represents the real component of the measured signal, $C_{im}(k)$ represents the imaginary component of the measured signal, $R_{re}(k)$ represents a real component of the modulated signal supplied to the quadrature demodulator serving as the measurement target, $R_{im}(k)$ represents an imaginary component of the modulated signal, and k represents an arbitrary sampling point.

9. The measurement apparatus according to claim 5, wherein when the phase error of the quadrature modulator is measured, the calculating section uses the following expression:

$$\Delta = \frac{-b \pm \sqrt{b^2 - 4ac}}{2a}$$
$$a = -2 \cdot h_2 \cdot h_4 \cdot h_5$$
$$b = -h_2 \cdot h_4 \cdot h_4 + h_3 \cdot h_4 \cdot h_5 - h_1 \cdot h_5 \cdot h_5 - h_2 \cdot h_5 \cdot h_5$$
$$c = h_3 \cdot h_4 \cdot h_4 - h_1 \cdot h_4 \cdot h_5 - h_2 \cdot h_4 \cdot h_5,$$

$\Delta$ represents the phase error, $h_1, h_2, h_3, h_4,$ and $h_5$ are defined as follows:

$$h_1 = f_{re,re} \cdot f_{re,re} + f_{im,re} \cdot f_{im,re} + f_{re,im} \cdot f_{re,im} + f_{im,im} \cdot f_{im,im} +$$
$$2 \cdot g \cdot f_{im,im} \cdot f_{im,im} + g^2 \cdot f_{im,im} \cdot f_{im,im} + 2 \cdot g \cdot f_{re,im} \cdot f_{re,im} +$$
$$g^2 \cdot f_{re,im} \cdot f_{re,im}$$

-continued $h_2 = 2 \cdot f_{re,re} \cdot f_{im,im} + 2 \cdot g \cdot f_{re,re} \cdot f_{im,im} - 2 \cdot f_{re,im} \cdot f_{im,re} - 2 \cdot g \cdot f_{re,im} \cdot f_{im,re}$ $h_3 = 2 \cdot f_{re,re} \cdot f_{re,im} + 2 \cdot g \cdot f_{re,re} \cdot f_{re,im} + 2 \cdot f_{im,re} \cdot f_{im,im} + 2 \cdot g \cdot f_{im,re} \cdot f_{im,im}$ $h_4 = g_{re,re} + g_{im,im} + 2 \cdot g \cdot g_{im,im} + g^2 \cdot g_{im,im}$ $h_5 = 2 \cdot g_{re,im} + 2 \cdot g \cdot g_{re,im}$, g represents the gain error,
each expression included in $h_1$, $h_2$, $h_3$, $h_4$, and $h_5$ and is defined as follows:

$f_{re,re} = \Sigma C_{re}(k) \cdot R_{re}(k)$ $f_{im,im} = \Sigma C_{im}(k) \cdot R_{im}(k)$ $f_{im,re} = \Sigma C_{im}(k) \cdot R_{re}(k)$ $f_{re,im} = \Sigma C_{re}(k) \cdot R_{im}(k)$ $g_{re,re} = \Sigma R_{re}(k) \cdot R_{re}(k)$ $g_{im,im} = \Sigma R_{im}(k) \cdot R_{im}(k)$ $g_{im,re} = \Sigma R_{im}(k) \cdot R_{re}(k)$ $g_{re,im} = \Sigma R_{re}(k) \cdot R_{im}(k)$ $C_{re}(k)$ represents the real component of the measured signal,
$C_{im}(k)$ represents the imaginary component of the measured signal,
$R_{re}(k)$ represents a real component of a signal supplied to the quadrature demodulator serving as the measurement target,
$R_{im}(k)$ represents an imaginary component of a signal supplied to the quadrature demodulator serving as the measurement target, and
k represents an arbitrary sampling point.

10. The measurement apparatus according to claim 5, wherein
the calculating section calculates the value of the variable that maximizes the correlation value between the measured signal and the ideal signal in which the gain error or the phase error, whichever is not the error under measurement, has a value of 0.

11. The measurement apparatus according to claim 10, wherein
when the gain error or the phase error, whichever is not the error under measurement, has been calculated, the calculating section calculates the value of the variable that maximizes the correlation value between the measured signal and the ideal signal that includes the calculated error as a constant.

12. A non-transitory computer readable medium storing thereon a program that causes an information processing apparatus to function as a measurement apparatus that measures, as an error under measurement, at least one of a gain error and a phase error of a quadrature demodulator or a quadrature modulator serving as a measurement target, the program causing the information processing apparatus to function as a measurement apparatus comprising:
an output control section that causes the measurement target to output a signal;
a detecting section that detects a measured signal representing a real component and an imaginary component of the signal output from the measurement target; and
a calculating section that calculates, as the gain error or the phase error, based on (i) the measured signal detected by the detecting section and (ii) an ideal signal that represents the measured signal that should be output by the measurement target and includes a variable representing the error under measurement, a value of the variable that maximizes a correlation value between the measured signal detected by the detecting section and the ideal signal that.

* * * * *